(12) United States Patent
Cho et al.

(10) Patent No.: US 12,655,674 B2
(45) Date of Patent: Jun. 16, 2026

(54) METHOD OF CONTROLLING VEHICLE TAILGATE APPARATUS

(71) Applicants: Hyundai Motor Company, Seoul (KR); Kia Corporation, Seoul (KR)

(72) Inventors: Kyu Hoon Cho, Hwaseong-si (KR); Hak Hui Choi, Hwaseong-si (KR); Jin Ho Hwang, Hwaseong-si (KR); Yong Ju Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/926,945

(22) Filed: Oct. 25, 2024

(65) Prior Publication Data

US 2026/0043290 A1 Feb. 12, 2026

(30) Foreign Application Priority Data

Aug. 9, 2024 (KR) ........................ 10-2024-0106937

(51) Int. Cl.
| | |
|---|---|
| *E05F 15/75* | (2015.01) |
| *B60R 3/02* | (2006.01) |
| *B62D 33/027* | (2006.01) |
| *E05B 81/08* | (2014.01) |
| *E05B 81/20* | (2014.01) |
| *E05B 81/70* | (2014.01) |
| *E05B 83/00* | (2014.01) |
| *E05F 15/41* | (2015.01) |
| *E05F 15/611* | (2015.01) |

(52) U.S. Cl.
CPC ................ *E05F 15/75* (2015.01); *B60R 3/02* (2013.01); *B62D 33/0273* (2013.01); *E05B 81/08* (2013.01); *E05B 81/20* (2013.01); *E05B 81/70* (2013.01); *E05B 83/00* (2013.01); *E05F*

*15/41* (2015.01); *E05F 15/611* (2015.01); *E05Y 2900/532* (2013.01); *E05Y 2900/544* (2013.01)

(58) Field of Classification Search
None
See application file for complete search history.

(56) References Cited

U.S. PATENT DOCUMENTS

| | | | |
|---|---|---|---|
| 5,449,212 A | 9/1995 | Seifert et al. | |
| 5,954,383 A | 9/1999 | Beck et al. | |
| (Continued) | | | |

FOREIGN PATENT DOCUMENTS

DE 102024112138 A1 * 8/2025 .............. B60J 5/108

*Primary Examiner* — Peter D Nolan
*Assistant Examiner* — Michael F Whalen
(74) *Attorney, Agent, or Firm* — Slater Matsil, LLP

(57) ABSTRACT

A method of controlling a vehicle tailgate apparatus including a main frame configured to move between an open position and a closed position, a pair of doors pivotally connected to the main frame, a frame latch allowing the main frame to be locked to and unlocked from the vehicle body, a pair of lower latches allowing the pair of doors to be locked to and unlocked from the main frame, a spindle drive configured to move the main frame between the open and closed positions, and a frame open-close switch electrically connected to the frame latch and the spindle drive, including performing an unlocking operation of the frame latch when the frame latch is fully locked after the frame open-close switch is turned on, and allowing the spindle drive to be retracted to have the main frame in the open position.

20 Claims, 62 Drawing Sheets

(56)                    References Cited

U.S. PATENT DOCUMENTS

| | | | |
|---|---|---|---|
| 6,196,609 B1 | 3/2001 | Bowers et al. | |
| 6,206,444 B1 | 3/2001 | Casey et al. | |
| 6,793,264 B1 | 9/2004 | Muller et al. | |
| 10,358,172 B2 * | 7/2019 | Morley | B62D 33/0273 |
| 11,584,451 B2 * | 2/2023 | Gibbs | B62D 33/03 |
| 12,590,484 B2 | 3/2026 | Heinl et al. | |
| 2007/0120391 A1 | 5/2007 | Hori et al. | |
| 2008/0066385 A1 | 3/2008 | Roach et al. | |
| 2011/0057469 A1 | 3/2011 | Zielinsky et al. | |
| 2012/0324793 A1 * | 12/2012 | Abbasi | B62D 33/0273 |
| | | | 49/168 |
| 2013/0060403 A1 | 3/2013 | Kerr et al. | |
| 2014/0165469 A1 | 6/2014 | Weingaertner et al. | |
| 2018/0265140 A1 | 9/2018 | Napoli et al. | |
| 2023/0339550 A1 | 10/2023 | Reif et al. | |

* cited by examiner

METHOD OF CONTROLLING VEHICLE TAILGATE APPARATUS

CROSS-REFERENCE TO RELATED APPLICATIONS

This application is based on and claims the benefit of priority to Korean Patent Application No. 10-2024-0106937, filed on Aug. 9, 2024, in the Korean Intellectual Property Office, the disclosure of which is incorporated herein in its entirety by reference.

TECHNICAL FIELD

The present disclosure relates to a method of controlling a vehicle tailgate apparatus.

BACKGROUND

A vehicle such as a pickup truck or a sport utility vehicle (SUV) may include a luggage compartment located on a rear portion of a vehicle body, and a tailgate designed to permit access to the luggage compartment. As the tailgate is opened, luggage may be loaded to and unloaded from the luggage compartment. That is, the tailgate is referred to as a door of the luggage compartment.

There are various types of tailgates classified as follows: a traditional tailgate; a drop-down tailgate opening and closing in a drop-down manner; a split tailgate having two doors opening and closing in a swing manner; and a multi-function tailgate opening and closing in various modes.

A tailgate may be configured to open and close in a drop-down manner by a drive mechanism. An existing drive mechanism may include an actuator configured to directly provide torque to a hinge shaft. In the existing drive mechanism, however, as the actuator provides excessive torque to the hinge shaft, the tailgate may be severely deformed, and failure(s) of the actuator may frequently occur.

A width of the tailgate according to the related art may be less than a width of the luggage compartment (or bed) because both side portions thereof are within both sidewalls of the vehicle body. Accordingly, when the tailgate opens in a drop-down manner (that is, the tailgate moves to an open position in which it is unfolded toward the rear of the vehicle), the tailgate may fail to open the entirety of the luggage compartment of the vehicle so that the opening width (opening area) of the luggage compartment may be relatively reduced.

When the doors in the related art split tailgate open in a swing manner, the open position of the doors may be limited to the rear of the vehicle. Because the doors are located behind the rear of the vehicle in a state in which the doors are opened, this limitation may be disadvantageous to luggage loading and unloading, trailer connection, a user's movement, and the like. That is, in a state in which the doors of the related art split tailgate are opened, space utilization at the rear of the vehicle may be reduced.

In the related art split tailgate, the two doors may be configured to open and close sequentially, and the two doors may not be allowed to open and close independently. Accordingly, there is a risk of damage to each door if the opening and closing of the two doors is not carried out sequentially.

In addition, the related art tailgate may not be easy to open and close because an open switch thereof is not intuitive to use.

In the related art split tailgate, a swing path of each door may be relatively large, which is disadvantageous to the opening of the door in a narrow space.

The above information described in this background section is provided to assist in understanding the background of the present disclosure, and may include information that is not considered as the prior art that is already publicly known, available, or in use.

SUMMARY

The present disclosure relates to a method of controlling a vehicle tailgate apparatus, and more particularly, to a method of controlling a vehicle tailgate apparatus designed to stably perform the movement of a main frame of a tailgate and the opening and closing of each door.

An embodiment of the present disclosure can solve the above-mentioned problems occurring in the prior art while advantages achieved by the prior art are maintained intact.

An embodiment of the present disclosure can provide a method of controlling a vehicle tailgate apparatus designed to stably perform the movement of a main frame of a tailgate and the opening and closing of each door by preventing a malfunction of the tailgate apparatus.

According to an embodiment of the present disclosure, in a method of controlling a vehicle tailgate apparatus including a main frame configured to move between an open position and a closed position at a rear end of a luggage compartment of a vehicle body, a pair of doors pivotally connected to the main frame, a frame latch configured to allow the main frame to be locked to and unlocked from the vehicle body, a pair of lower latches configured to allow the pair of doors to be locked to and unlocked from the main frame, a spindle drive configured to move the main frame between the open position and the closed position, and a frame open-close switch electrically connected to the frame latch and the spindle drive, the method may include: performing an unlocking operation of the frame latch in a state in which the frame latch is fully locked after the frame open-close switch is turned on; and allowing the spindle drive to be retracted to have the main frame in the open position.

The method may further include allowing the spindle drive to be extended to have the main frame in the closed position in a state in which the frame latch is not fully locked after the frame open-close switch is turned on.

The method may further include: detecting that an external force is acting on the spindle drive after the spindle drive is extended; and stopping the spindle drive.

The method may further include: detecting that no external force is acting on the spindle drive after the spindle drive is extended; stopping the spindle drive in a state in which the frame latch is partially locked; and performing cinching of the frame latch.

The vehicle tailgate apparatus may further include a step mechanism configured to be stowed in and deployed from at least one of the pair of doors, and a step latch configured to allow the step mechanism to be locked to and unlocked from the at least one door. The method may further include performing an unlocking operation of the step latch in a state in which a turn-on signal of the frame open-close switch is held for a predetermined period of time.

The method may further include monitoring an opening/closing state of each door after the unlocking operation of the step latch is performed.

The monitoring of the opening/closing state of each door may include determining that each door is closed in a state in which a corresponding lower latch is locked.

The vehicle tailgate apparatus may further include a magnetic module configured to allow the pair of doors to be locked to and unlocked from each other. The monitoring of the opening/closing state of each door may include determining that each door is closed in a state in which the magnetic module is locked.

The vehicle tailgate apparatus may further include a pair of door open switches provided on the pair of doors, respectively. The monitoring of the opening/closing state of each door may include determining that each door is closed in a state in which a corresponding door open switch is not turned on.

The vehicle tailgate apparatus may further include a check strip configured to move between an unfolded position in which the check strip is unfolded with respect to the main frame and a folded position in which the check strip is folded with respect to the main frame. The monitoring of the opening/closing state of each door may include determining that each door is closed in a state in which the check strip is in the unfolded position.

According to another embodiment of the present disclosure, in a method of controlling a vehicle tailgate apparatus including a main frame configured to move between an open position and a closed position at a rear end of a luggage compartment of a vehicle body, a pair of doors pivotally connected to the main frame, a frame latch configured to allow the main frame to be locked to and unlocked from the vehicle body, a pair of lower latches configured to allow the pair of doors to be locked to and unlocked from the main frame, a spindle drive configured to move the main frame between the open position and the closed position, a frame open-close switch electrically connected to the frame latch and the spindle drive, a pair of door open switches provided on the pair of doors, respectively, and a magnetic module configured to allow the pair of doors to be locked to and unlocked from each other, the method may include performing an unlocking operation of each lower latch and an unlocking operation of the magnetic module in a state in which the frame latch is fully locked after each door open switch is turned on.

The method may further include performing the unlocking operation of each lower latch and the unlocking operation of the magnetic module in a state in which each lower latch is locked after each door open switch is turned on.

The method may further include performing the unlocking operation of each lower latch and the unlocking operation of the magnetic module in a state in which each frame open-close switch is turned off after each door open switch is turned on.

BRIEF DESCRIPTION OF THE DRAWINGS

The above and other features and advantages of example embodiments of the present disclosure can be more apparent from the following detailed description taken in conjunction with the accompanying drawings, in which.

DETAILED DESCRIPTION OF ILLUSTRATIVE EMBODIMENTS

Figure 1:
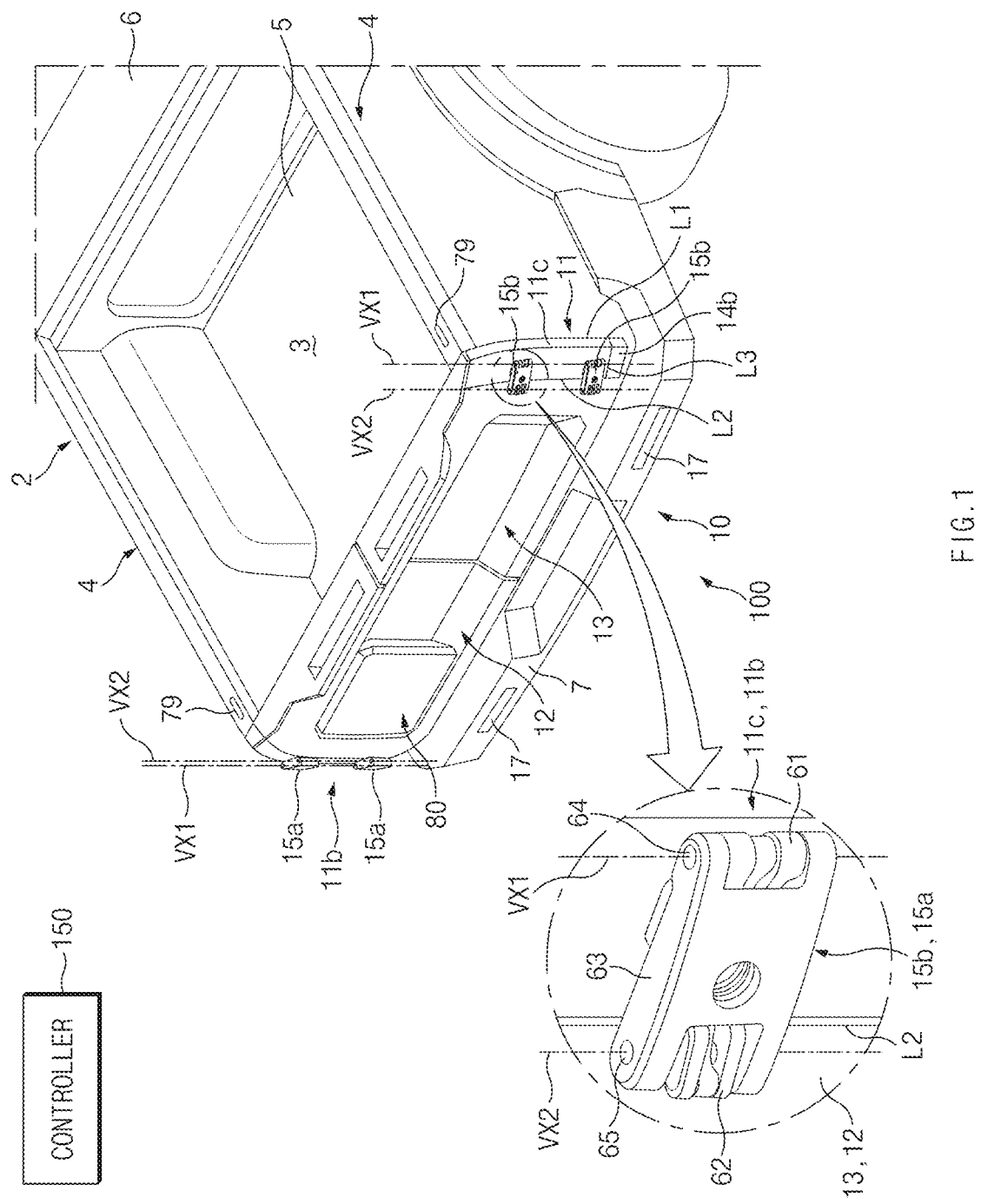
FIG. 1 illustrates a state in which a tailgate is in a closed position in a vehicle tailgate apparatus according to an example embodiment of the present disclosure.

Hereinafter, example embodiments of the present disclosure will be described in detail with reference to the accompanying drawings. In the drawings, same reference numerals can be used throughout to designate same or equivalent elements. A detailed description of well-known techniques associated with the present disclosure can be ruled out to not unnecessarily obscure the gist of the present disclosure.

Terms such as "first," "second," "A," "B," "(a)," and "(b)" may be used to describe elements in example embodiments of the present disclosure. Such terms can be used merely to distinguish one element from another element, and the intrinsic features, sequence or order, and the like of the corresponding elements are not necessarily limited by such terms. Unless otherwise defined, terms used herein, including technical or scientific terms, can have a same meanings as those generally understood by those with ordinary knowledge in the field of art to which the present disclosure belongs. Such terms as those defined in a generally used dictionary can be interpreted as having meanings equal to the contextual meanings in the relevant field of art.

Referring to FIGS. 1 to 4, a vehicle may include a luggage compartment 3 provided on a rear portion of a vehicle body 2. The luggage compartment 3 may be defined by a pair of sidewalls 4 opposing at both rear sides of the vehicle body 2 and a floor or bed 5 located between the pair of sidewalls 4. Each sidewall 4 may be vertically upright at the corresponding rear side of the vehicle body 2, and the pair of sidewalls 4 may oppose each other in a width direction of the vehicle body 2. The pair of sidewalls 4 may define both side surfaces of the luggage compartment 3, and the bed 5 may define a bottom surface of the luggage compartment 3. Each sidewall 4 may have an interior surface facing the luggage compartment 3, an exterior surface facing the outside of the vehicle body 2, and a rear end surface 4a facing the rear of the vehicle body 2.

Figure 5:
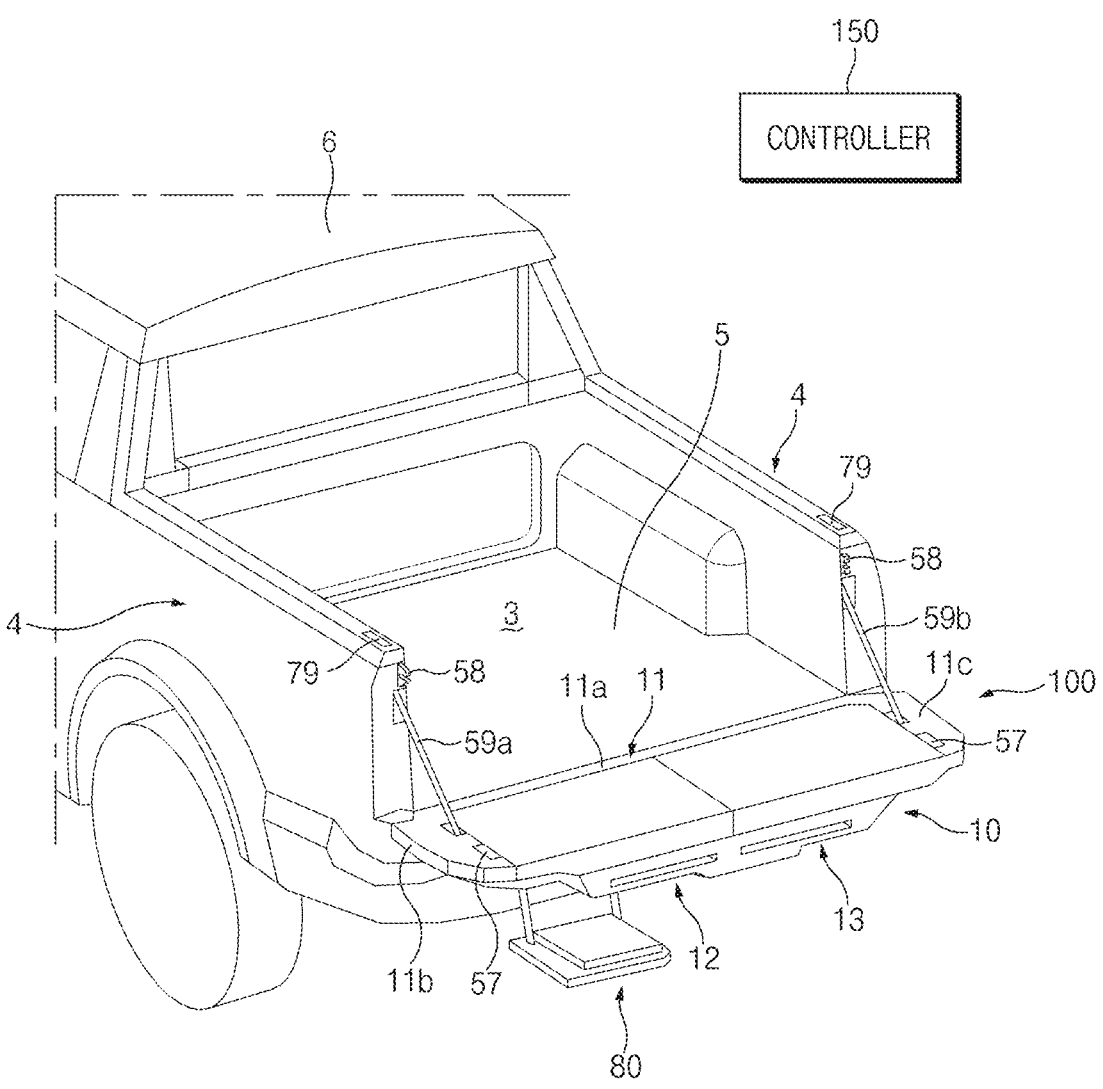
FIG. 5 illustrates the deployment of a step mechanism in a state in which a tailgate is in an open position in a vehicle tailgate apparatus according to an example embodiment of the present disclosure.

Referring to FIG. 5, a cabin 6 for occupants including a driver may be located on a front portion of the vehicle body 2, and the luggage compartment 3 may be located behind the cabin 6.

Referring to FIGS. 1 to 5, a vehicle tailgate apparatus 100 according to an example embodiment of the present disclosure may be mounted on a rear end of the vehicle body 2. The tailgate apparatus 100 may include a tailgate 10 mounted at a rear end of the luggage compartment 3 to open and close. The tailgate 10 may include a main frame 11 aligned with the pair of sidewalls 4 and the bed 5 of the vehicle body 2. The main frame 11 may be pivotally connected to a rear bottom end of the vehicle body 2 by a pair of bottom hinges 14a and 14b.

The main frame 11 may be a U-shaped frame including a bottom portion 11a aligned with the bed 5 of the vehicle body 2, a pair of side portions 11b and 11c extending from both ends of the bottom portion 11a, and an opening defined by the bottom portion 11a and the pair of side portions 11b and 11c. The pair of side portions 11b and 11c may include a first side portion 11b extending from a first end of the bottom portion 11a, and a second side portion 11c extending from a second end of the bottom portion 11a. A longitudinal axis of the bottom portion 11a may extend in the width direction of the vehicle body 2, and a longitudinal axis of the first side portion 11b may be parallel to a longitudinal axis of the second side portion 11c. The longitudinal axis of each of the side portions 11b and 11c may be perpendicular to the longitudinal axis of the bottom portion 11a.

Each of the side portions 11b and 11c may be aligned with the corresponding one of the sidewalls 4 of the vehicle body 2. Exterior surfaces of the pair of side portions 11b and 11c may be aligned with the exterior surfaces of the pair of sidewalls 4 of the vehicle body 2, respectively.

The main frame 11 may be pivotally connected to the bed 5 or the sidewalls 4 of the vehicle body 2 through the pair of bottom hinges 14a and 14b, and each of the bottom hinges 14a and 14b may have a horizontal axis HX extending in the width direction of the vehicle body 2. Both ends of the bottom portion 11a of the main frame 11 may be pivotally connected to the pair of sidewalls 4 through the pair of bottom hinges 14a and 14b. The horizontal axis HX of each of the bottom hinges 14a and 14b may be parallel to or be aligned with the longitudinal axis of the bottom portion 11a. As the main frame 11 pivots around the horizontal axis HX of the bottom hinges 14a and 14b, the main frame 11 of the tailgate 10 may move between a closed position (or an upright position) and an open position (or a horizontal position) at the rear end of the vehicle body 2. That is, the tailgate apparatus 100 may operate in a first mode (a drop-down mode). The pair of bottom hinges 14a and 14b may include a first bottom hinge 14a aligned with a bottom end of the first side portion 11*b* in a longitudinal direction of the first side portion 11*b*, and a second bottom hinge 14*b* aligned with a bottom end of the second side portion 11*c* in a longitudinal direction of the second side portion 11*c*. The first bottom hinge 14*a* may be mounted on the first end of the bottom portion 11*a* and a bottom end of the sidewall 4 corresponding to the first side portion 11*b*, and the second bottom hinge 14*b* may be mounted on the second end of the bottom portion 11*a* and a bottom end of the sidewall 4 corresponding to the second side portion 11*c*.

Figure 2:
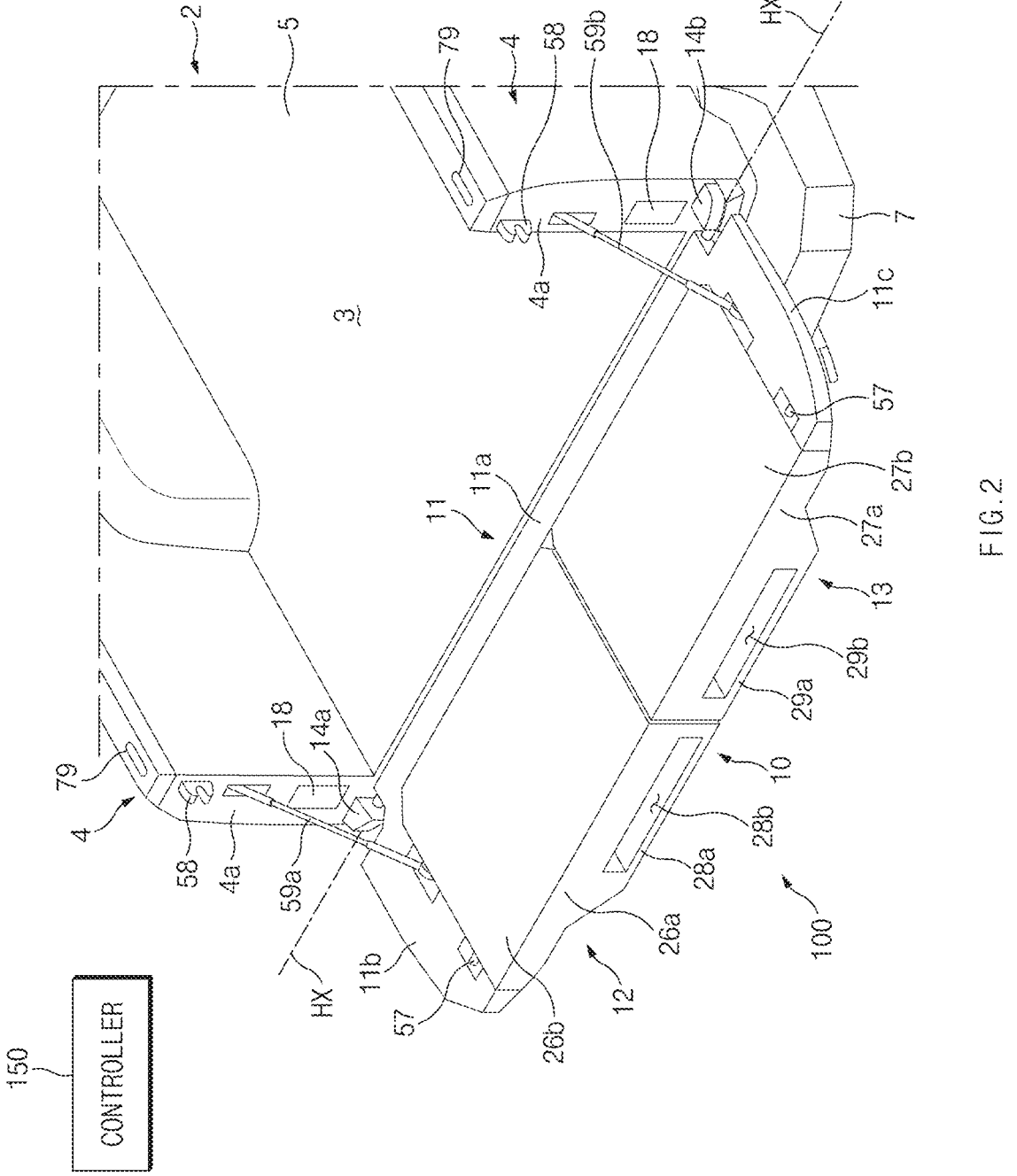
FIG. 2 illustrates a state in which a tailgate is in an open position in a vehicle tailgate apparatus according to an example embodiment of the present disclosure.

Referring to FIG. 1, the closed position (or the upright position) can refer to a position in which the main frame 11 of the tailgate 10 is folded upward at the rear end of the vehicle body 2. When the tailgate 10 is in the closed position, the rear end of the luggage compartment 3 may be covered by the tailgate 10. Referring to FIG. 2, the open position (or the horizontal position) can refer to a position in which the main frame 11 of the tailgate 10 is folded down toward the rear of the vehicle body 2 at the rear end of the vehicle body 2. When the tailgate 10 is in the open position, an interior surface of the tailgate 10 may be substantially flush with the bed 5 of the vehicle body 2. As the tailgate 10 moves to the open position, the rear end of the luggage compartment 3 may be uncovered. As the main frame 11 of the tailgate 10 moves between the closed position and the open position in a drop-down manner through the bottom hinges 14*a* and 14*b*, the tailgate apparatus 100 may operate in the first mode (the drop-down mode). As the tailgate apparatus 100 moves the main frame 11 of the tailgate 10 between the closed position and the open position in the first mode, the tailgate 10 of the tailgate apparatus 100 may function as a drop-down tailgate.

Each of the side portions 11*b* and 11*c* of the main frame 11 may be substantially aligned with the rear end surface 4*a* of the corresponding sidewall 4 of the vehicle body 2. A distance between the pair of side portions 11*b* and 11*c* may be greater than or equal to a distance between the pair of sidewalls 4, and accordingly an opening width of the luggage compartment 3 defined between the sidewalls 4 may be increased.

Referring to FIG. 1, the exterior surface of each of the side portions 11*b* and 11*c* may be aligned with the exterior surface of the corresponding sidewall 4 so that a first parting line L1 between each of the side portions 11*b* and 11*c* of the main frame 11 and the corresponding sidewall 4 of the vehicle body 2 may extend in a height direction of the vehicle body 2. An interior surface of each of the side portions 11*b* and 11*c* may be aligned with the interior surface of the corresponding sidewall 4 or be located at the rear end surface 4*a* of the corresponding sidewall 4 so that a second parting line L2 between each of the side portions 11*b* and 11*c* of the main frame 11 and an outer edge of a corresponding one of doors 12 and 13 may extend in the height direction of the vehicle body 2. The bottom hinges 14*a* and 14*b* may be aligned with the bottom ends of the corresponding side portions 11*b* and 11*c* so that a third parting line L3 between the bottom ends of the side portions 11*b* and 11*c* of the main frame 11 and the corresponding bottom hinges 14*a* and 14*b* may extend in the width direction of the vehicle body 2. Accordingly, the bottom portion 11*a* and the pair of side portions 11*b* and 11*c* of the main frame 11 may not interfere with the luggage compartment 3, and thus the width of the main frame 11 may be maximized to correspond to the width of the vehicle body 2, and the width of the luggage compartment 3 may be relatively increased. In particular, when the tailgate 10 is opened in the first mode, the opening width (or opening area) of the luggage compartment 3 may be maximized. In a state in which the tailgate 10 is in the open position, the tailgate 10 may be horizontally aligned with the bed 5 so that the tailgate 10 may be used for various purposes such as a table and/or an extension of the bed 5.

The tailgate apparatus 100 according to an example embodiment of the present disclosure may include a pair of frame latches 58 and a pair of frame strikers 57 provided between the main frame 11 and the vehicle body 2. The pair of frame latches 58 may be provided on the sidewalls 4 of the vehicle body 2, respectively, and the pair of frame strikers 57 may be provided on the side portions 11*b* and 11*c* of the main frame 11, respectively. The main frame 11 of the tailgate 10 may be locked to and unlocked from the sidewalls 4 of the vehicle body 2 by the pair of frame latches 58 and the pair of frame strikers 57. As each frame latch 58 can be configured to lock the corresponding frame striker 57, the main frame 11 of the tailgate 10 may be held in the closed position, and as each frame latch 58 unlocks the corresponding frame striker 57, the main frame 11 of the tailgate 10 may be allowed to move.

Referring to FIG. 2, the frame latches 58 may be provided on the corresponding sidewalls 4 of the vehicle body 2, and the frame strikers 57 may be provided on the corresponding side portions 11*b* and 11*c* of the main frame 11. As the frame latch 58 can be provided on each sidewall 4 of the vehicle body 2, and the frame striker 57 can be provided on each of the side portions 11*b* and 11*c* of the main frame 11, the frame latch 58 and the frame striker 57 may be compactly provided between each sidewall 4 of the vehicle body 2 and the corresponding one of the side portions 11*b* and 11*c* of the main frame 11, and locking stiffness of the frame latch 58 and the frame striker 57 may be improved. A width of the sidewall 4 of the vehicle body 2 and a width of each of the side portions 11*b* and 11*c* of the main frame 11 may be relatively reduced, and the width of the luggage compartment 3 may be relatively increased. Furthermore, when the tailgate 10 is closed, the frame latches 58 and the frame strikers 57 may be not exposed to the outside due to the side portions 11*b* and 11*c* of the main frame 11 so that the appearance of the tailgate may be improved.

According to an example embodiment, the frame latch 58 may be a power latch configured to lock and unlock the frame striker 57 with the use of an electric motor. The frame latch 58 may be configured to perform cinching to switch from a partially locked state to a fully locked state by the electric motor. The fully locked state can refer to a state in which the frame latch 58 fully locks the frame striker 57 so that the tailgate 10 may be held in the fully closed position. The fully locked state may be sensed by a first lock sensor 101 (see FIG. 56) provided on the frame latch 58. The partially locked state can refer to a state in which the frame latch 58 partially locks the frame striker 57 so that the tailgate 10 may be held in the partially closed position. The partially locked state may be sensed by a second lock sensor 102 (see FIG. 56) provided on the frame latch 58.

Figure 6:
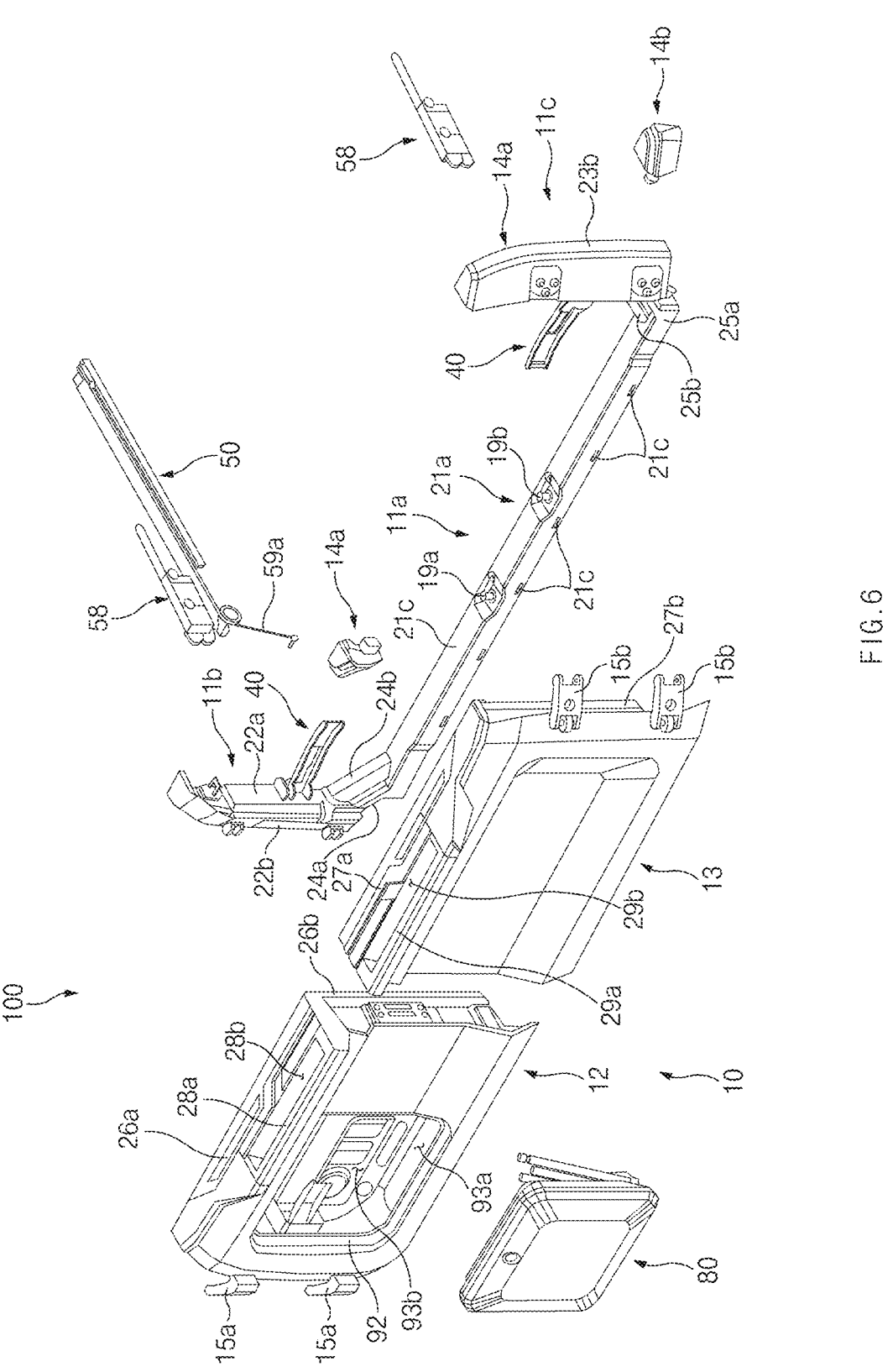
FIG. 6 illustrates an exploded perspective view of a tailgate in a vehicle tailgate apparatus according to an example embodiment of the present disclosure.

Referring to FIG. 2, when the tailgate 10 is in the open position in the first mode, the tailgate 10 may be supported by a pair of cables 59*a* and 59*b*. The cables 59*a* and 59*b* may be connected between the corresponding sidewalls 4 and the corresponding side portions 11*b* and 11*c* of the main frame 11. Referring to FIGS. 2, 5, and 6, the pair of cables 59*a* and 59*b* may include a first cable 59*a* connected to the first side portion 11*b* of the main frame 11, and a second cable 59*b* connected to the second side portion 11*c* of the main frame 11.

A tailgate 10 according to an example embodiment of the present disclosure may include the pair of doors 12 and 13 pivotally connected to the main frame 11. The pair of doors 12 and 13 may be disposed in the opening of the main frame 11, and the pair of doors 12 and 13 may be pivotally connected to the pair of side portions 11*b* and 11*c* of the main frame 11, respectively. Accordingly, the pair of doors 12 and 13 may be allowed to swing in the opening of the main frame 11 through side hinges 15*a* and 15*b*.

The pair of doors 12 and 13 may include a first door 12 pivotally connected to the first side portion 11*b* of the main frame 11 through a first side hinge 15*a*, and a second door 13 pivotally connected to the second side portion 11*c* of the main frame 11 through a second side hinge 15*b*. The first door 12 and the second door 13 may be configured to pivot simultaneously or independently of each other. For example, the first door 12 and the second door 13 may have the same size or different sizes.

The plurality of first side hinges 15*a* may pivotally connect the first door 12 and the first side portion 11*b* of the main frame 11, and the plurality of second side hinges 15*b* may pivotally connect the second door 13 and the second side portion 11*c* of the main frame 11.

Each of the side hinges 15*a* and 15*b* may have a first vertical axis VX1 and a second vertical axis VX2 extending in the height direction of the vehicle body 2. The first vertical axis VX1 may be adjacent to the sidewall 4 of the vehicle body 2, and the second vertical axis VX2 may be adjacent to each of the doors 12 and 13. The second vertical axis VX2 may be parallel to the first vertical axis VX1. According to an example embodiment, each of the side hinges 15*a* and 15*b* may be a double action hinge or a wide angle hinge.

Figure 3:
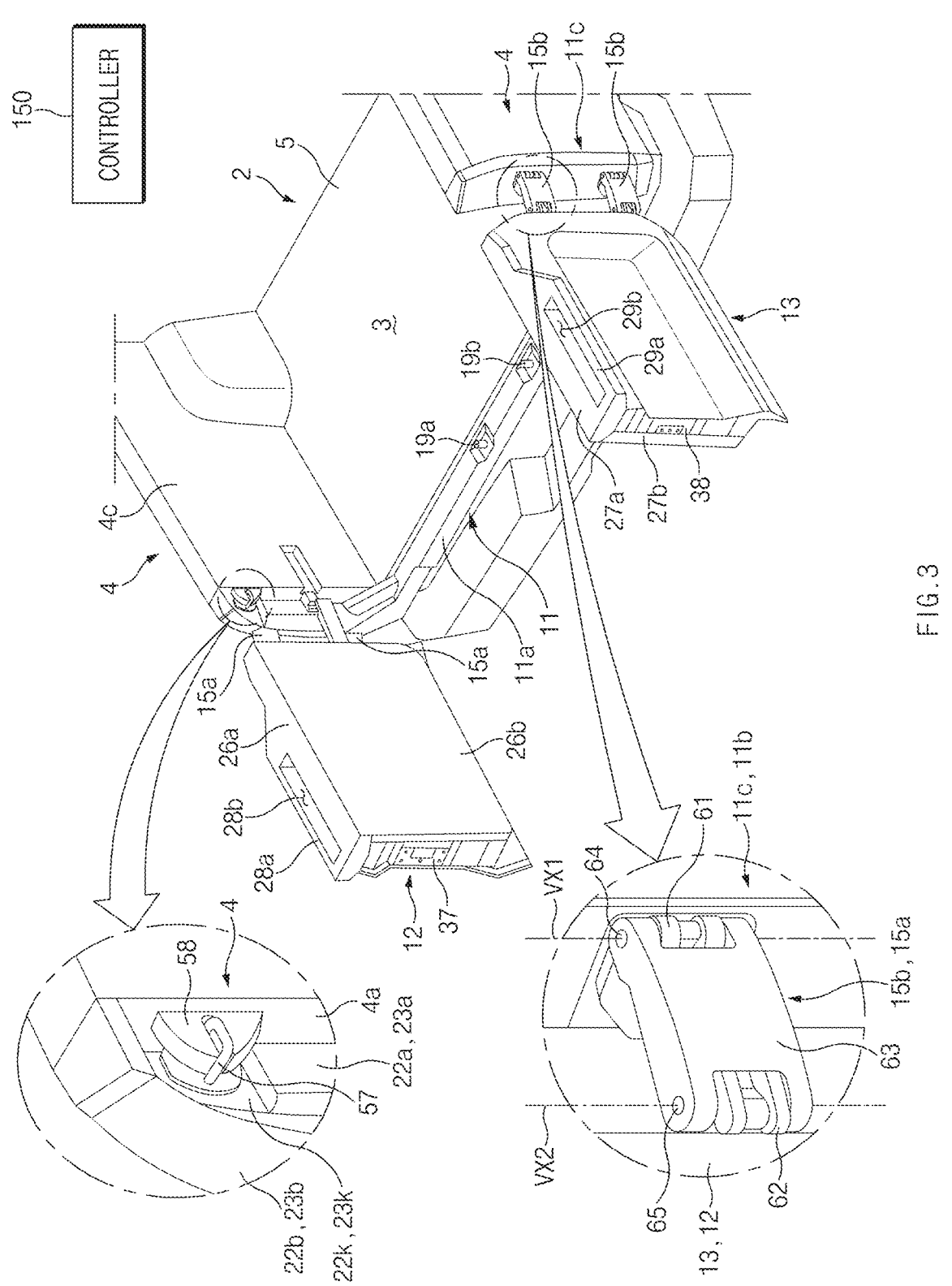
FIG. 3 illustrates a state in which a first door and a second door are in a first open position with a main frame of a tailgate in a closed position in a vehicle tailgate apparatus according to an example embodiment of the present disclosure.

Referring to FIGS. 1 and 3, each of the side hinges 15*a* and 15*b* may include a frame-side hinge bracket 61 mounted on each of the side portions 11*b* and 11*c* of the main frame 11, a door-side hinge bracket 62 mounted on each of the doors 12 and 13, and a hinge arm 63 pivotally connected to the frame-side hinge bracket 61 and the door-side hinge bracket 62. A first end portion of the hinge arm 63 may be pivotally connected to the frame-side hinge bracket 61 through a first hinge pin 64, and a second end portion of the hinge arm 63 may be pivotally connected to the door-side hinge bracket 62 through a second hinge pin 65. The first vertical axis VX1 may extend along a longitudinal axis of the first hinge pin 64, and the second vertical axis VX2 may extend along a longitudinal axis of the second hinge pin 65.

As the first door 12 pivots around the first vertical axis VX1 of the first side hinge 15*a*, the first door 12 may move between a closed position (see FIG. 1) and a first open position (see FIG. 3). Referring to FIG. 1, the closed position can refer to a position in which the main frame 11 of the tailgate 10 is in the closed position, and the first door 12 can be perpendicular to the sidewall 4 connected thereto. When the first door 12 is in the closed position, one portion of the opening of the main frame 11 may be covered by the first door 12. Referring to FIG. 3, the first open position can refer to a position in which the main frame 11 of the tailgate 10 is in the closed position, and the first door 12 can be aligned with the sidewall 4 connected thereto in a longitudinal direction of the vehicle body 2 behind the sidewall 4. When the first door 12 is in the first open position, the first door 12 may open at a first angle (for example, up to 90°) from one portion of the opening of the main frame 11.

As the second door 13 pivots around the first vertical axis VX1 of the second side hinge 15*b*, the second door 13 may move between a closed position (see FIG. 1) and a first open position (see FIG. 3). Referring to FIG. 1, the closed position can refer to a position in which the main frame 11 of the tailgate 10 is in the closed position, and the second door 13 can be perpendicular to the sidewall 4 connected thereto. When the second door 13 is in the closed position, the other portion of the opening of the main frame 11 may be covered by the second door 13. Referring to FIG. 3, the first open position can refer to a position in which the main frame 11 of the tailgate 10 is in the closed position, and the second door 13 can be aligned with the sidewall 4 connected thereto in the longitudinal direction of the vehicle body 2 behind the sidewall 4. When the second door 13 is in the first open position, the second door 13 may open at a first angle (for example, up to 90°) from the other portion of the opening of the main frame 11.

As the first door 12 pivots on the first vertical axis VX1 of the first side hinge 15*a* to move between the closed position and the first open position, and the second door 13 pivots on the first vertical axis VX1 of the second side hinge 15*b* to move between the closed position and the first open position, the tailgate apparatus 100 may operate in a second mode (a first swing mode).

Figure 4:
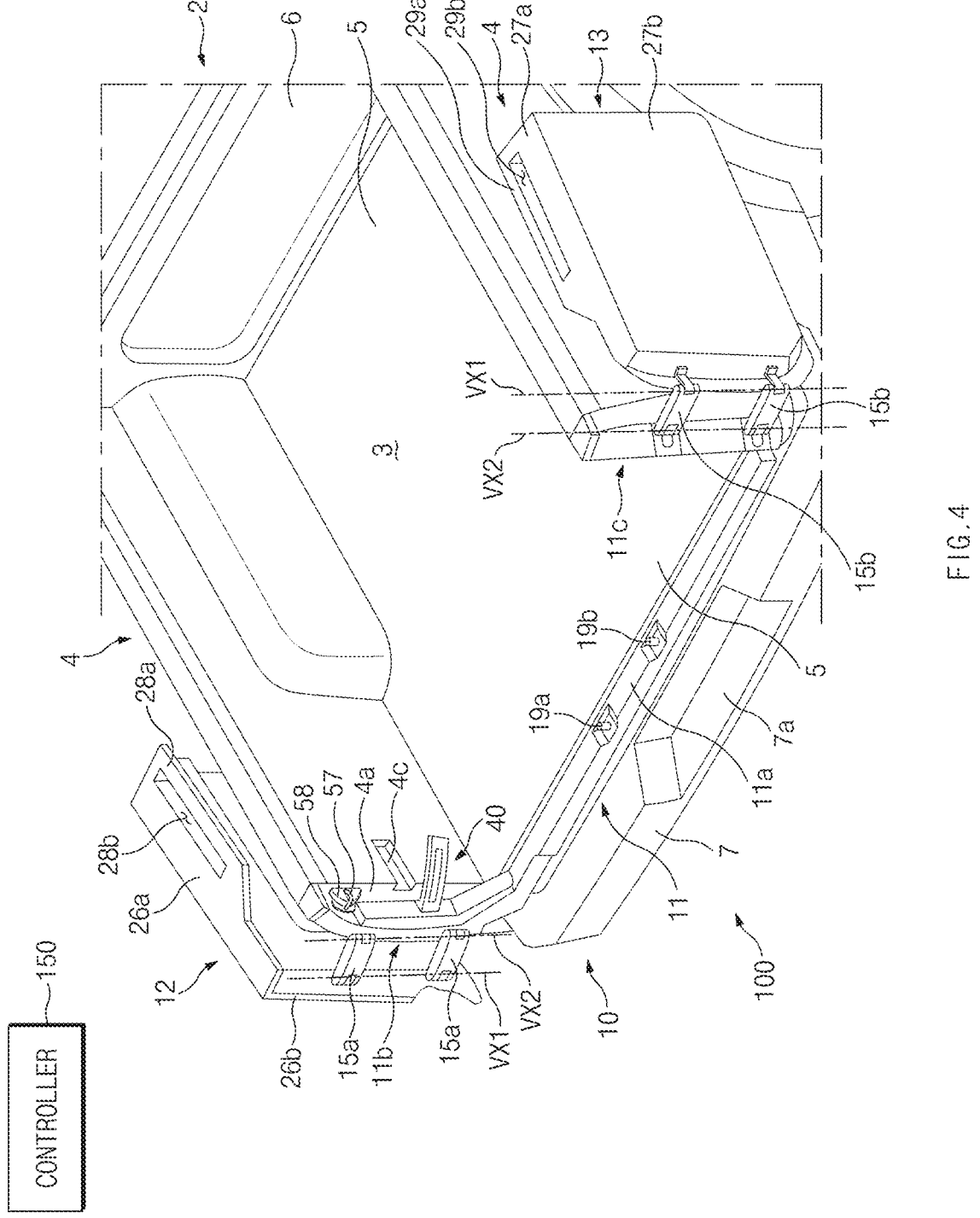
FIG. 4 illustrates a state in which a first door and a second door are in a second open position with a main frame of a tailgate in a closed position in a vehicle tailgate apparatus according to an example embodiment of the present disclosure.

As the first door 12 pivots around the first vertical axis VX1 and the second vertical axis VX2 of the first side hinge 15*a*, the first door 12 may move between the first open position (see FIG. 3) and a second open position (see FIG. 4). Referring to FIG. 4, the second open position can refer to a position in which the main frame 11 of the tailgate 10 is in the closed position, and the first door 12 can be folded toward the exterior surface of the sidewall 4 connected thereto so that the first door 12 may be overlapped with the exterior surface of the sidewall 4 connected thereto. In particular, the first door 12 in the second open position may be substantially parallel to the sidewall 4 connected thereto. When the first door 12 is in the second open position, the first door 12 may open at a second angle (for example, up to 270°) from one portion of the opening of the main frame 11. The second angle can refer to an angle that prevents the first door 12 from interfering with a wheel housing of the sidewall 4. As the first door 12 pivots around the first vertical axis VX1 of the first side hinge 15*a*, the first door 12 may move from the closed position to the first open position. Then, as the hinge arm 63 of the first side hinge 15*a* primarily pivots around the first vertical axis VX1 toward the outside of the vehicle body 2, and the first door 12 secondarily pivots around the second vertical axis VX2 of the first side hinge 15*a*, the first door 12 may move from the first open position to the second open position.

As the second door 13 pivots around the first vertical axis VX1 and the second vertical axis VX2 of the second side hinge 15*b*, the second door 13 may move between the first open position (see FIG. 3) and a second open position (see FIG. 4). Referring to FIG. 4, the second open position can refer to a position in which the main frame 11 of the tailgate 10 is in the closed position, and the second door 13 can be folded toward the exterior surface of the sidewall 4 connected thereto so that the second door 13 may be overlapped with the exterior surface of the sidewall 4 connected thereto. In particular, the second door 13 in the second open position may be substantially parallel to the sidewall 4 connected thereto. When the second door 13 is in the second open position, the second door 13 may open at a second angle (for example, up to 270°) from the other portion of the opening of the main frame 11. The second angle can refer to an angle that prevents the second door 13 from interfering with a wheel housing of the sidewall 4. As the second door 13 pivots around the first vertical axis VX1 of the second side hinge 15*b*, the second door 13 may move from the closed position to the first open position. Then, as the hinge arm 63 of the second side hinge 15*b* primarily pivots around the first vertical axis VX1 toward the outside of the vehicle body 2, and the second door 13 secondarily pivots around the second vertical axis VX2 of the second side hinge 15*b*, the second door 13 may move from the first open position to the second open position.

As the first door 12 pivots on the first vertical axis VX1 and the second vertical axis VX2 of the first side hinge 15*a* to move between the first open position and the second open position, and the second door 13 pivots on the first vertical axis VX1 and the second vertical axis VX2 of the second side hinge 15*b* to move between the first open position and the second open position, the tailgate apparatus 100 may operate in a third mode (a second swing mode).

Each of the side hinges 15*a* and 15*b* may use the two vertical axes VX1 and VX2 so that each of the doors 12 and 13 may move along an elliptical swing path. Accordingly, the swing path of each of the doors 12 and 13 may be relatively compact, which can facilitate the opening and closing of the doors 12 and 13 in a narrow space. When each of the doors 12 and 13 moves to the second open position, each of the doors 12 and 13 may be overlapped with the exterior surface of the corresponding sidewall 4, and each of the doors 12 and 13 may not be located behind the rear of the vehicle body 2 so that space utilization at the rear of the vehicle may be improved.

As described above, as the tailgate apparatus 100 operates in the second mode (the first swing mode) and the third mode (the second swing mode), the tailgate 10 of the tailgate apparatus 100 may function as a split tailgate.

Referring to FIG. 1, the vehicle body 2 may have a rear bumper 7 located below the bed 5, and a pair of main lamps 17 may be provided on the rear bumper 7. Each main lamp 17 may provide signals for the vehicle's stop, direction change, lane change, the like, or any combination thereof.

Referring to FIG. 2, a pair of auxiliary lamps 18 may be provided on the rear end surfaces 4*a* of the pair of sidewalls 4. Because the main lamps 17 of the rear bumper 7 can be covered by the tailgate 10 in a state in which the tailgate 10 moves to the open position (or the horizontal position) in the first mode, the pair of auxiliary lamps 18 may provide signals for the vehicle's stop, direction change, lane change, the like, or any combination thereof.

FIGS. 1 to 5 illustrate a pick-up truck to which the tailgate apparatus 100 according to example embodiments of the present disclosure is applied. However, the tailgate apparatus 100 according to example embodiments of the present disclosure may not only be limited to pick-up trucks, but may also be applied to the luggage compartment 3 of various types of vehicles such as a sport utility vehicle (SUV) and/or a van.

Figure 7:
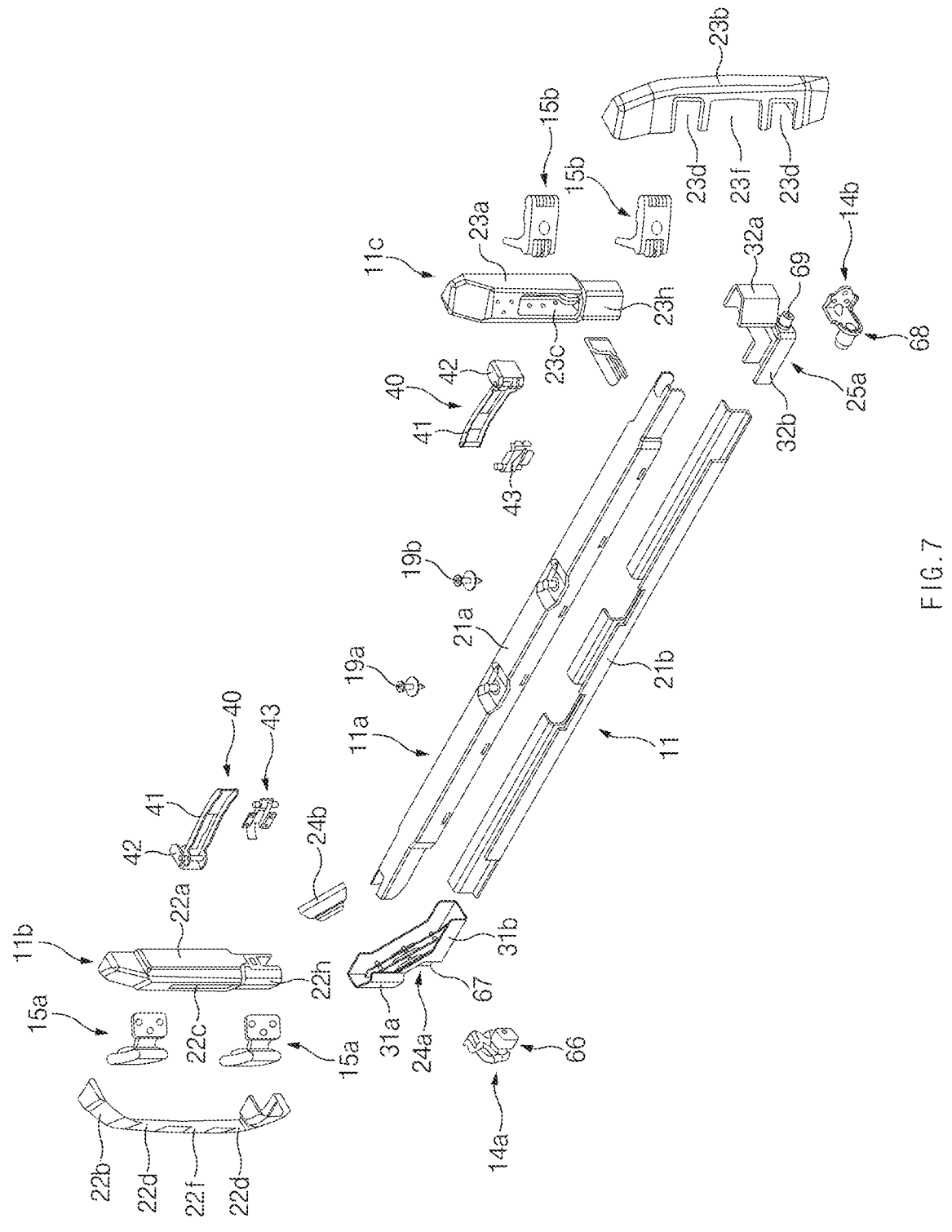
FIG. 7 illustrates an exploded perspective view of a main frame in a vehicle tailgate apparatus according to an example embodiment of the present disclosure.

Referring to FIG. 7, the bottom portion 11*a* may include a bottom member 21*a* having a cavity that can open downward, and a reinforcing member 21*b* having a cavity that can open upward. The bottom member 21*a* and the reinforcing member 21*b* may extend in a longitudinal direction of the bottom portion 11*a*.

Figure 8:
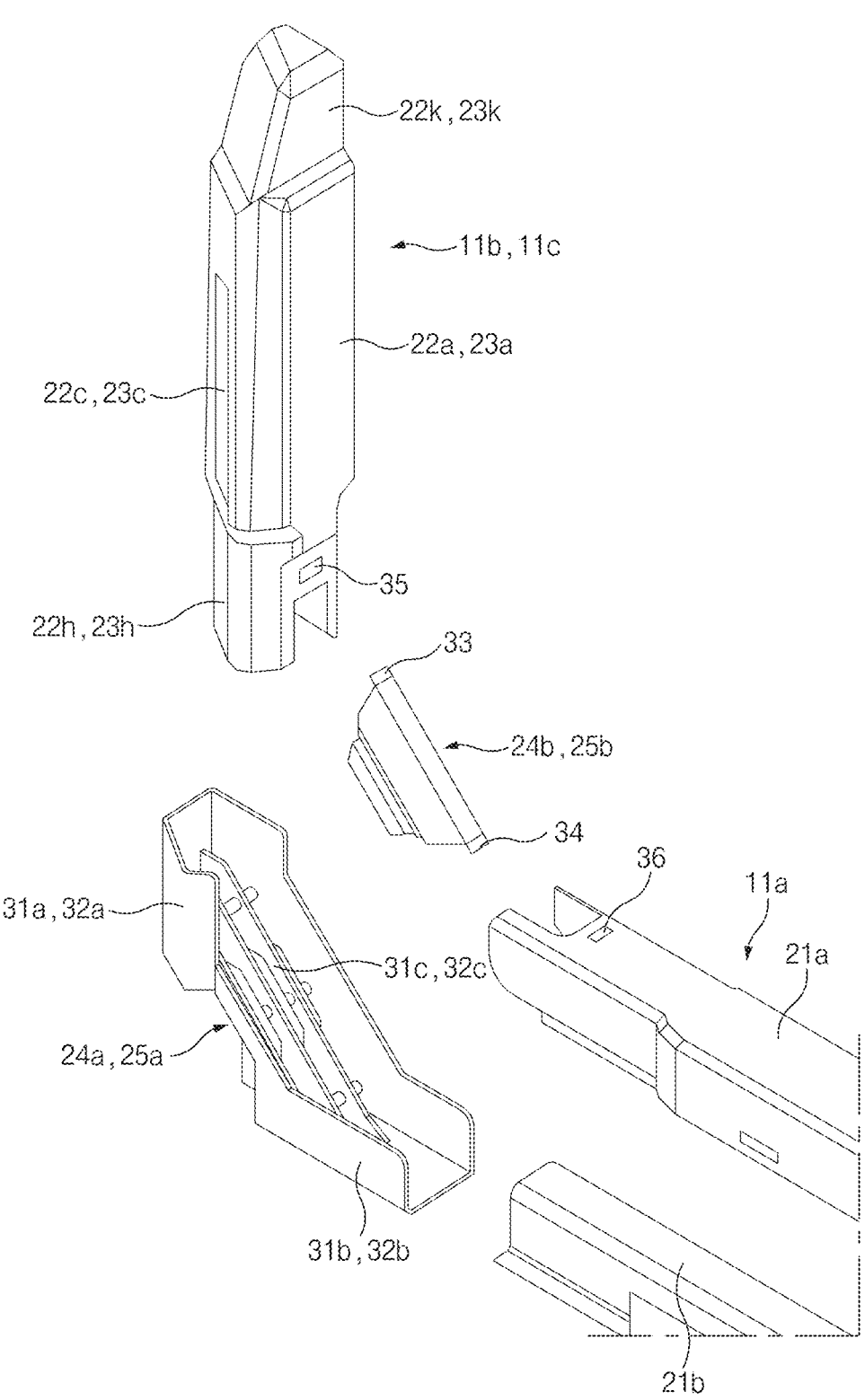
FIG. 8 illustrates an exploded perspective view of a side portion, a connection member, a cover member, and a bottom portion of a main frame in a vehicle tailgate apparatus according to an example embodiment of the present disclosure.
Figure 10:
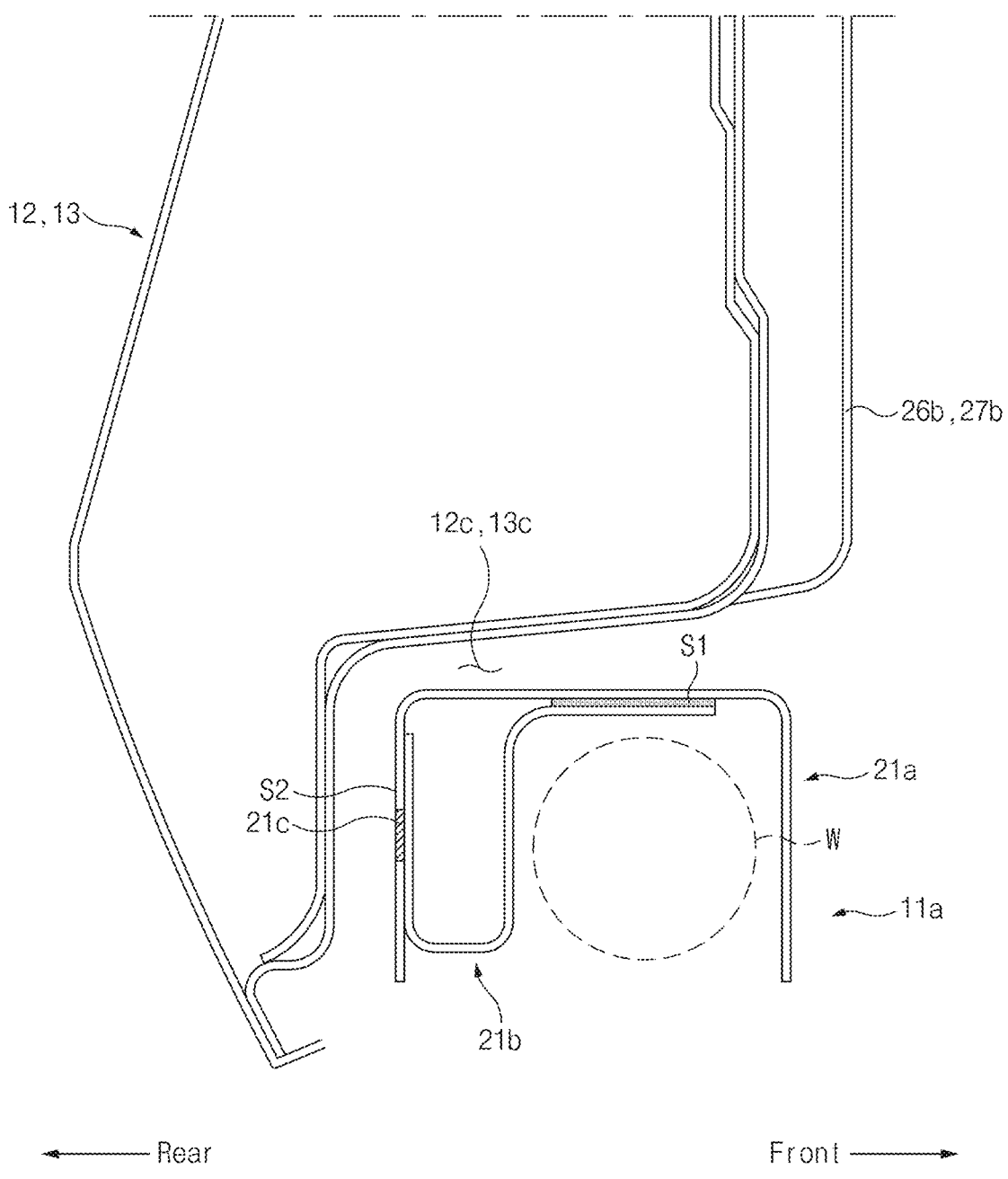
FIG. 10 illustrates a cross-sectional view, taken along line A-A of FIG. 9.

Referring to FIG. 8, the bottom member 21*a* may have a channel-shaped cross section that can open downward, and the cavity of the bottom member 21*a* may extend in the longitudinal direction of the bottom portion 11*a*. The reinforcing member 21*b* may have a channel-shaped cross section that can open upward, and the cavity of the reinforcing member 21*b* may extend in the longitudinal direction of the bottom portion 11*a*. The reinforcing member 21*b* may be fixed to the bottom member 21*a*. Referring to FIG. 10, a top wall of the bottom member 21*a* and a top wall of the reinforcing member 21*b* may be fixed by a first welded portion S1. For example, the first welded portion S1 may be a spot-welded portion. A rear wall of the bottom member 21*a* and a rear wall of the reinforcing member 21*b* may be fixed by a second welded portion S2. For example, the second welded portion S2 may be a plug-welded portion or slot-welded portion that fixes the rear wall of the bottom member 21*a* and the rear wall of the reinforcing member 21*b* through a hole or slot 21*c* of the bottom member 21*a*. The reinforcing member 21*b* may be fixed to the top wall and rear wall of the bottom member 21*a* in the cavity of the bottom member 21*a* so that stiffness of the bottom portion 11*a* may be improved. The bottom member 21*a* and the reinforcing member 21*b* may form a space through which a wire loom or wires W can extend within the cavities thereof.

Referring to FIG. 7, the first side portion 11*b* may include a first side member 22*a* and a first side molding 22*b* attached to an exterior surface of the first side member 22*a*. The first side member 22*a* may extend in the longitudinal direction of the first side portion 11*b*, and the first side molding 22*b* may extend in the longitudinal direction of the first side portion 11*b*. The first side member 22*a* may be covered by the first side molding 22*b* so that the appearance of the first side portion 11*b* may be improved. The first side molding 22*b* may have an opening 22*d* in which a portion (corresponding to the frame-side hinge bracket 61 of FIG. 12) of the first side hinge 15*a* can be received, and the portion of the first side hinge 15*a* may be attached to the first side member 22*a*. According to an example embodiment, portions of two first side hinges 15*a* may be attached to the first side member 22*a*, and the first side molding 22*b* may have two openings 22*d* in which the portions of the two first side hinges 15*a* can be received, respectively. The first side member 22*a* may have a cavity defined therein, and an auxiliary lamp (not shown) may be embedded in the cavity of the first side member 22*a*. The first side member 22*a* may have an opening 22*c* communicating with the cavity thereof. The first side molding 22*b* may have an opening 22*f* aligned with the opening 22*c* of the first side member 22*a*. The auxiliary lamp embedded in the cavity of the first side member 22*a* may be exposed to the outside through the opening 22*c* of the first side member 22*a* and the opening 22*f* of the first side molding 22*b*.

Referring to FIG. 7, the second side portion 11*c* may include a second side member 23*a* and a second side molding 23*b* attached to an exterior surface of the second side member 23*a*. The second side member 23*a* may extend in the longitudinal direction of the second side portion 11*c*, and the second side molding 23*b* may extend in the longitudinal direction of the second side portion 11*c*. The second side member 23*a* may be covered by the second side molding 23*b* so that the appearance of the second side portion 11*c* may be improved. The second side molding 23*b* may have an opening 23*d* in which a portion (corresponding to the frame-side hinge bracket 61 of FIG. 12) of the second side hinge 15*b* can be received, and the portion of the second side hinge 15*b* may be attached to the second side member 23*a*. According to an example embodiment, portions of two second side hinges 15*b* may be attached to the second side member 23*a*, and the second side molding 23*b* may have two openings 23*d* in which the portions of the two second side hinges 15*b* are received, respectively. The second side member 23*a* may have a cavity defined therein, and an auxiliary lamp (not shown) may be embedded in the cavity of the second side member 23*a*. The second side member 23*a* may have an opening 23*c* communicating with the cavity thereof. The second side molding 23*b* may have an opening 23*f* aligned with the opening 23*c* of the second side member 23*a*. The auxiliary lamp embedded in the cavity of the second side member 23*a* may be exposed to the outside through the opening 23*c* of the second side member 23*a* and the opening 23*f* of the second side molding 23*b*.

Referring to FIGS. 3 and 8, the first side member 22*a* may have a recessed portion 22*k* provided in an upper portion thereof, and the second side member 23*a* may have a recessed portion 23*k* provided in an upper portion thereof. Referring to FIG. 3, the frame strikers 57 may be mounted on the recessed portions 22*k* and 23*k* of the corresponding side members 22*a* and 23*a*, respectively. When the doors 12 and 13 are opened and closed, the recessed portions 22*k* and 23*k* may prevent the doors 12 and 13 from interfering with the frame strikers 57.

Referring to FIGS. 6 and 7, the main frame 11 may include a pair of connection members 24*a* and 25*a* connecting the pair of side portions 11*b* and 11*c* to both ends of the bottom portion 11*a*, respectively. The pair of connection members 24*a* and 25*a* may include a first connection member 24*a* connecting the first side portion 11*b* and the first end of the bottom portion 11*a*, and a second connection member 25*a* connecting the second side portion 11*c* and the second end of the bottom portion 11*a*.

The first connection member 24*a* may be configured to connect the bottom member 21*a* of the bottom portion 11*a* and the first side member 22*a* of the first side portion 11*b*. The first connection member 24*a* may be inclined at a predetermined angle between the bottom end of the first side portion 11*b* and the first end of the bottom portion 11*a*, and the first connection member 24*a* may have a plurality of ribs 31*c* provided therein so that stiffness of the first connection member 24*a* may be improved.

The first connection member 24*a* may have an upper receiving portion 31*a* in which a lower end portion 22*h* of the first side member 22*a* can be received, and a lower receiving portion 31*b* in which a first end portion of the bottom member 21*a* can be received. The upper receiving portion 31*a* of the first connection member 24*a* may have a shape and a size corresponding to those of the lower end portion 22*h* of the first side member 22*a*, and the lower receiving portion 31*b* of the first connection member 24*a* may have a shape and a size corresponding to those of the first end portion of the bottom member 21*a*. The upper receiving portion 31*a* of the first connection member 24*a* and the lower end portion 22*h* of the first side member 22*a* may be joined by a plurality of fasteners, and the lower receiving portion 31*b* of the first connection member 24*a* and the first end portion of the bottom member 21*a* may be joined by a plurality of fasteners.

The first connection member 24*a* may be made of a material different from that of the first side member 22*a* and the bottom member 21*a*. The stiffness of the first connection member 24*a* may be similar to stiffness of the first side member 22*a* and stiffness of the bottom member 21*a*, and a weight of the first connection member 24*a* may be less than a weight of the first side member 22*a* and a weight of the bottom member 21*a*. According to an example embodiment, the first connection member 24*a* may be made of an aluminum material, and the first side member 22*a* and the bottom member 21*a* may be made of a steel material. The first connection member 24*a* may be an aluminum die-cast component manufactured by a die-casting method. The first connection member 24*a*, the first side member 22*a*, and the bottom member 21*a* made of different materials may be firmly connected through the fasteners.

The second connection member 25*a* may be configured to connect the bottom member 21*a* of the bottom portion 11*a* and the second side member 23*a* of the second side portion 11*c*. The second connection member 25*a* may be inclined at a predetermined angle between the bottom end of the second side portion 11*c* and the second end of the bottom portion 11*a*, and the second connection member 25*a* may have a plurality of ribs 32*c* provided therein so that stiffness of the second connection member 25*a* may be improved.

The second connection member 25*a* may include an upper receiving portion 32*a* in which a lower end portion 23*h* of the second side member 23*a* can be received, and a lower receiving portion 32*b* in which a second end portion of the bottom member 21*a* can be received. The upper receiving portion 32*a* of the second connection member 25*a* may have a shape and a size corresponding to those of the lower end portion 23*h* of the second side member 23*a*, and the lower receiving portion 32*b* of the second connection member 25*a* may have a shape and a size corresponding to those of the second end portion of the bottom member 21*a*. The upper receiving portion 32*a* of the second connection member 25*a* and the lower end portion 23*h* of the second side member 23*a* may be joined by a plurality of fasteners, and the lower receiving portion 32*b* of the second connection member 25*a* and the second end portion of the bottom member 21*a* may be joined by a plurality of fasteners.

The second connection member 25*a* may be made of a material different from that of the second side member 23*a* and the bottom member 21*a*. The stiffness of the second connection member 25*a* may be similar to stiffness of the second side member 23*a* and stiffness of the bottom member 21*a*, and a weight of the second connection member 25*a* may be less than a weight of the second side member 23*a* and a weight of the bottom member 21*a*. According to an example embodiment, the second connection member 25*a* may be made of an aluminum material, and the second side member 23*a* and the bottom member 21*a* may be made of a steel material. The second connection member 25*a* may be an aluminum die-cast component manufactured by a die-casting method. The second connection member 25*a*, the second side member 23*a*, and the bottom member 21*a* made of different materials may be firmly connected through the fasteners.

The first connection member 24*a* may have a cavity which can open upward, and the cavity of the first connection member 24*a* may communicate with the cavity of the first side member 22*a* and the cavity of the bottom member 21*a*. The second connection member 25*a* may have a cavity which can open upward, and the cavity of the second connection member 25*a* may communicate with the cavity of the second side member 23*a* and the cavity of the bottom member 21*a*. Accordingly, the cavity of the first side portion 11*b*, the cavity of the bottom portion 11*a*, and the cavity of the second side portion 11*c* may communicate with each other so that the wire may extend through the cavity of the first side portion 11*b*, the cavity of the bottom portion 11*a*, and the cavity of the second side portion 11*c*, and the wire may be electrically connected to the auxiliary lamps embedded in the first side member 22*a* and the second side member 23*a*. That is, the main frame 11 may include a wiring path defined therein.

The main frame 11 may include a pair of cover members 24*b* and 25*b* covering the pair of connection members 24*a* and 25*a*, respectively. The pair of cover members 24*b* and 25*b* may include a first cover member 24*b* covering the top of the first connection member 24a, and a second cover member 25b covering the top of the second connection member 25a.

Referring to FIG. 8, the cover members 24b and 25b may extend obliquely at an inclination angle corresponding to that of the corresponding connection members 24a and 25a. Each of the cover members 24b and 25b may include an upper projection 33 protruding to the corresponding one of the side members 22a and 23a, and a lower projection 34 extending toward the corresponding end portion of the bottom member 21a. Each of the side members 22a and 23a may have a hole 35 in which the upper projection 33 can be received, and each end portion of the bottom member 21a may have a hole 36 in which the lower projection 34 can be received. Accordingly, the upper projection 33 of each of the cover members 24b and 25b may be inserted into the hole 35 of the corresponding one of the side members 22a and 23a, and the lower projection 34 of each of the cover members 24b and 25b may be inserted into the hole 36 of the corresponding end portion of the bottom member 21a so that the cover members 24b and 25b may be temporarily joined between the corresponding side members 22a and 23a and the corresponding end portions of the bottom member 21a. Upper and lower end portions of the cover members 24b and 25b temporarily joined may be fixed to the corresponding side members 22a and 23a and the corresponding end portions of the bottom member 21a by $CO_2$ welding and/or the like.

Referring to FIG. 10, the doors 12 and 13 may have recessed portions 12c and 13c provided in lower end portions thereof, respectively. When the doors 12 and 13 are closed, the bottom portion 11a of the main frame 11 may be received in the recessed portions 12c and 13c of the doors 12 and 13, and accordingly the bottom portion 11a of the main frame 11 may be covered by the lower end portions of the doors 12 and 13.

The tailgate apparatus 100 according to an example embodiment of the present disclosure may include a pair of lower latches 109a and 109b (see FIG. 56) and a pair of lower strikers 19a and 19b provided between the lower end portions of the pair of doors 12 and 13 and the main frame 11, respectively. A first lower latch 109a may be provided on the lower end portion of the first door 12, and a first lower striker 19a may be provided on the bottom portion 11a of the main frame 11. The first lower latch 109a may lock the first lower striker 19a so that the first door 12 may be held in the closed position, and the first lower latch 109a may unlock the first lower striker 19a so that the first door 12 may be allowed to open. A second lower latch 109b may be provided on the lower end portion of the second door 13, and a second lower striker 19b may be provided on the bottom portion 11a of the main frame 11. The second lower latch 109b may lock the second lower striker 19b so that the second door 13 may be held in the closed position, and the second lower latch 109b may unlock the second lower striker 19b so that the second door 13 may be allowed to open. Referring to FIGS. 6 and 7, the first lower striker 19a and the second lower striker 19b may be symmetrical to each other on the basis of the center of the bottom portion 11a of the main frame 11.

The first bottom hinge 14a may include a first hinge mount 66 provided on the vehicle body 2, and a first hinge socket 67 provided on the main frame 11.

Figure 13:
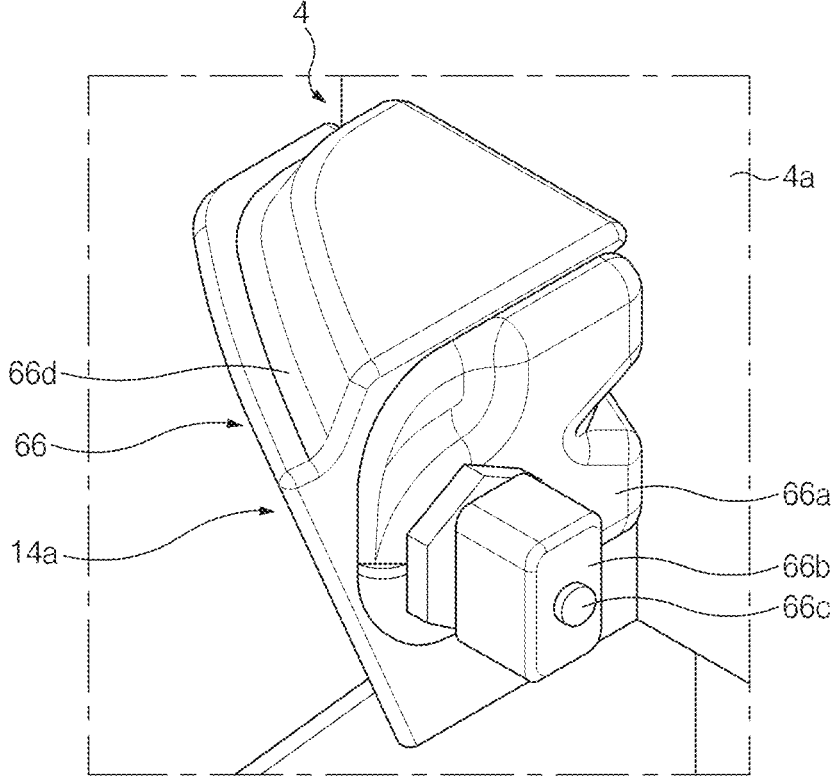
FIG. 13 illustrates a first hinge mount of a first bottom hinge mounted on a sidewall of a vehicle body in a vehicle tailgate apparatus according to an example embodiment of the present disclosure.

Referring to FIG. 13, the first hinge mount 66 may include a first bracket 66a fixed to a bottom end of the rear end surface 4a of the corresponding sidewall 4 (corresponding to the left sidewall of FIG. 2) of the vehicle body 2, a first hinge shaft 66b rotatably mounted on the first bracket 66a through a pin 66c, and a first hinge cover 66d covering the first bracket 66a. The first hinge shaft 66b may have a hexahedral shape.

Figure 14:
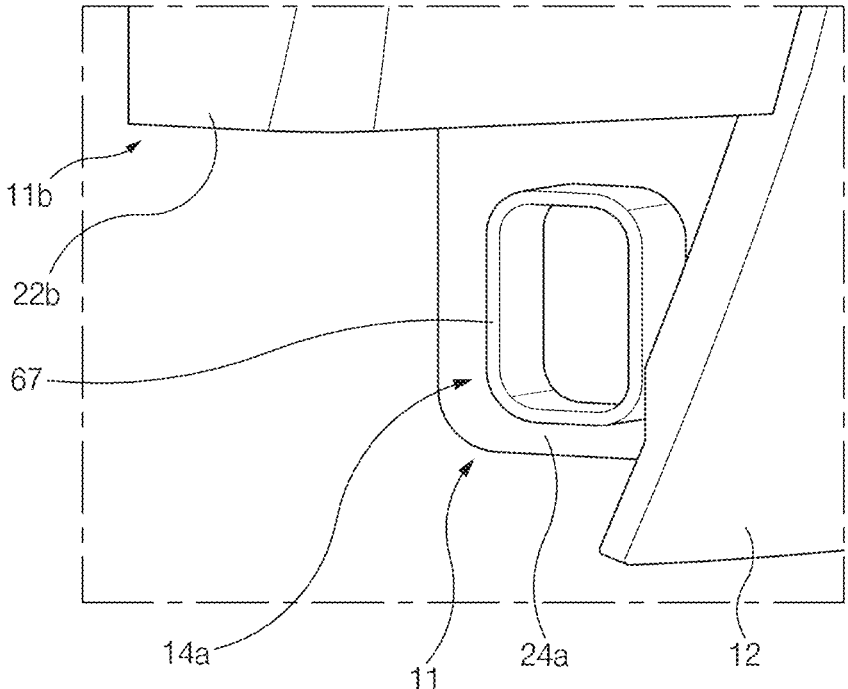
FIG. 14 illustrates a first hinge socket of a first bottom hinge mounted on a main frame in a vehicle tailgate apparatus according to an example embodiment of the present disclosure.

Referring to FIG. 14, the first hinge socket 67 may be provided on the first connection member 24a of the main frame 11. The first hinge socket 67 may be configured to receive the first hinge shaft 66b of the first hinge mount 66. The first hinge socket 67 may be a hexahedral socket having a shape and a size corresponding to those of the first hinge shaft 66b.

A longitudinal axis of the first hinge shaft 66b and a longitudinal axis of the first hinge socket 67 may be aligned with the horizontal axis HX (see FIG. 2).

The second bottom hinge 14b may include a second hinge mount 68 provided on the vehicle body 2, and a second hinge shaft 69 provided on the main frame 11.

Figure 15:
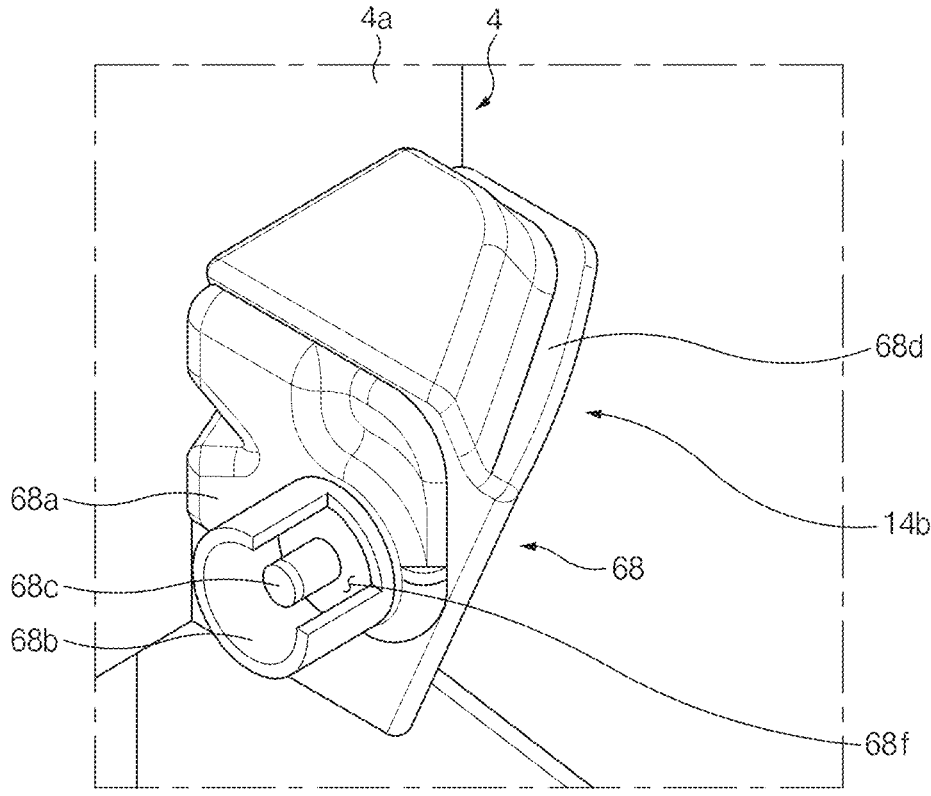
FIG. 15 illustrates a second hinge mount of a second bottom hinge mounted on a sidewall of a vehicle body in a vehicle tailgate apparatus according to an example embodiment of the present disclosure.

Referring to FIG. 15, the second hinge mount 68 may include a second bracket 68a fixed to a bottom end of the rear end surface 4a of the corresponding sidewall 4 (corresponding to the right sidewall of FIG. 2) of the vehicle body 2, a second hinge socket 68b fixed to the second bracket 68a through a fastener 68c, and a second hinge cover 68d covering the second bracket 68a. The second hinge socket 68b may have a hollow cylindrical shape with an opening 68f.

Figure 16:
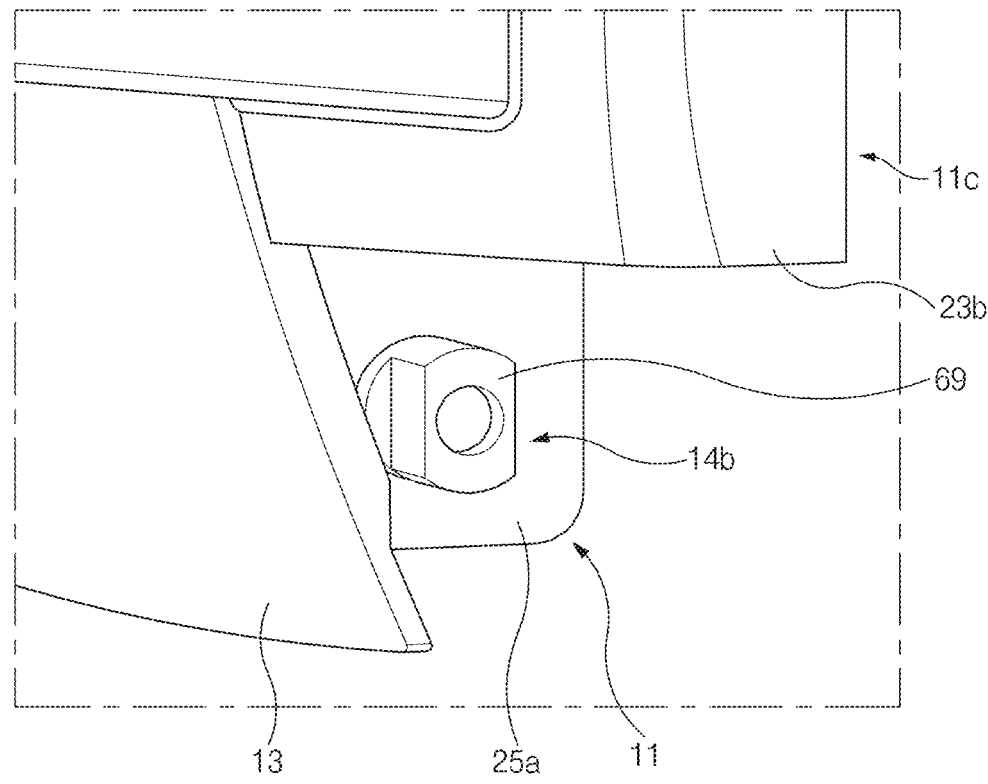
FIG. 16 illustrates a second hinge socket of a second bottom hinge mounted on a main frame in a vehicle tailgate apparatus according to an example embodiment of the present disclosure.

Referring to FIG. 16, the second hinge shaft 69 may be provided on the second connection member 25a of the main frame 11. The second hinge shaft 69 may be received in the second hinge socket 68b of the second hinge mount 68. The second hinge shaft 69 may have a solid cylindrical shape having an outer diameter less than an inner diameter of the second hinge socket 68b, and the second hinge shaft 69 may have a pair of opposing flat surfaces.

A longitudinal axis of the second hinge socket 68b and a longitudinal axis of the second hinge shaft 69 may be aligned with the horizontal axis HX (see FIG. 2).

Figure 11:
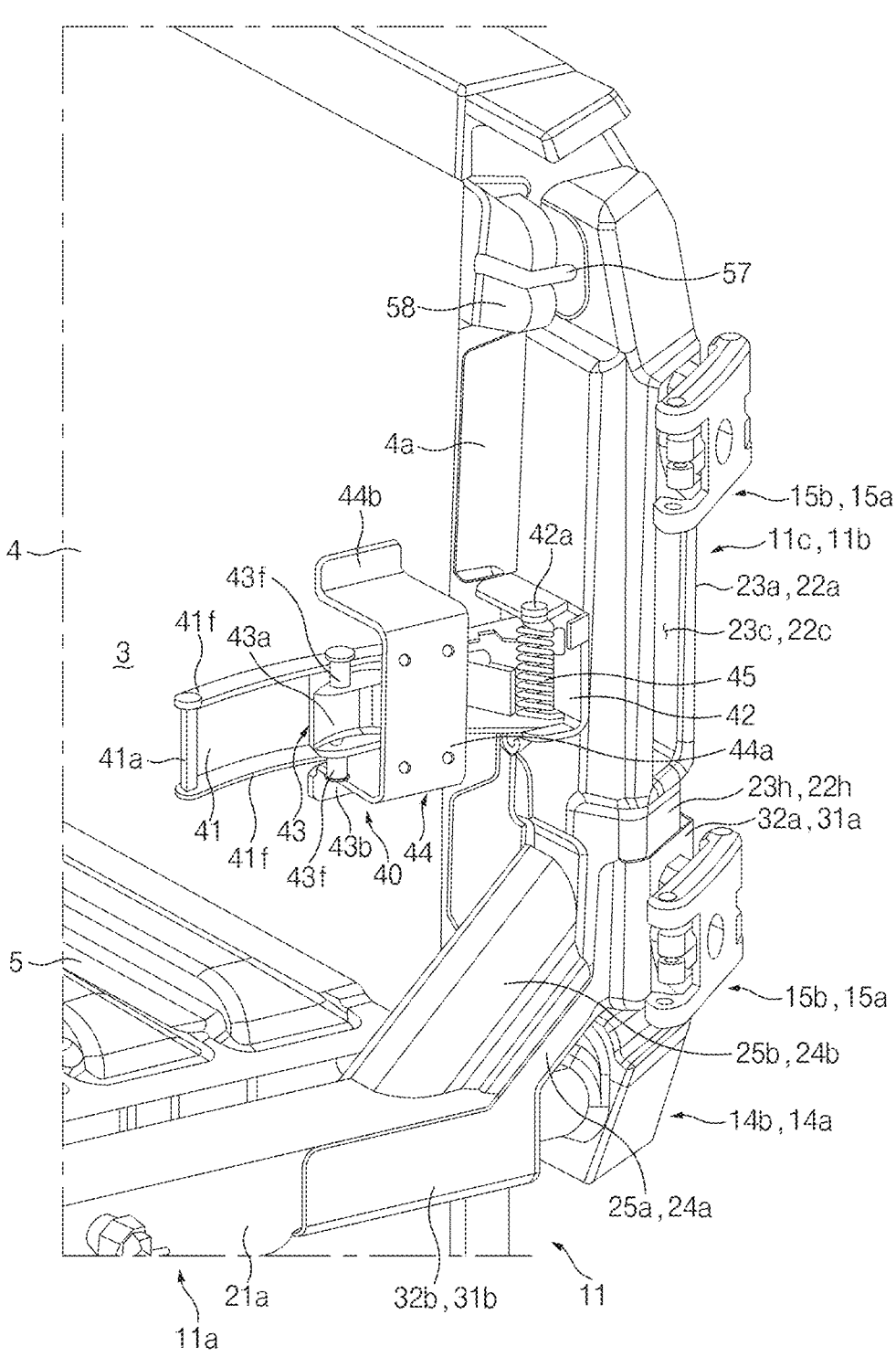
FIG. 11 illustrates a state in which a door check mechanism is mounted on a side portion of a main frame in a vehicle tailgate apparatus according to an example embodiment of the present disclosure.
Figure 12:
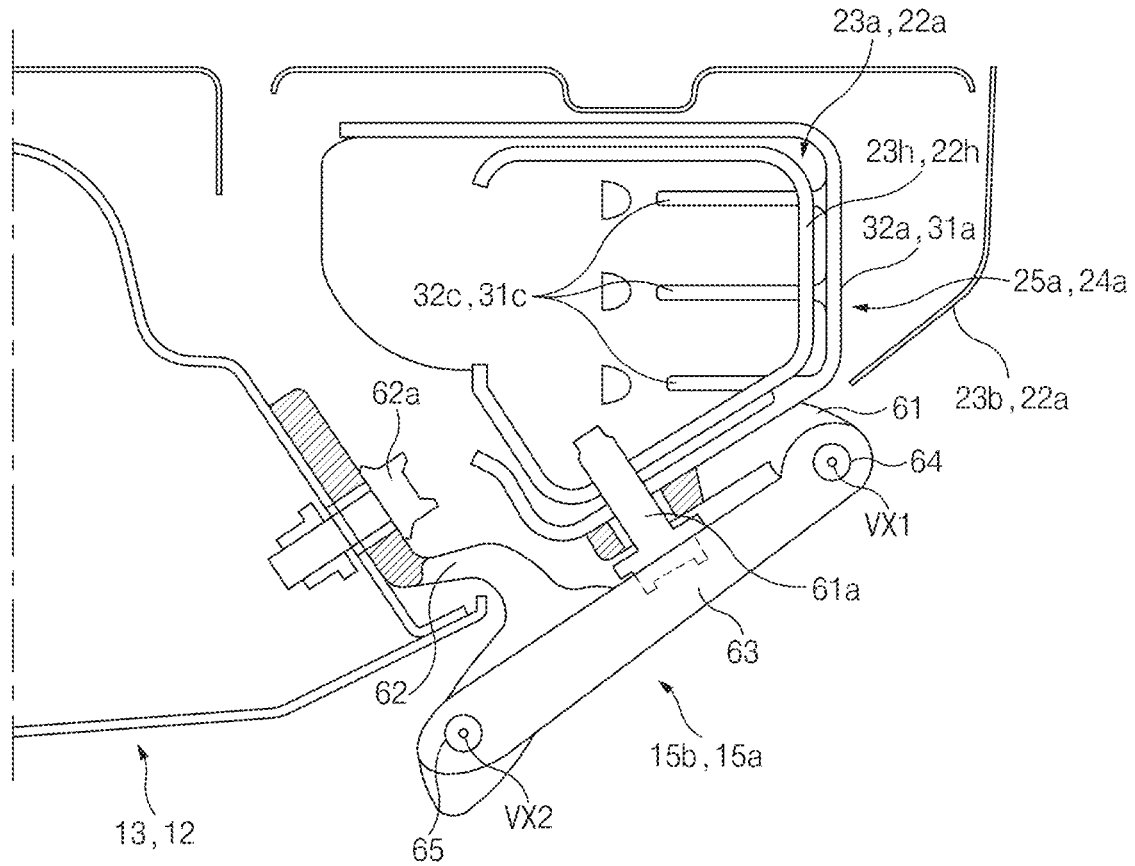
FIG. 12 illustrates a cross-sectional view, taken along line B-B of FIG. 9.
Figure 21:
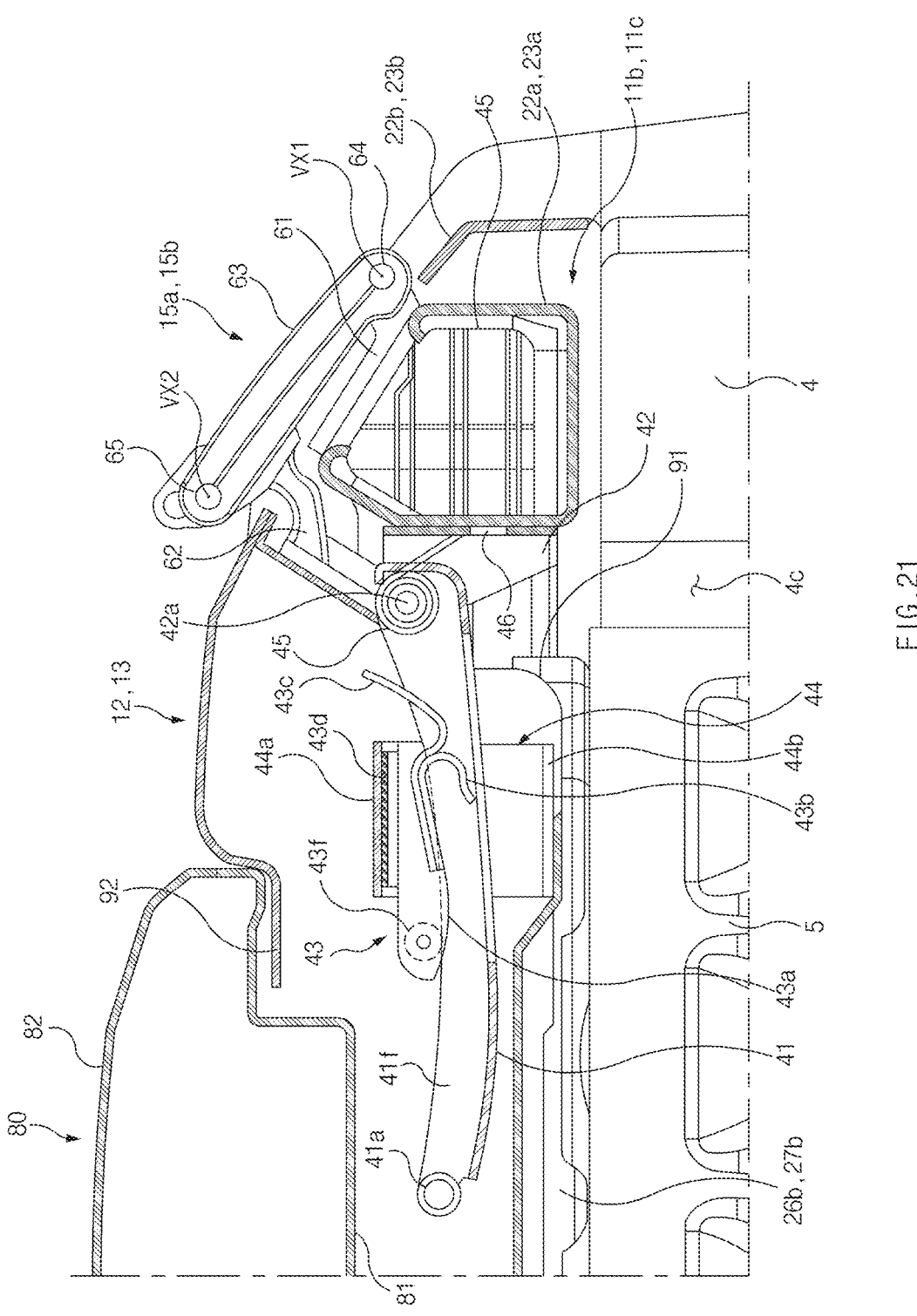
FIG. 21 illustrates a cross-sectional view of a state in which a check strip of a door check mechanism is received in the inside of a door when the door is in a closed position in a vehicle tailgate apparatus according to an example embodiment of the present disclosure.

Referring to FIG. 11, of the two first side hinges 15a, an upper first side hinge 15a may be connected to the first side member 22a, and a lower first side hinge 15a may be connected to the upper receiving portion 31a of the first connection member 24a. Referring to FIG. 21, the frame-side hinge bracket 61 of the upper first side hinge 15a may be fixed to the first side member 22a of the first side portion 11b through a fastener. Referring to FIG. 12, the frame-side hinge bracket 61 of the lower first side hinge 15a may be fixed to the lower end portion 22h of the first side member 22a together with the upper receiving portion 31a of the first connection member 24a through a fastener 61a.

Referring to FIG. 11, of the two second side hinges 15b, an upper second side hinge 15b may be connected to the second side member 23a, and a lower second side hinge 15b may be connected to the upper receiving portion 32a of the second connection member 25a. Referring to FIG. 21, the frame-side hinge bracket 61 of the upper second side hinge 15b may be fixed to the second side member 23a of the second side portion 11c through a fastener. Referring to FIG. 12, the frame-side hinge bracket 61 of the lower second side hinge 15b may be fixed to the lower end portion 23h of the second side member 23a together with the upper receiving portion 32a of the second connection member 25a through a fastener 61a.

Figure 18:
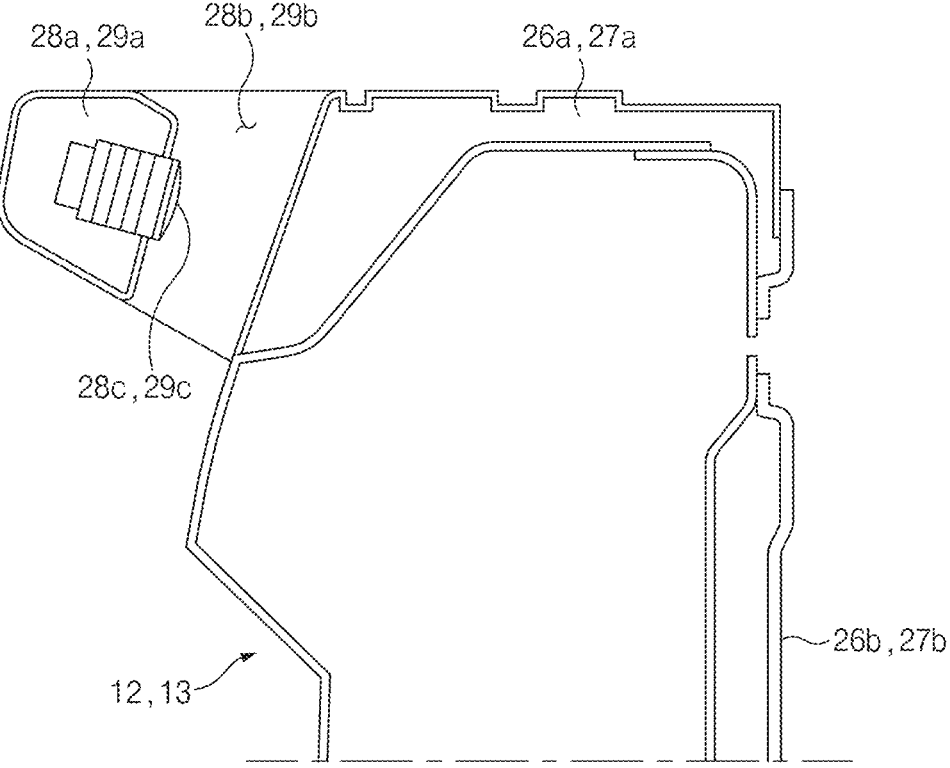
FIG. 18 illustrates a cross-sectional view, taken along line D-D of FIG. 9.

The first door 12 may include an interior surface facing the luggage compartment 3, and an exterior surface facing the outside of the vehicle body 2. The interior surface of the first door 12 may face the front of the vehicle, and the exterior surface of the first door 12 may face the rear of the vehicle. Referring to FIGS. 6 and 18, the tailgate 10 according to an example embodiment of the present disclosure may include a first upper trim 26*a* attached to a top surface of the first door 12, and a first interior trim 26*b* detachably attached to the interior surface of the first door 12. The first upper trim 26*a* may have a first door grip 28*a*, and the first door grip 28*a* may have a first grip aperture 28*b*. The first grip aperture 28*b* may be formed between the first door grip 28*a* and the first upper trim 26*a*.

The second door 13 may include an interior surface facing the luggage compartment 3, and an exterior surface facing the outside of the vehicle body 2. The interior surface of the second door 13 may face the front of the vehicle, and the exterior surface of the second door 13 may face the rear of the vehicle. Referring to FIGS. 6 and 18, the tailgate 10 according to an example embodiment of the present disclosure may include a second upper trim 27*a* attached to a top surface of the second door 13, and a second interior trim 27*b* detachably attached to the interior surface of the second door 13. The second upper trim 27*a* may have a second door grip 29*a*, and the second door grip 29*a* may have a second grip aperture 29*b*. The second grip aperture 29*b* may be formed between the second door grip 29*a* and the second upper trim 27*a*.

Referring to FIG. 18, a first door open switch 28*c* may be provided on the first door grip 28*a*, and the first door open switch 28*c* may be electrically connected to the first lower latch. A second door open switch 29*c* may be provided on the second door grip 29*a*, and the second door open switch 29*c* may be electrically connected to the second lower latch.

Figure 9:
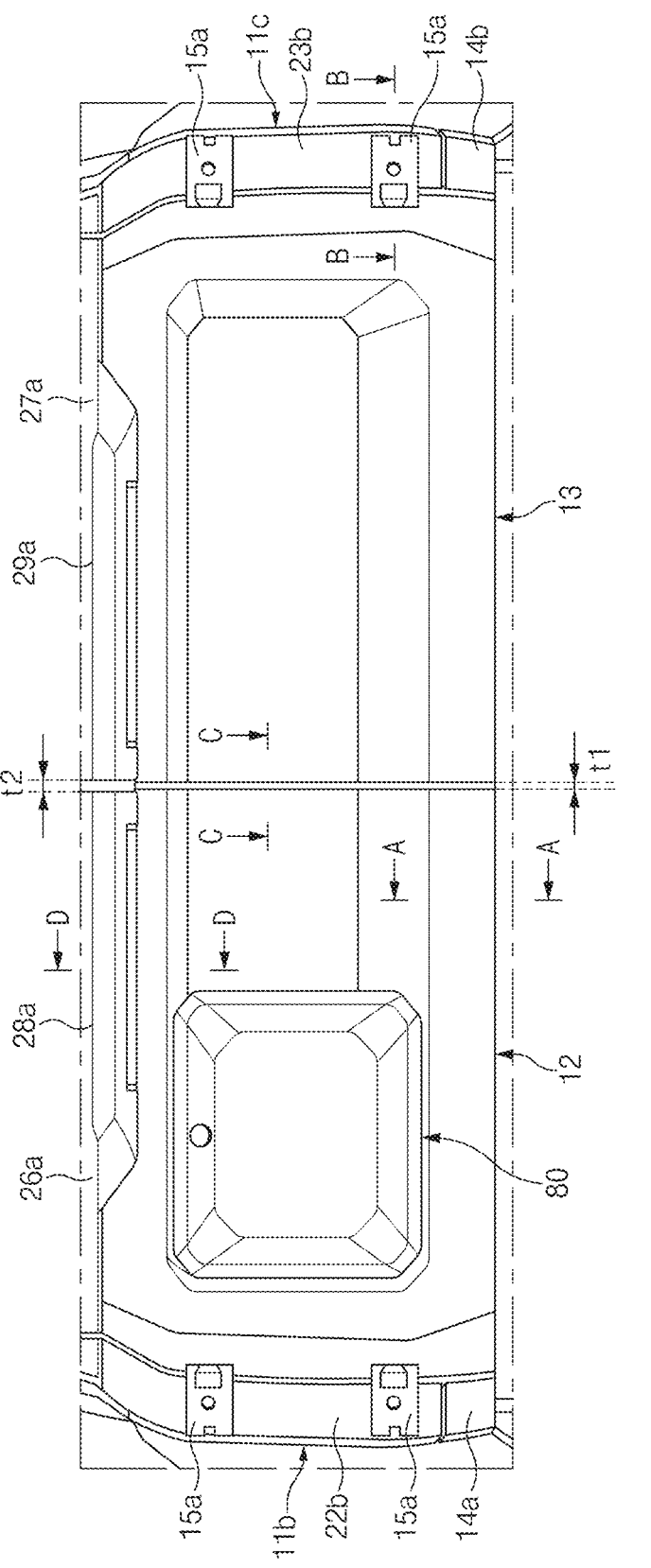
FIG. 9 illustrates a rear view of a vehicle in a state in which a tailgate is in a closed position in a vehicle tailgate apparatus according to an example embodiment of the present disclosure.

The first door 12 may include a first hinge-side edge hingeably connected to the first side portion 11*b* of the main frame 11 by the first side hinge 15*a*, and a first door-side edge facing the second door 13. The second door 13 may include a second hinge-side edge hingeably connected to the second side portion 11*c* of the main frame 11 by the second side hinge 15*b*, and a second door-side edge facing the first door 12. Referring to FIG. 9, in a state in which the first door 12 and the second door 13 are closed, the first door-side edge of the first door 12 and the second door-side edge of the second door 13 may be spaced apart from each other by a first gap t1, and a first door-side edge of the first upper trim 26*a* and a second door-side edge of the second upper trim 27*a* may be spaced apart from each other by a second gap t2. The first gap t1 may allow the first door 12 and the second door 13 not to interfere with each other when the first door 12 and the second door 13 are individually opened or simultaneously opened. The second gap t2 may be greater than the first gap t1.

The tailgate apparatus 100 according to an example embodiment of the present disclosure may further include a magnetic module 37 and a contact module 38 provided between the facing edges of the first door 12 and the second door 13. The magnetic module 37 may be configured to generate and block a magnetic field. As the magnetic module 37 generates the magnetic field, the contact module 38 may be attached to the magnetic module 37 by a magnetic force, and accordingly the magnetic module 37 may lock the contact module 38. As the magnetic module 37 blocks magnetic field, the contact module 38 may be not attached to the magnetic module 37, and accordingly the magnetic module 37 may unlock the contact module 38. That is, the magnetic module 37 may be configured to lock and unlock the contact module 38 by the generation and blockage of the magnetic field, and the first door 12 and the second door 13 may be locked to and unlocked from each other by the magnetic module 37 and the contact module 38.

According to an example embodiment, the magnetic module 37 may be provided at the edge of the first door 12, and the contact module 38 may be provided at the edge of the second door 13. According to another example embodiment, the magnetic module 37 may be provided at the edge of the second door 13, and the contact module 38 may be provided at the edge of the first door 12.

The magnetic module 37 may be electrically connected to the first door open switch 28*c* and the second door open switch 29*c*. As the magnetic module 37 can be turned on, the magnetic module 37 may generate the magnetic field, and the contact module 38 may be attached to the magnetic module 37 by the magnetic force so that the magnetic module 37 may lock the contact module 38. As the magnetic module 37 can be turned off, the magnetic module 37 may block the magnetic field, and the contact module 38 may be not attached to the magnetic module 37 so that the magnetic module 37 may unlock the contact module 38.

According to an example embodiment, the magnetic module 37 may be a switchable magnetic device including a fixed magnet, a rotating magnet that can be rotatable with respect to the fixed magnet, and an actuator that rotates the rotating magnet.

According to another example embodiment, the magnetic module 37 may be an electromagnet.

Figure 17:
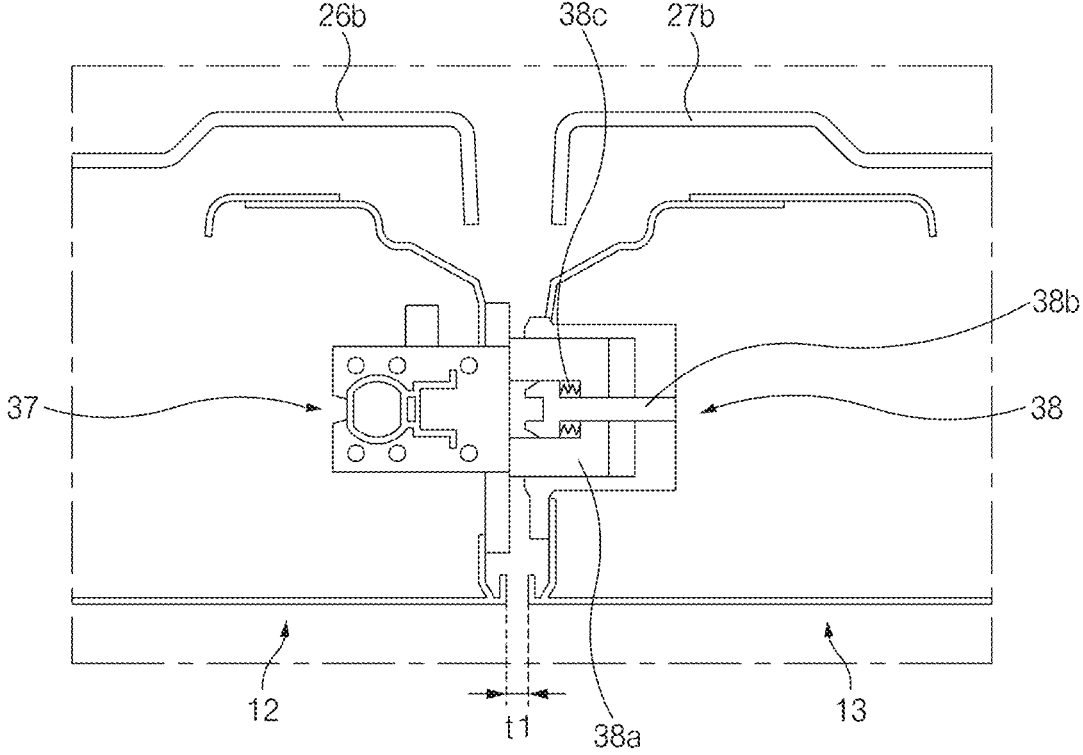
FIG. 17 illustrates a cross-sectional view, taken along line C-C of FIG. 9.

Referring to FIG. 17, the magnetic module 37 may be mounted on the first door-side edge of the first door 12, and the contact module 38 may be mounted on the second door-side edge of the second door 13. The contact module 38 may include a contact plate 38*a* made of a magnetic material, and the contact plate 38*a* may be configured to be movable with respect to the magnetic module 37. The contact plate 38*a* may be configured to move between an attachment position in which the contact plate 38*a* can be attached to the magnetic module 37 and a detachment position in which the contact plate 38*a* can be detached and spaced apart from the magnetic module 37 by the first gap t1 or greater. The contact module 38 may further include a guide pin 38*b* configured to guide the movement of the contact plate 38*a*. The guide pin 38*b* may be fixed to the second door 13, and the contact plate 38*a* may be configured to move along the guide pin 38*b*. The contact module 38 may further include a biasing member (38*c*) allowing the contact plate 38*a* to be biased so that the contact plate 38*a* may be spaced apart from the magnetic module 37 by the first gap t1 or greater. The biasing member (38*c*) may be a coil spring or a plate spring provided around the guide pin 38*b*. When the magnetic module 37 blocks the magnetic field, the contact plate 38*a* may be biased by the biasing member (38*c*) to be spaced apart from the magnetic module 37 by the first gap t1 or greater.

As the magnetic module 37 can be turned on, the magnetic module 37 may generate the magnetic field, and the contact module 38 may be attached to the magnetic module 37 by the magnetic force, and accordingly the first door 12 and the second door 13 may be locked to each other, and the first door 12 and the second door 13 may be held in the closed position.

As the magnetic module 37 can be turned off, the magnetic module 37 may block the magnetic field, and the contact module 38 may be not attached to the magnetic module 37, and accordingly the first door 12 and the second door 13 may be unlocked from each other. In particular, the contact plate 38*a* of the contact module 38 may be biased by the biasing member (38*c*) to be spaced apart from the magnetic module 37 by the first gap t1 or greater so that a rotation gap between the first door 12 and the second door 13 may be sufficiently secured, and the first door 12 and the second door 13 may be individually opened or simultaneously opened without interfering with each other.

Referring to FIG. 6, the tailgate apparatus 100 according to an example embodiment of the present disclosure may include a pair of door check mechanisms 40 connected to the pair of side portions 11b and 11c of the main frame 11, respectively. The door check mechanisms 40 may be configured to hold the corresponding doors 12 and 13 in predetermined positions, respectively, when the doors 12 and 13 are opened and closed. Specifically, when each of the doors 12 and 13 can be opened, each door check mechanism 40 may be configured to hold the corresponding one of the doors 12 and 13 in the first open position or allow the corresponding one of the doors 12 and 13 to move to the second open position.

Referring to FIG. 11, each door check mechanism 40 may include a check strip 41 pivotally connected to each of the side portions 11b and 11c of the main frame 11, and a stopper 43 to which the check strip 41 can be releasably coupled.

Figure 27:
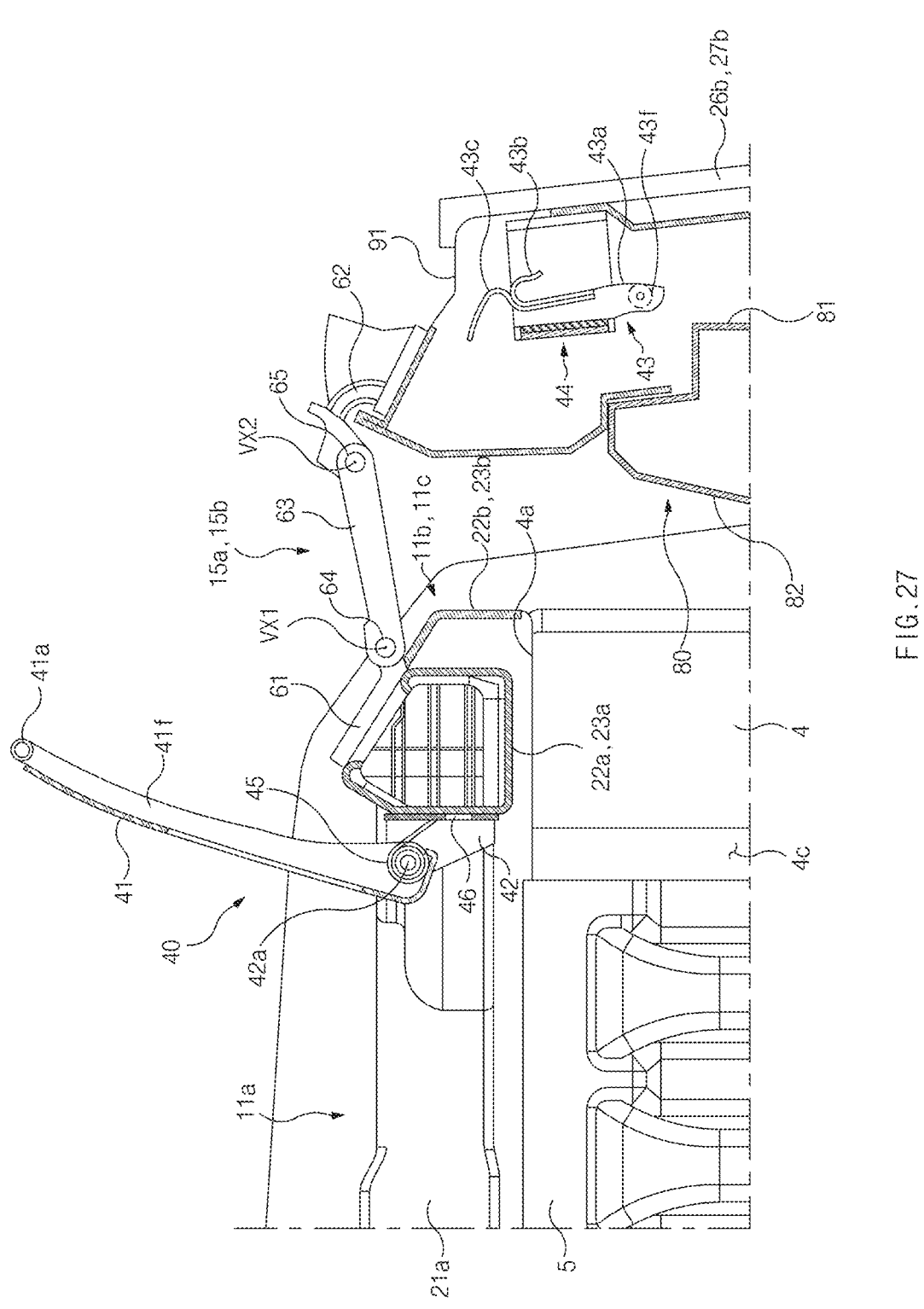
FIG. 27 illustrates a cross-sectional view of a state in which a door moves from a first open position to a second open position with a check strip completely released from a stopper in a vehicle tailgate apparatus according to an example embodiment of the present disclosure.
Figure 28:
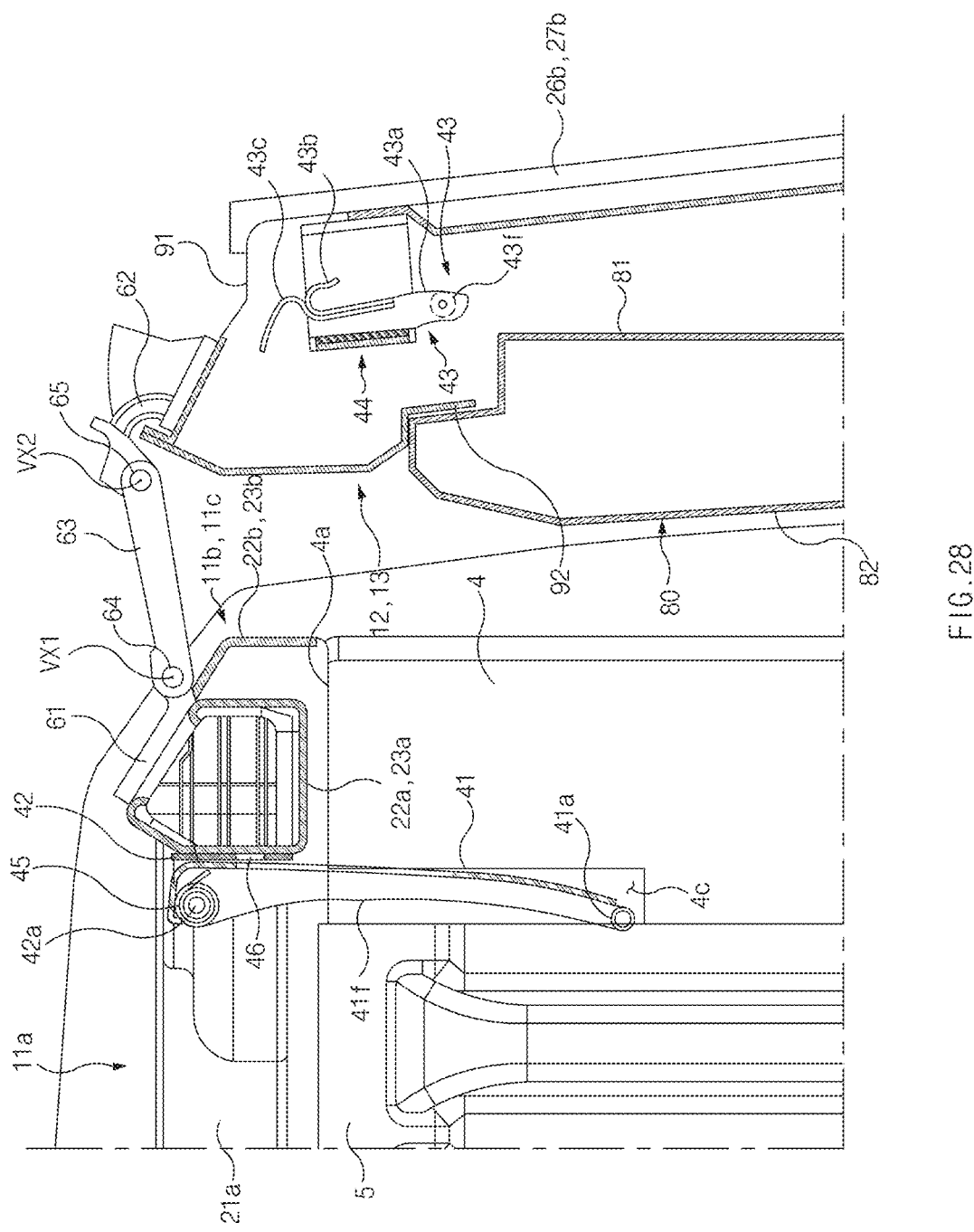
FIG. 28 illustrates a cross-sectional view of a state in which a check strip is received in a recessed portion of a sidewall as the check strip is folded to a check bracket in a vehicle tailgate apparatus according to an example embodiment of the present disclosure.

The check strip 41 may be pivotally mounted on a check bracket 42 through a pivot pin 42a, and the check bracket 42 may be fixed to each of the side members 22a and 23a of the side portions 11b and 11c of the main frame 11 through a fastener. The check strip 41 may be configured to move between an unfolded position (see FIGS. 23 and 27) in which the check strip 41 can be unfolded from each of the side portions 11b and 11c of the main frame 11 and the check bracket 42 toward the outside of the vehicle body 2 and a folded position (see FIG. 28) in which the check strip 41 can be folded toward each of the side portions 11b and 11c of the main frame 11 and the check bracket 42. When the check strip 41 is in the unfolded position, the check strip 41 may be open wide with respect to the check bracket 42 at a predetermined angle, and when the check strip 41 is in the folded position, the check strip 41 may be overlapped with the check bracket 42. The check strip 41 may be biased to the unfolded position by a torsion spring 45, and the torsion spring 45 may be disposed around the pivot pin 42a. Each of the doors 12 and 13 may have a side opening 91 that can be open to the corresponding one of the side portions 11b and 11c of the main frame 11. As the doors 12 and 13 move between the closed position, the first open position, and the second open position, the check strip 41 may be received in the inside of each of the doors 12 and 13 or be released from the inside of each of the doors 12 and 13 through the side opening 91 of each of the doors 12 and 13. Referring to FIG. 21, when each of the doors 12 and 13 is in the closed position, the check strip 41 may be fully received in the inside of each of the doors 12 and 13. Referring to FIGS. 22 to 26, while each of the doors 12 and 13 is moving from the closed position to the first open position, the check strip 41 may be partially released from the inside of each of the doors 12 and 13. Referring to FIGS. 27 and 28, when each of the doors 12 and 13 is in the second open position, the check strip 41 may be completely released from the inside of each of the doors 12 and 13.

The check strip 41 may be curved, and the check strip 41 may have a pair of sidewalls 41f provided at both edges thereof. The check strip 41 may have a first end portion pivotally mounted on the check bracket 42, and a second end portion opposing the first end portion. The check strip 41 may have a coupling pin 41a provided on the second end portion, and the coupling pin 41a may connect the pair of sidewalls 41f.

Referring to FIG. 21, the stopper 43 may be mounted in the inside of each of the doors 12 and 13 through an inner bracket 44. The inner bracket 44 may include a flange 44b fixed to the interior surface of each of the doors 12 and 13 through a plurality of fasteners, and a mounting wall 44a located opposite to the flange 44b.

Figure 20:
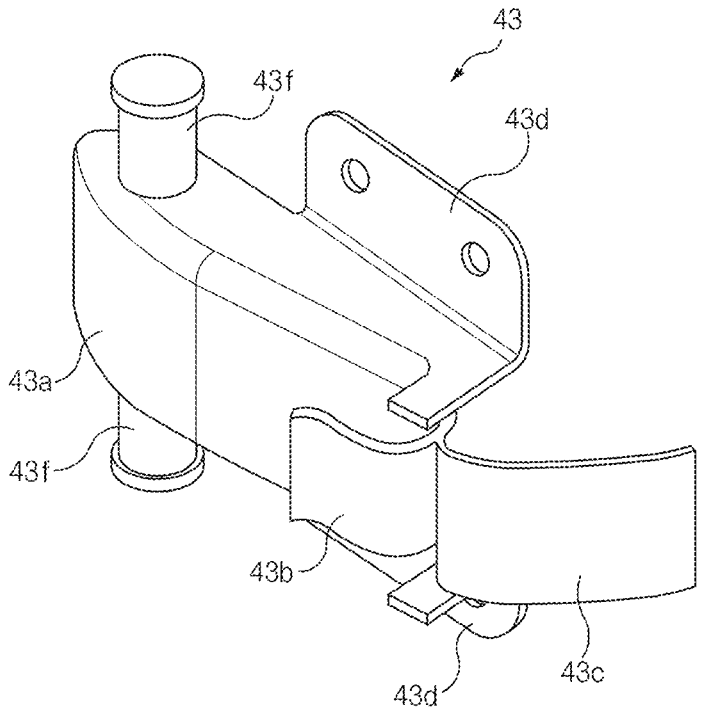
FIG. 20 illustrates a perspective view of a stopper of a door check mechanism of a vehicle tailgate apparatus according to an example embodiment of the present disclosure.

Referring to FIG. 20, the stopper 43 may include a body 43a, and a hook 43b provided on the body 43a. The body 43a may have two flanges 43d, and the two flanges 43d may be fixed to the mounting wall 44a of the inner bracket 44 through a plurality of fasteners. The hook 43b may have a cavity in which the coupling pin 41a of the check strip 41 can be received, and the coupling pin 41a of the check strip 41 may be coupled to or separated from the hook 43b of the stopper 43. When the coupling pin 41a of the check strip 41 is coupled to or separated from the hook 43b, the hook 43b may be elastically deformable. The stopper 43 may have a restore guide 43c extending from the hook 43b toward the corresponding one of the side hinges 15a and 15b, and the restore guide 43c may be curved. The restore guide 43c may be configured to guide the coupling pin 41a of the check strip 41 to the hook 43b of the stopper 43. The stopper 43 may have a pair of guide projections 43f protruding from both sides of the body 43a, and the pair of guide projections 43f may be configured to guide the pair of sidewalls 41f of the check strip 41. When each of the doors 12 and 13 moves to the first open position, the pair of guide projections 43f may guide the pair of sidewalls 41f of the check strip 41 to move the coupling pin 41a of the check strip 41 to the hook 43b of the stopper 43.

Referring to FIG. 28, each sidewall 4 of the vehicle body 2 may have a recessed portion 4c that can be recessed from the interior surface of the sidewall 4 toward the exterior surface of the sidewall 4, and the recessed portion 4c of the sidewall 4 may be aligned with the check bracket 42. When the check strip 41 is in the folded position, the recessed portion 4c may be configured to receive the check strip 41. As the check strip 41 completely released from each of the doors 12 and 13 can be folded by a user in a direction opposite to a direction in which the check strip 41 can be biased by the torsion spring 45, the check strip 41 may be folded to the check bracket 42. Accordingly, the check strip 41 may be folded toward the interior surface of the corresponding sidewall 4 so that the check strip 41 may be received in the recessed portion 4c of the sidewall 4.

The door check mechanism 40 may further include a retainer configured to retain the check strip 41 in the folded position, and the retainer may be configured to keep the check strip 41 in a state of being folded to the check bracket 42. The check strip 41 completely released from each of the doors 12 and 13 may be kept in a state of being received in the recessed portion 4c of the corresponding sidewall 4 by the retainer.

A folding sensor 46 may be mounted on the check bracket 42, and the folding sensor 46 may be configured to detect that the check strip 41 is in the folded position. Accordingly, the folding sensor 46 may detect the folded state of the check strip 41 with respect to the check bracket 42. When the check strip 41 is in the folded position, the check strip 41 may be received in the recessed portion 4c of the corresponding sidewall 4. In this state, when the main frame 11 of the tailgate 10 is opened in the first mode, there may be a risk of malfunction of the tailgate apparatus 100 and/or damage to the check strip 41. The folding sensor 46 may detect that the check strip 41 is in the folded position, and a controller 150 may determine that the check strip 41 is received in the recessed portion 4c of the sidewall 4 based on the detection result of the folding sensor 46, and accordingly the controller 150 may block the tailgate 10 from being closed, thereby preventing damage to the check strip 41. When the user moves the check strip 41 to the unfolded position, the check strip 41 may be released from the recessed portion 4c of the sidewall 4. As each of the doors 12 and 13 moves from the second open position to the first open position, the check strip 41 may be received in the inside of each of the doors 12 and 13 through the side opening 91 of each of the doors 12 and 13.

Referring to FIG. 21, when each of the doors 12 and 13 is in the closed position, the check strip 41 may be fully received in the inside of each of the doors 12 and 13 through the side opening 91 of each of the doors 12 and 13. As the check strip 41 received in the inside of each of the doors 12 and 13 comes into contact with the stopper 43, the check strip 41 may be parallel to each of the doors 12 and 13.

Figure 22:
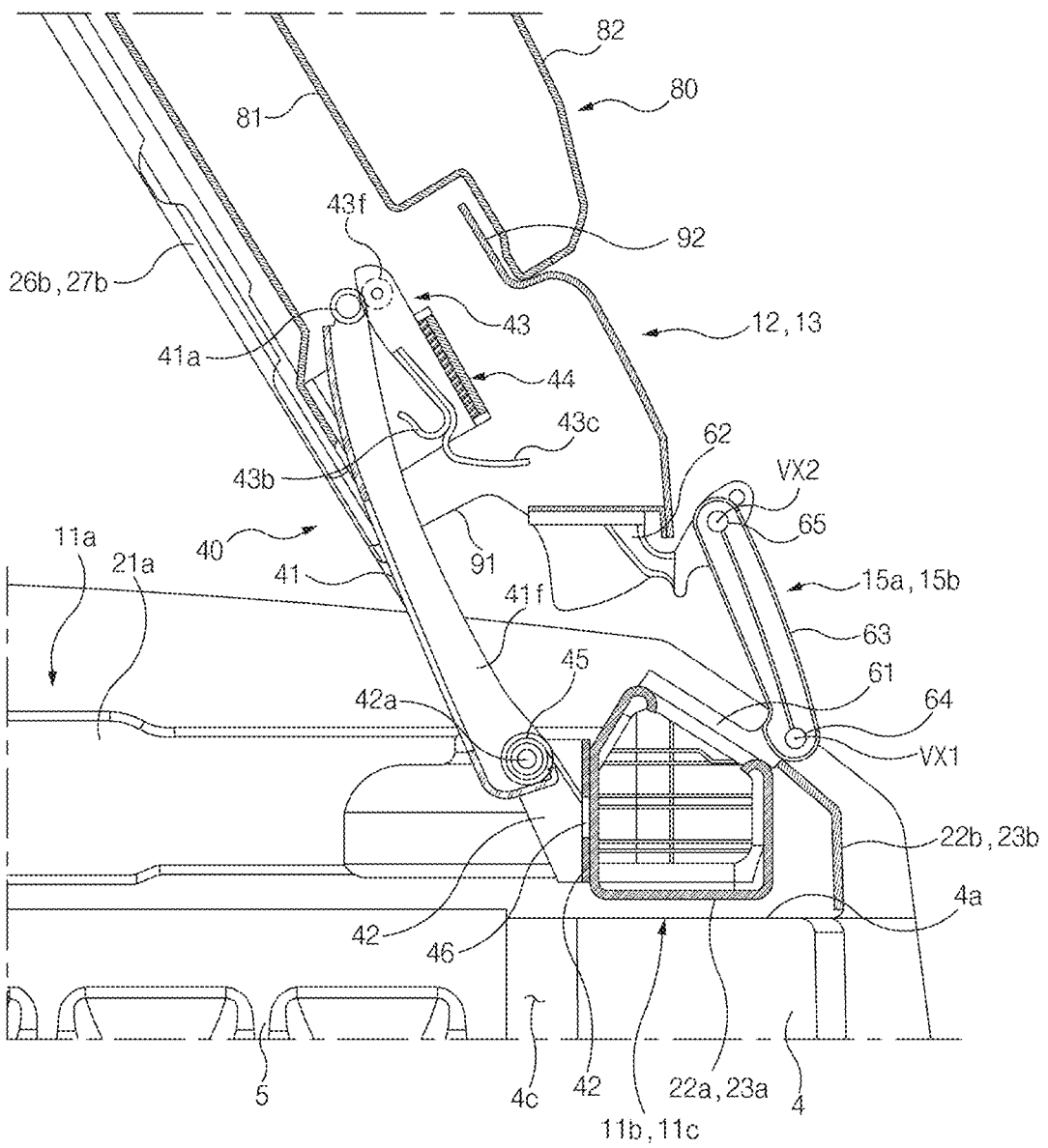
FIG. 22 illustrates a cross-sectional view of a state in which a hinge arm of a side hinge pivots around a first vertical axis when a door is opened in a vehicle tailgate apparatus according to an example embodiment of the present disclosure.

Referring to FIG. 22, when each of the doors 12 and 13 is opened, each of the doors 12 and 13 and the hinge arm 63 of each of the side hinges 15a and 15b may pivot around the first vertical axis VX1, and the check strip 41 of the door check mechanism 40 may pivot along a direction in which each of the doors 12 and 13 is opened so that the check strip 41 may be partially released from each of the doors 12 and 13 through the side opening 91.

Figure 23:
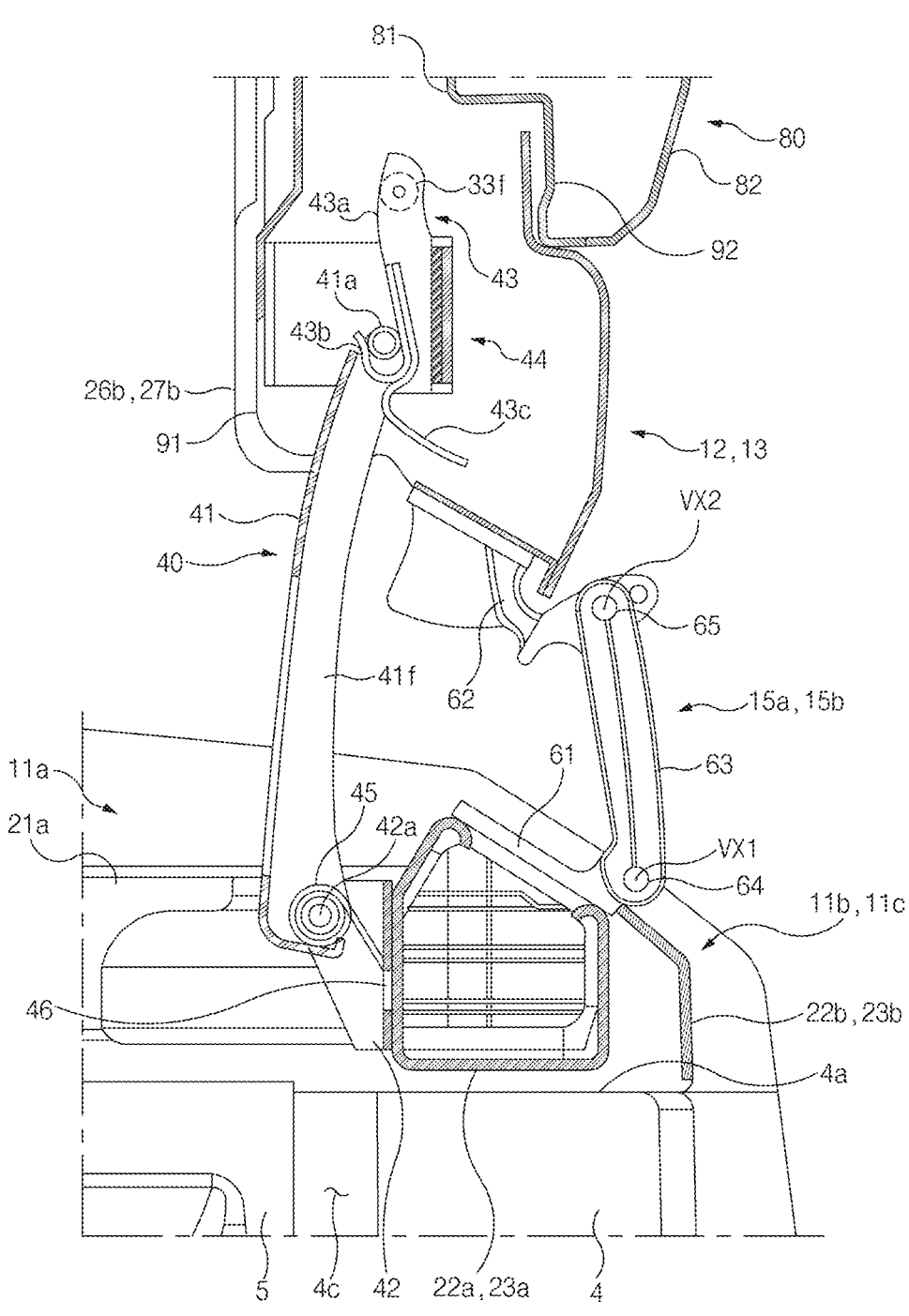
FIG. 23 illustrates a cross-sectional view of a state in which a check strip is coupled to a stopper when a door is in a first open position in a vehicle tailgate apparatus according to an example embodiment of the present disclosure.

Referring to FIG. 23, when each of the doors 12 and 13 is in the first open position, the coupling pin 41a of the check strip 41 may be coupled to the hook 43b of the stopper 43 so that the check strip 41 may be coupled to the stopper 43, and accordingly each of the doors 12 and 13 may be held in the first open position.

Figure 24:
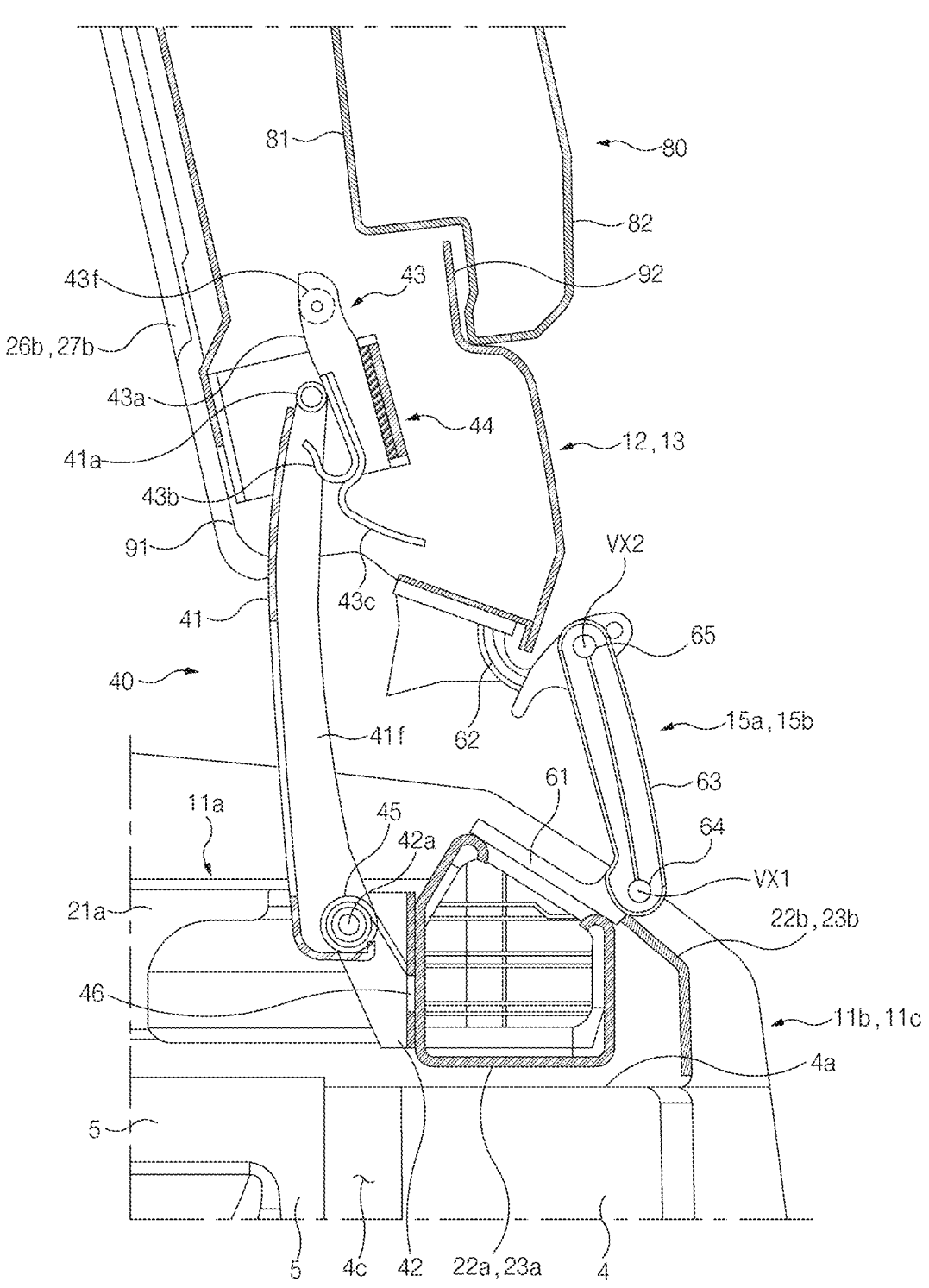
FIG. 24 illustrates a cross-sectional view of a state in which a check strip is released from a stopper when a door pivots from a first open position to a closed position in a vehicle tailgate apparatus according to an example embodiment of the present disclosure.

Referring to FIG. 24, when each of the doors 12 and 13 pivots from the first open position to the closed position at a predetermined angle, the coupling pin 41a of the check strip 41 may be separated from the hook 43b of the stopper 43 so that the check strip 41 may be released from the stopper 43.

Figure 25:
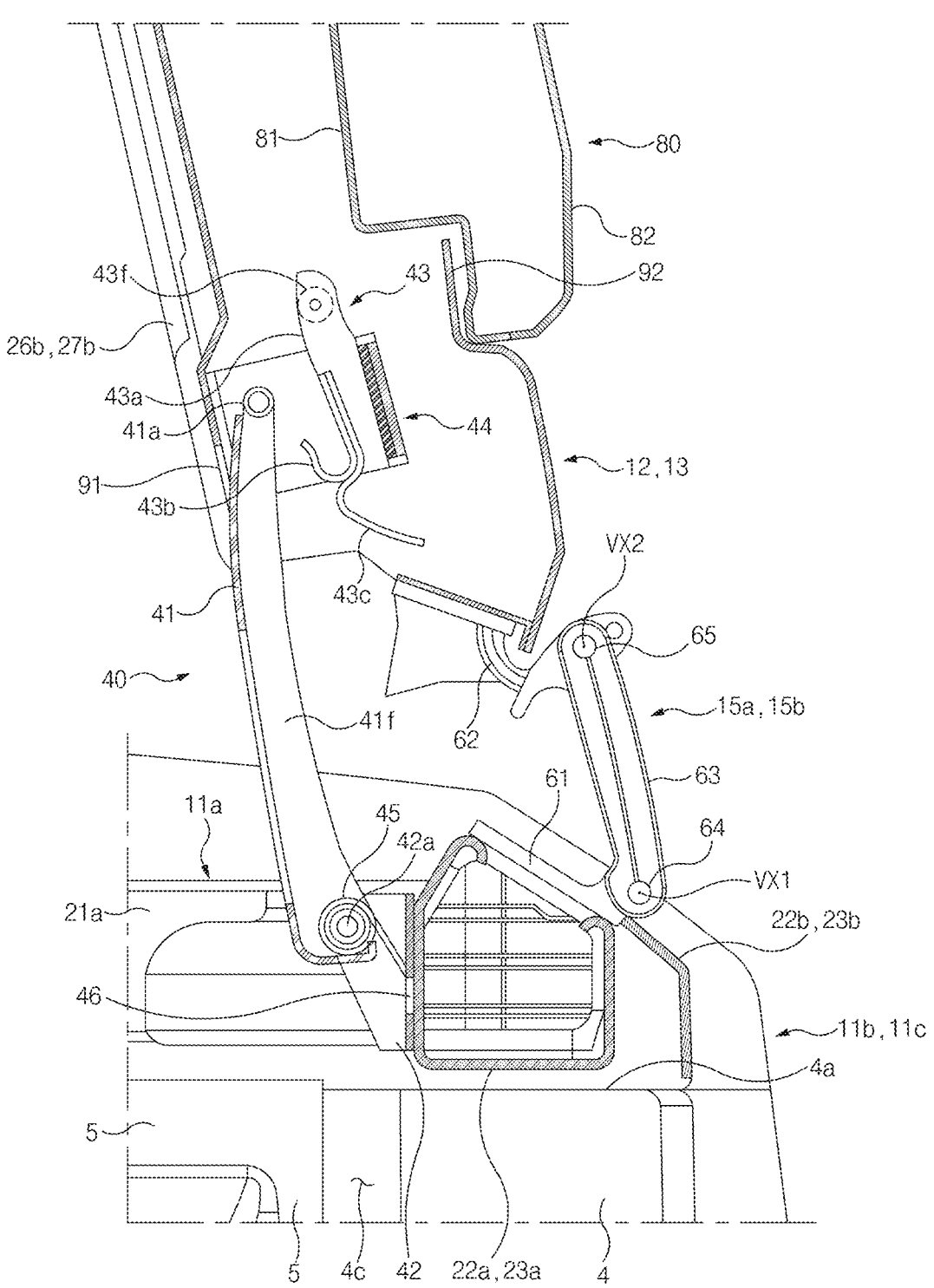
FIG. 25 illustrates a cross-sectional view of a state in which a check strip is partially released from a door through a side opening of the door when the door pivots toward a closed position in a vehicle tailgate apparatus according to an example embodiment of the present disclosure.

Referring to FIG. 25, when the check strip 41 pivots slightly toward the closed position of each of the doors 12 and 13, the check strip 41 may be partially released from each of the doors 12 and 13 through the side opening 91 of each of the doors 12 and 13.

Figure 26:
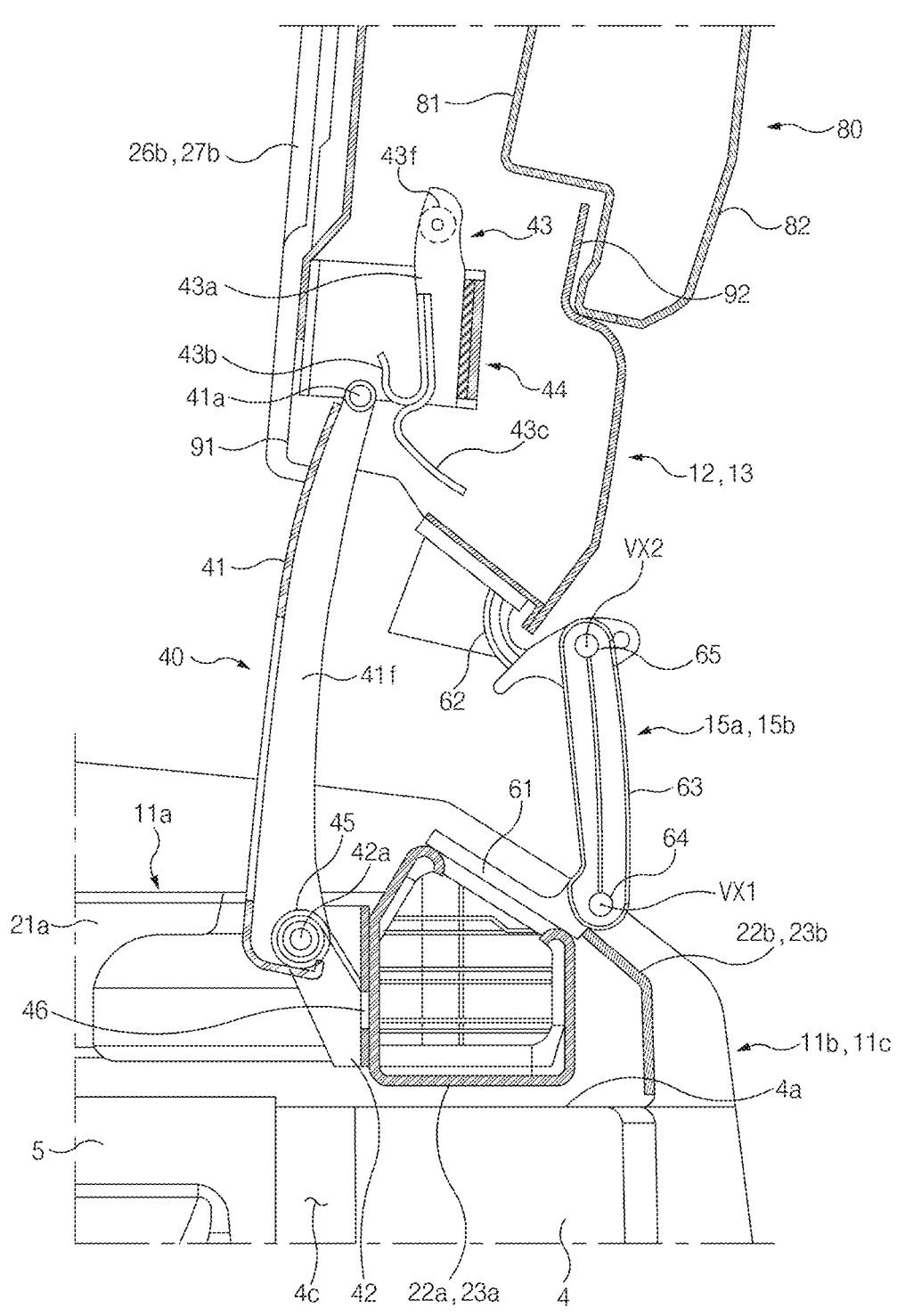
FIG. 26 illustrates a cross-sectional view of a state in which a check strip is completely released from a stopper when a door moves back to a first open position in a vehicle tailgate apparatus according to an example embodiment of the present disclosure.

Referring to FIG. 26, as each of the doors 12 and 13 moves back to the first open position, the coupling pin 41a of the check strip 41 may be completely separated from the hook 43b of the stopper 43 so that the check strip 41 may be completely released from the stopper 43.

Referring to FIG. 27, as the check strip 41 can be completely released from the stopper 43, each of the doors 12 and 13 may be allowed to move from the first open position to the second open position, and the check strip 41 may be completely released from each of the doors 12 and 13.

Referring to FIG. 28, as the check strip 41 can be folded to the check bracket 42, the check strip 41 may be folded toward the corresponding sidewall 4 of the vehicle body 2, and the check strip 41 may be received in the recessed portion 4c of the sidewall 4. The check strip 41 may be kept in a state of being received in the recessed portion 4c of the sidewall 4 by the retainer provided on the check bracket 42.

Figure 29:
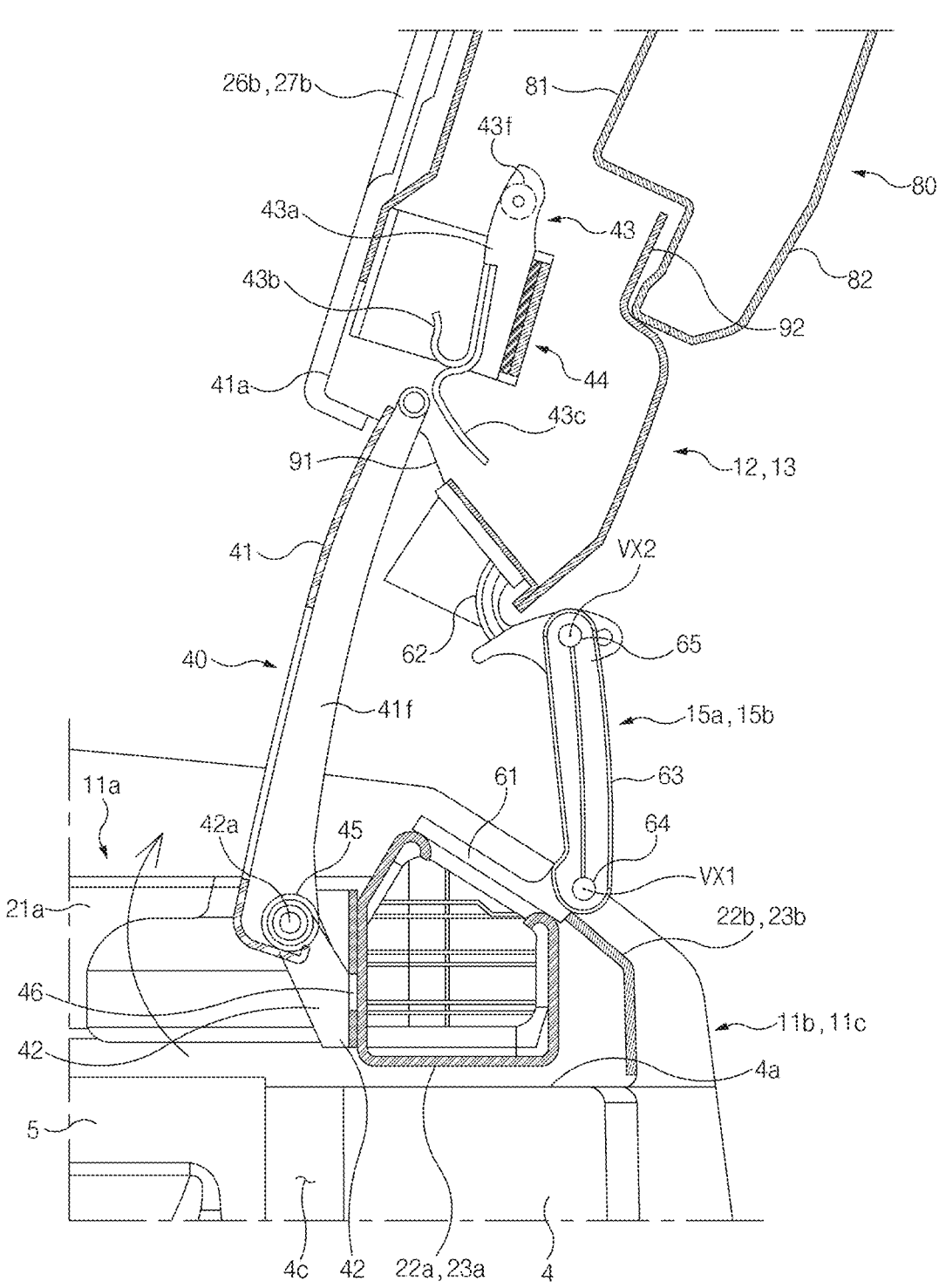
FIG. 29 illustrates a cross-sectional view of a state in which a door moves from a second open position to a first open position in a vehicle tailgate apparatus according to an example embodiment of the present disclosure.

Referring to FIG. 29, as each of the doors 12 and 13 moves from the second open position to the first open position, and the check strip 41 pivots toward each of the doors 12 and 13, the check strip 41 may be received in the inside of each of the doors 12 and 13 through the side opening 91 of each of the doors 12 and 13, and the coupling pin 41a of the check strip 41 may be guided to the hook 43b of the stopper 43 by the restore guide 43c of the stopper 43. When each of the doors 12 and 13 completely moves from the second open position to the first open position, the coupling pin 41a of the check strip 41 may be recoupled to the hook 43b of the stopper 43 (see FIG. 23). Then, as each of the doors 12 and 13 moves from the first open position to the closed position, the coupling pin 41a of the check strip 41 may come into contact with the stopper 43 in the inside of each of the doors 12 and 13 so that the check strip 41 may be parallel to each of the doors 12 and 13 (see FIG. 21).

Referring to FIG. 6, the tailgate apparatus 100 according to an example embodiment of the present disclosure may include a drive mechanism 50 configured to move the main frame 11 of the tailgate 10 between the open position and the closed position. The drive mechanism 50 may be disposed in any one of (or both of) the pair of sidewalls 4 to move the corresponding one of the cables 59a and 59b. According to an example embodiment, as the drive mechanism 50 moves the first cable 59a in the longitudinal direction of the vehicle, the main frame 11 of the tailgate 10 may move between the closed position and the open position.

A frame open switch 79 may be provided on a top surface of each sidewall 4, and the frame open switch 79 may be electrically/wirelessly connected to the controller 150. The controller 150 may control the drive mechanism 50 and the frame latches 58, and accordingly the main frame 11 may move between the open position and the closed position under the control of the controller 150. When the user presses the frame open switch 79 to turn on the frame open switch 79, the controller 150 may control the unlocking of the frame latches 58 and the operation of the drive mechanism 50 so that the main frame 11 may move between the open position and the closed position.

Referring to FIGS. 30 to 34, the drive mechanism 50 may be disposed in the corresponding sidewall 4, and the sidewall 4 may include an outer panel 4e facing the outside of the vehicle body 2, an inner panel 4f facing the luggage compartment 3 of the vehicle body 2, and an upper trim 78 provided on a top edge of the outer panel 4e and a top edge of the inner panel 4f. The frame open switch 79 may be provided on the upper trim 78.

Referring to FIGS. 30 to 34, the drive mechanism 50 may include a spindle drive 51 configured to move the first cable 59a. The spindle drive 51 may be extended or retracted in the longitudinal direction of the vehicle body 2 so that the length of the spindle drive 51 may be increased or reduced in the longitudinal direction of the vehicle body 2.

Figure 30:
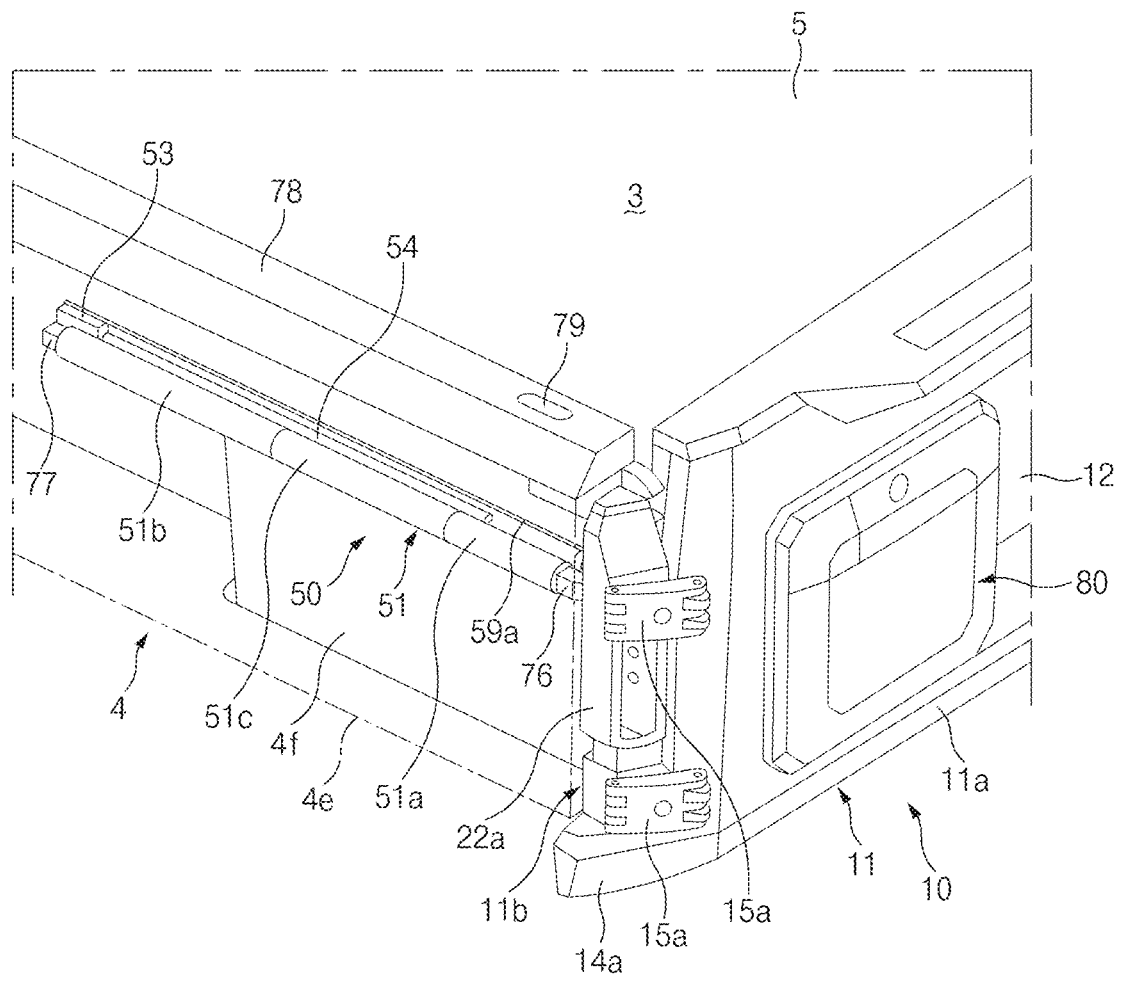
FIG. 30 illustrates a state in which a tailgate is in a closed position as a spindle drive of a drive mechanism is extended in a vehicle tailgate apparatus according to an example embodiment of the present disclosure, which is viewed from the outside of the vehicle.
Figure 31:
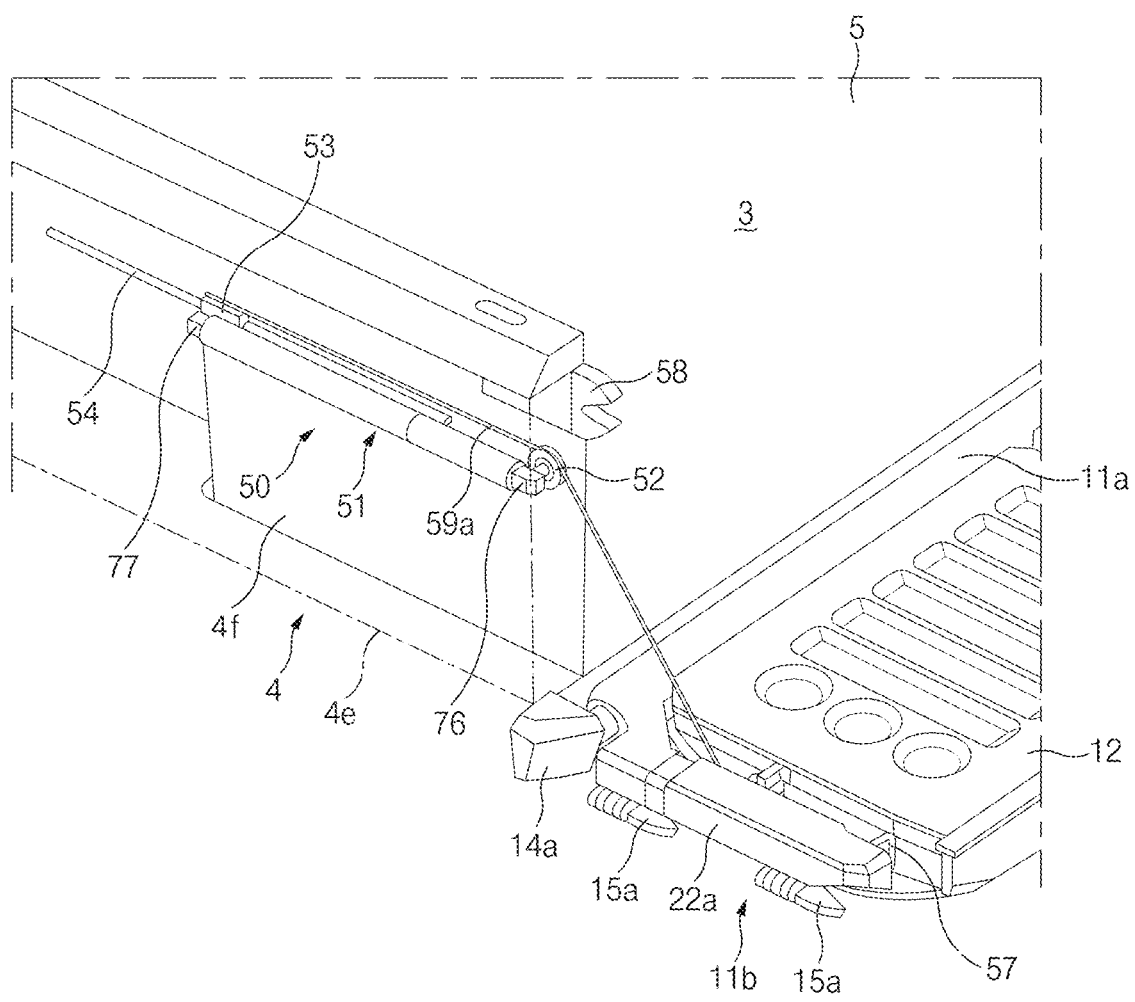
FIG. 31 illustrates a state in which a tailgate is in an open position as a spindle drive of a drive mechanism is retracted in a vehicle tailgate apparatus according to an example embodiment of the present disclosure, which is viewed from the outside of the vehicle.
Figure 32:
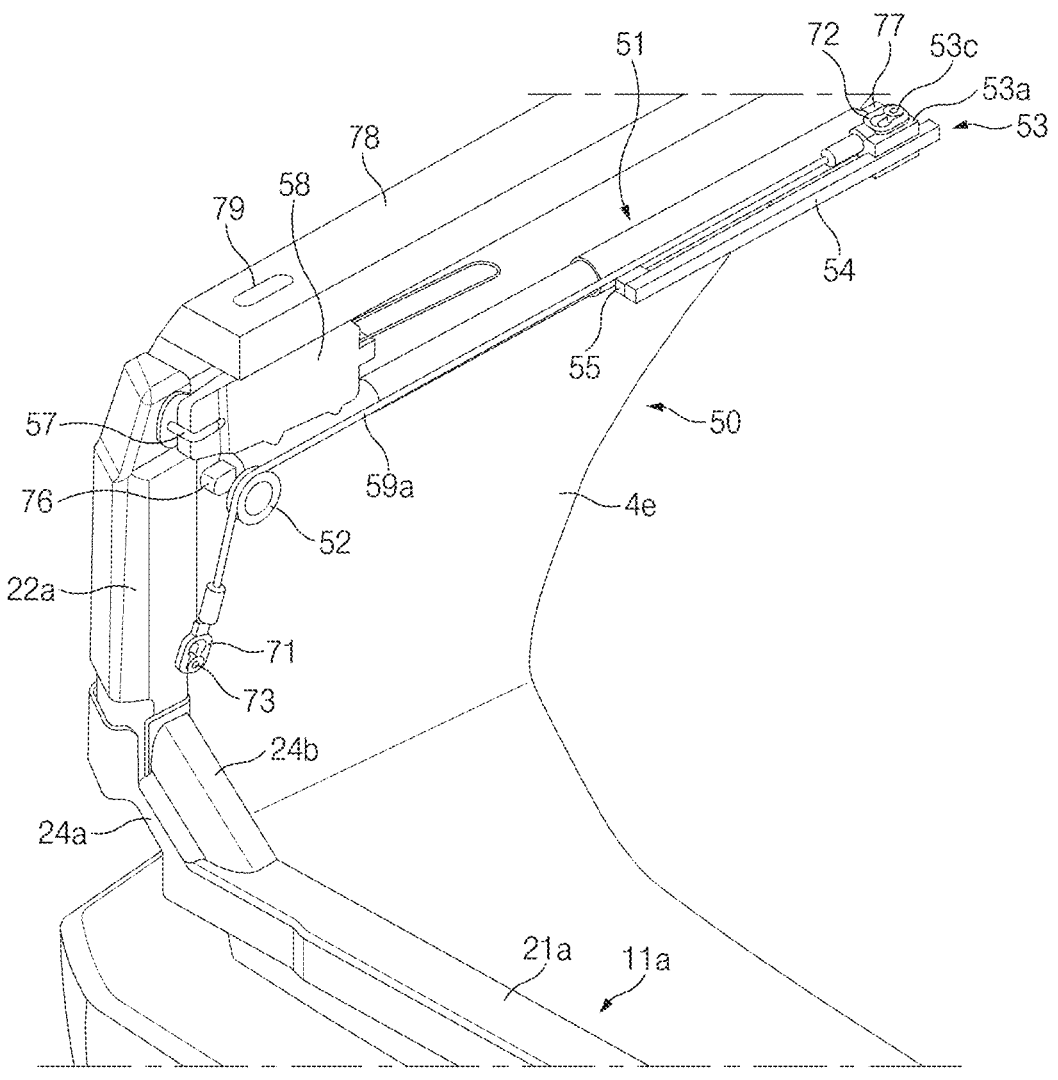
FIG. 32 illustrates a state in which a tailgate is in a closed position as a spindle drive of a drive mechanism is extended in a vehicle tailgate apparatus according to an example embodiment of the present disclosure, which is viewed from the inside of a luggage compartment.
Figure 33:
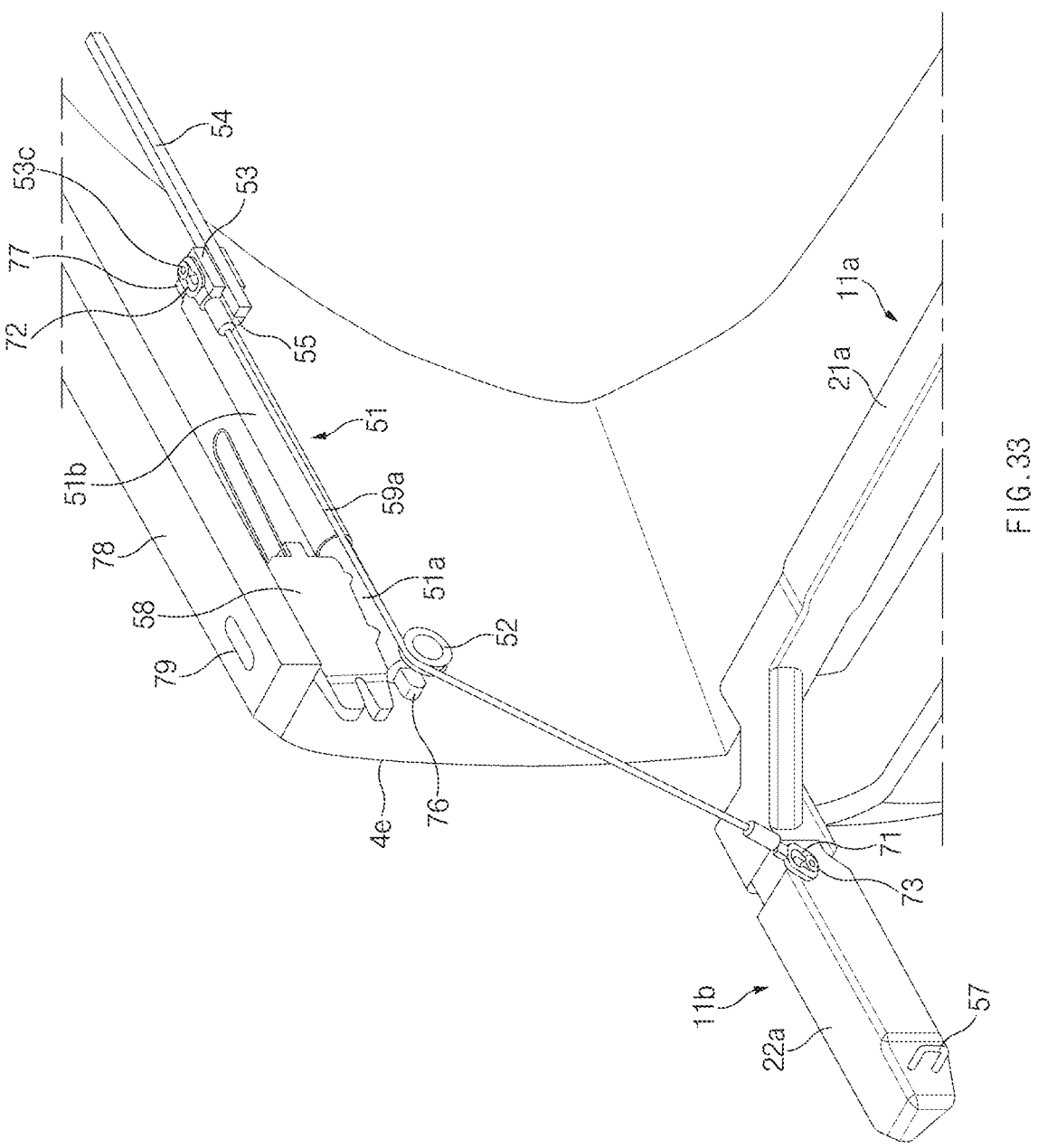
FIG. 33 illustrates a state in which a tailgate is in an open position as a spindle drive of a drive mechanism is retracted in a vehicle tailgate apparatus according to an example embodiment of the present disclosure, which is viewed from the inside of a luggage compartment.

The spindle drive 51 may have a first end portion 76 adjacent to the tailgate 10, and a second end portion 77 far from the tailgate 10. The first end portion 76 of the spindle drive 51 may be supported to a portion of the sidewall 4 adjacent to the tailgate 10. As the spindle drive 51 can be extended or retracted in the longitudinal direction of the vehicle, the second end portion 77 may move toward the front of the vehicle body 2 or the rear of the vehicle body 2. Referring to FIGS. 30 and 32, when the spindle drive 51 is extended, the second end portion 77 may move toward the front of the vehicle body 2, and accordingly the second end portion 77 may be relatively far away from the first end portion 76. Referring to FIGS. 31 and 33, when the spindle drive 51 is retracted, the second end portion 77 may move toward the rear of the vehicle body 2, and accordingly the second end portion 77 may be relatively close to the first end portion 76.

The first cable 59a may extend from the second end portion 77 of the spindle drive 51 or a portion adjacent thereto to the tailgate 10, and the first cable 59a may extend through an opening of the corresponding sidewall 4. The first cable 59a may connect the main frame 11 of the tailgate 10 and the second end portion 77 of the spindle drive 51. For example, a first end portion 71 of the first cable 59a may be connected to the main frame 11 of the tailgate 10, and a second end portion 72 of the first cable 59a may be connected to the second end portion 77 of the spindle drive 51. As the spindle drive 51 can be extended or retracted in the longitudinal direction of the vehicle body 2, the first cable 59a may move within the corresponding sidewall 4 in the longitudinal direction of the vehicle body 2. Referring to FIGS. 30 and 32, when the spindle drive 51 is extended, the first cable 59a may move toward the front of the vehicle body 2, and accordingly the tailgate 10 may move to the closed position. Referring to FIGS. 31 and 33, when the spindle drive 51 is retracted, the first cable 59a may move toward the rear of the vehicle body 2, and accordingly the tailgate 10 may move to the open position.

As described above, the first end portion 76 of the spindle drive 51 may be held in position adjacent to the tailgate 10, and the second end portion 77 of the spindle drive 51 may move toward the front of the vehicle body 2 or the rear of the vehicle body 2 by the extension or retraction of the spindle drive 51 so that the first cable 59a connecting the second end portion 77 of the spindle drive 51 and the tailgate 10 may move in the longitudinal direction of the vehicle, and accordingly the opening and closing of the tailgate 10 may be stably performed.

Referring to FIGS. 30 to 33, the second end portion 77 of the spindle drive 51 may be configured to move in the longitudinal direction of the vehicle body 2. The drive mechanism 50 may further include a guide rail 54 guiding the movement of the second end portion 77 of the spindle drive 51. Referring to FIGS. 30 and 31, the guide rail 54 may extend in the longitudinal direction of the vehicle body 2 within the sidewall 4, and the guide rail 54 may be fixed to the inner panel 4f of the sidewall 4.

The drive mechanism 50 may further include a rail block 53 connected to the second end portion 77 of the spindle drive 51, and the rail block 53 may be configured to slide along the guide rail 54. As the spindle drive 51 can be extended or retracted, the rail block 53 may move along the guide rail 54 together with the second end portion 77 of the spindle drive 51. Referring to FIGS. 30 and 32, when the spindle drive 51 is extended, the rail block 53 and the second end portion 77 of the spindle drive 51 may move forward toward the front of the vehicle body 2. Referring to FIGS. 31 and 33, when the spindle drive 51 is retracted, the rail block 53 and the second end portion 77 of the spindle drive 51 may move back toward the rear of the vehicle body 2.

Figure 39:
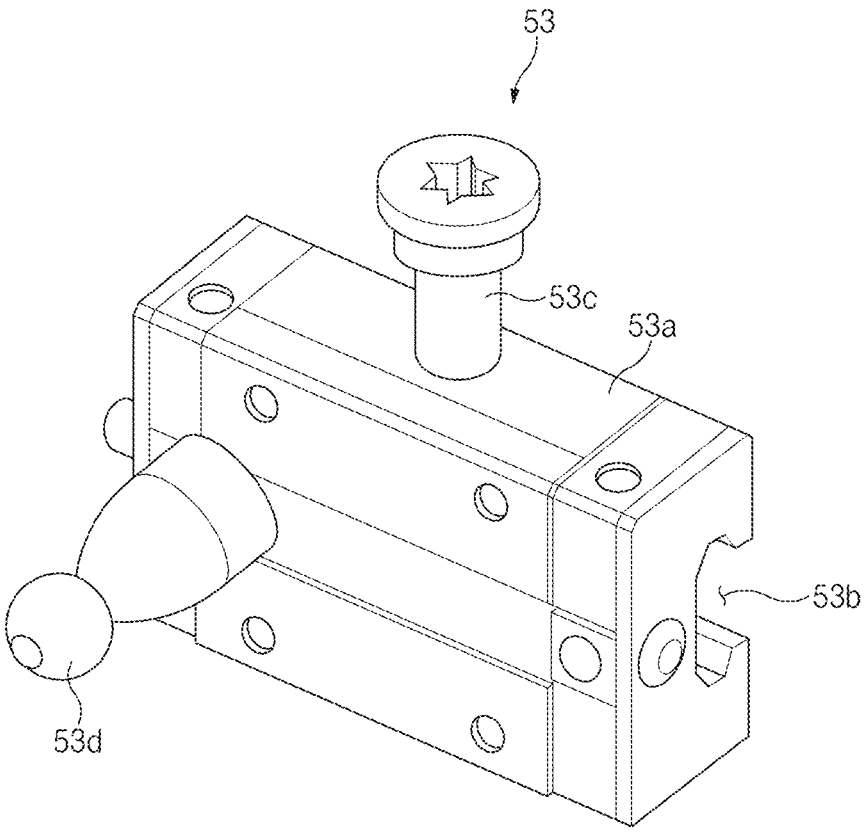
FIG. 39 illustrates a perspective view of a rail block of a drive mechanism in a vehicle tailgate apparatus according to an example embodiment of the present disclosure.

Referring to FIG. 39, the rail block 53 may include a block body 53a having a slide groove 53b into which the guide rail 54 can be slidably inserted, a fixed pin 53c protruding upward from the block body 53a, and a connection projection 53d protruding from the block body 53a toward the second end portion 77 of the spindle drive 51.

Referring to FIGS. 33, 34, 36, and 37, a stopper 55 may be fixed to a rear end of the guide rail 54. The stopper 55 may limit a moving range of the rail block 53 when the rail block 53 moves toward the rear of the vehicle body 2 so that the stopper 55 may limit a retracted length of the spindle drive 51. When the spindle drive 51 can be retracted, the rail block 53 together with the second end portion 77 of the spindle drive 51 may move toward the rear of the vehicle body 2, and the rail block 53 may be stopped by the stopper 55 so that the retracted length of the spindle drive 51 may be limited, and the stopper 55 may prevent an excessive load from being applied to a motor 56a of the spindle drive 51. As the rail block 53 comes into contact with the stopper 55, the spindle drive 51 may be retracted to a minimum retracted length. Even when the tailgate 10 is manually opened, the stopper 55 may limit the backward movement of the rail block 53 so that the manual opening of the tailgate 10 may be stably performed due to the stopper 55.

Figure 34:
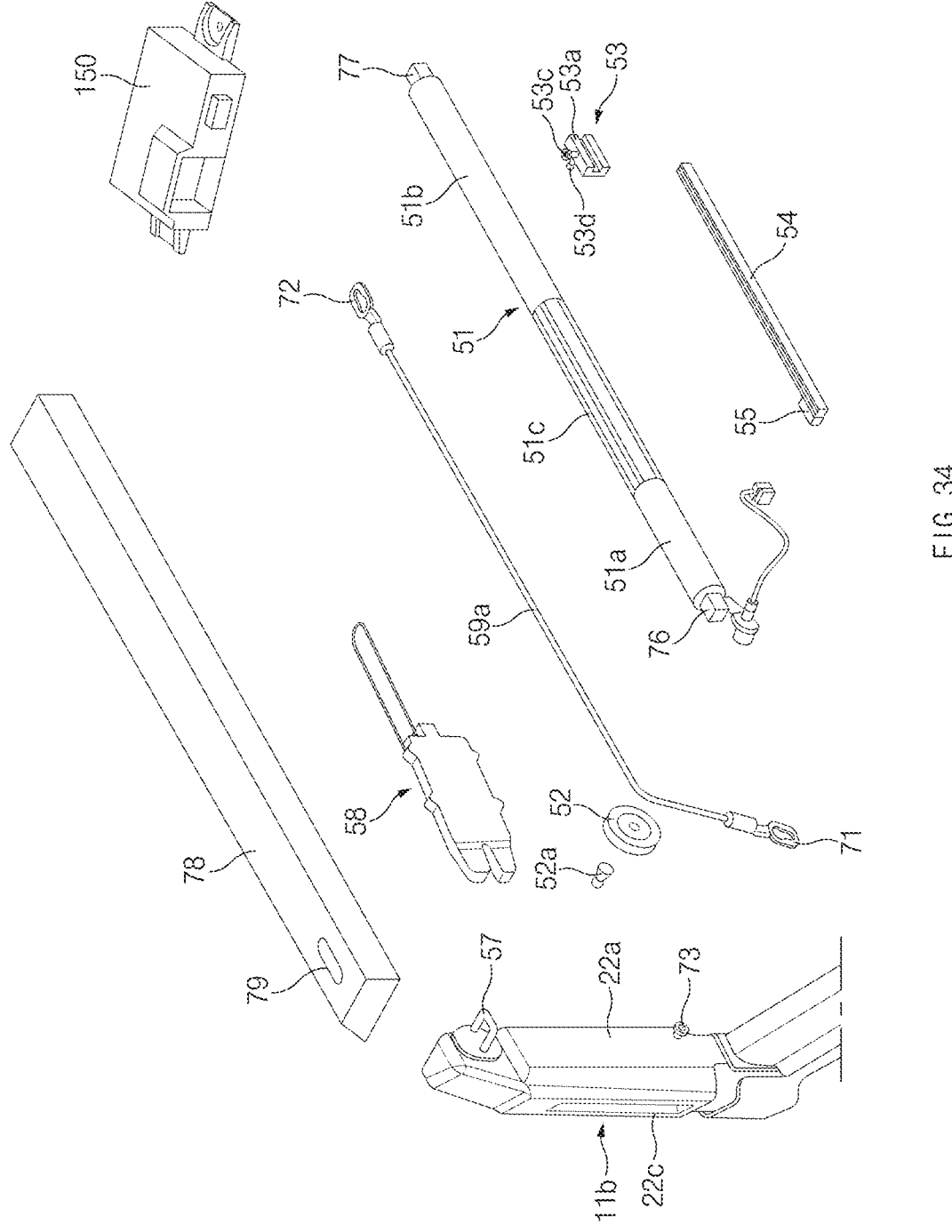
FIG. 34 illustrates an exploded perspective view of a drive mechanism in a vehicle tailgate apparatus according to an example embodiment of the present disclosure.
Figure 37:
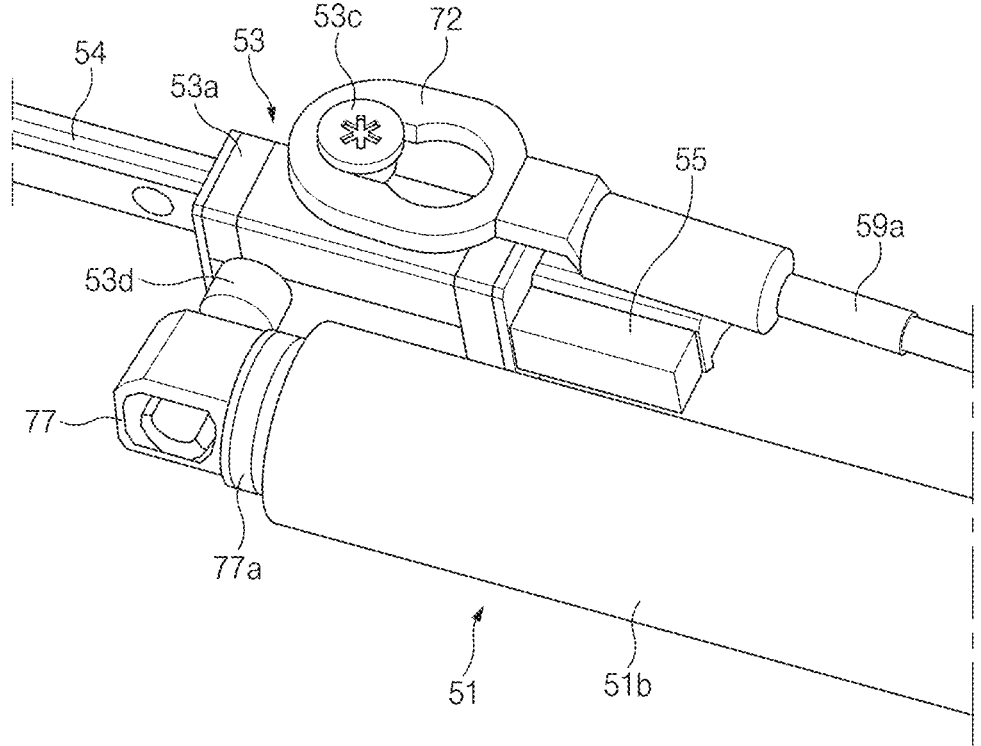
FIG. 37 illustrates an enlarged view of a state in which a rail block is stopped by a stopper when a spindle drive of a drive mechanism is retracted in a vehicle tailgate apparatus according to an example embodiment of the present disclosure.
Figure 38:
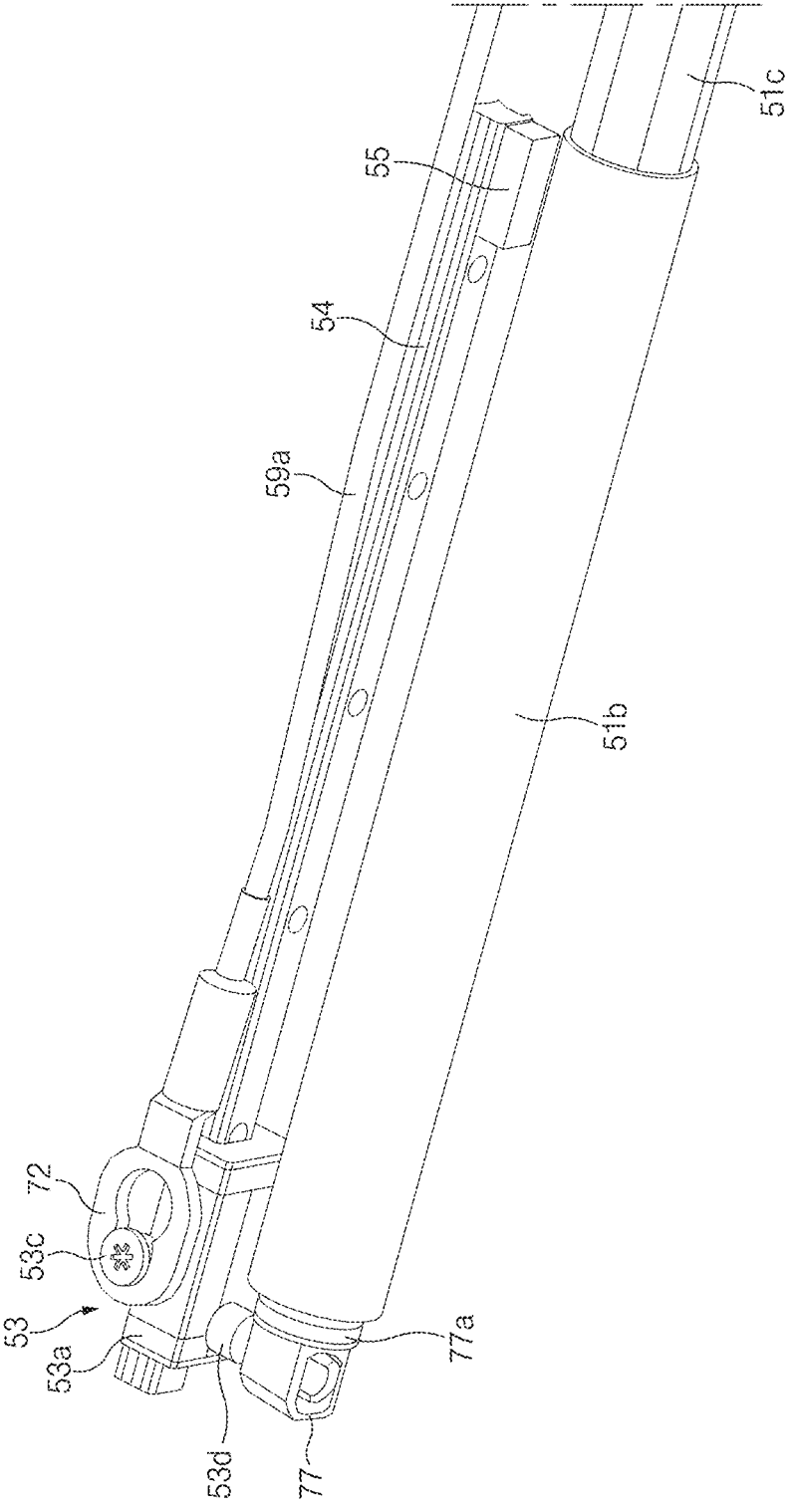
FIG. 38 illustrates a state in which a spindle drive of a drive mechanism is extended in a vehicle tailgate apparatus according to an example embodiment of the present disclosure.

The first end portion 71 of the first cable 59a may be connected to the first side portion 11b of the main frame 11 of the tailgate 10, and the second end portion 72 of the first cable 59a may be connected to the second end portion 77 of the spindle drive 51. Referring to FIG. 34, the first end portion 71 of the first cable 59a may have at least one insert hole, and the second end portion 72 of the first cable 59a may have at least one insert hole. Referring to FIGS. 32 and 33, a fixed pin 73 may be fixed to the first side member 22a of the first side portion 11b of the main frame 11, and the fixed pin 73 may be inserted into the insert hole of the first end portion 71 of the first cable 59a so that the first end portion 71 of the first cable 59a may be detachably coupled to the fixed pin 73. Referring to FIG. 37, the fixed pin 53c of the rail block 53 may be inserted into the insert hole of the second end portion 72 of the first cable 59a so that the second end portion 72 of the first cable 59a may be detachably coupled to the fixed pin 53c of the rail block 53. The second end portion 77 of the spindle drive 51 may be connected to the connection projection 53d of the rail block 53, and accordingly the second end portion 77 of the spindle drive 51 may be connected to the second end portion 72 of the first cable 59a through the rail block 53. The second end portion 77 of the spindle drive 51 may be a socket element having a spherical recess, and the connection projection 53d of the rail block 53 may be a spherical ball element. The connection projection 53d of the rail block 53 may be inserted into the recess of the second end portion 77 of the spindle drive 51 so that the connection projection 53d of the rail block 53 and the second end portion 77 of the spindle drive 51 may form a ball-socket joint.

Figure 35:
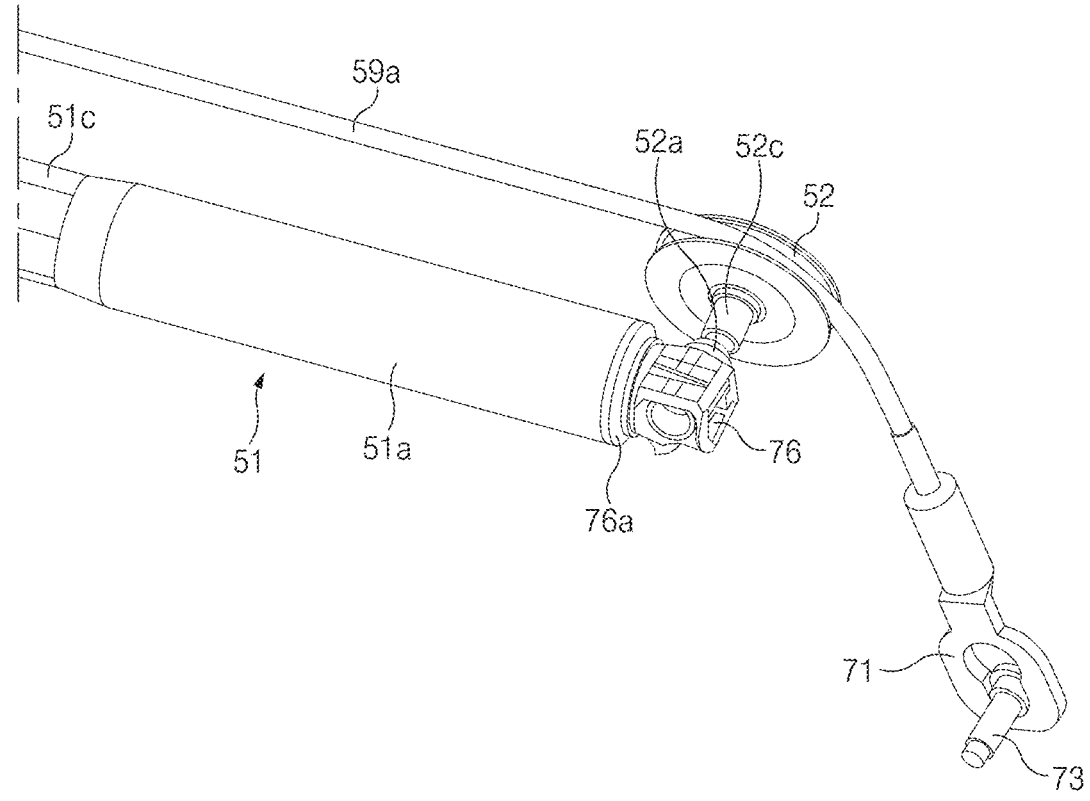
FIG. 35 illustrates a perspective view of a front portion of a spindle drive, a guide pulley, and a first cable of a drive mechanism in a vehicle tailgate apparatus according to an example embodiment of the present disclosure.

The drive mechanism 50 may further include a guide pulley 52 configured to guide the movement of the first cable 59a. The guide pulley 52 may be rotatably mounted on a portion of the sidewall 4 adjacent to the tailgate 10. A shaft 52c may be fixed to the inner panel 4f of the sidewall 4 through a fastener, and the guide pulley 52 may be rotatably supported on the shaft 52c so that the guide pulley 52 may guide the movement of the first cable 59a. Referring to FIG. 35, the guide pulley 52 may be rotatably supported on the shaft 52c, and a ball element 52a may be fixed to the shaft 52c.

According to an example embodiment, the first end portion 76 of the spindle drive 51 may be fixed to the inner panel 4f of the sidewall 4.

Figure 36:
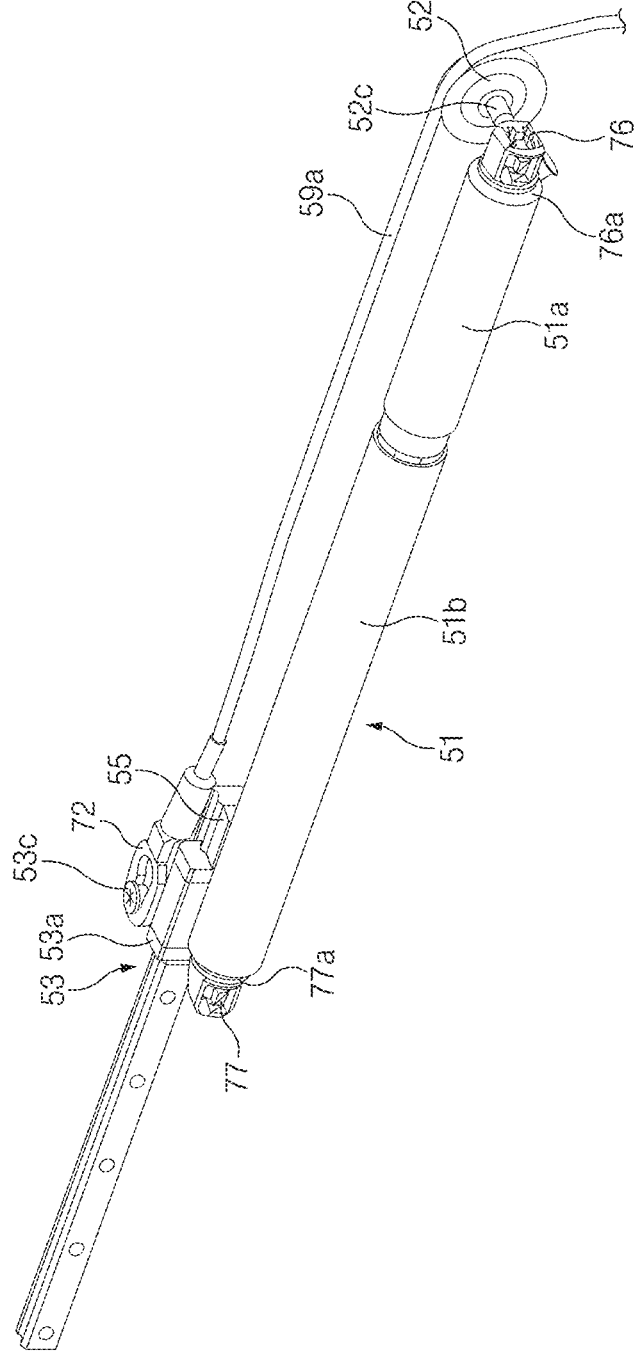
FIG. 36 illustrates a state in which a spindle drive of a drive mechanism is retracted in a vehicle tailgate apparatus according to an example embodiment of the present disclosure.

According to another example embodiment, the first end portion 76 of the spindle drive 51 may be connected to the shaft 52c of the guide pulley 52. Referring to FIGS. 35 and 36, the first end portion 76 of the spindle drive 51 may be connected to the guide pulley 52. The first end portion 76 of the spindle drive 51 may be a socket element having a spherical recess. The ball element 52a of the guide pulley 52 may be inserted into the recess of the first end portion 76 of the spindle drive 51 so that the first end portion 76 of the spindle drive 51 and the ball element 52a of the guide pulley 52 may form a ball-socket joint.

Figure 40:
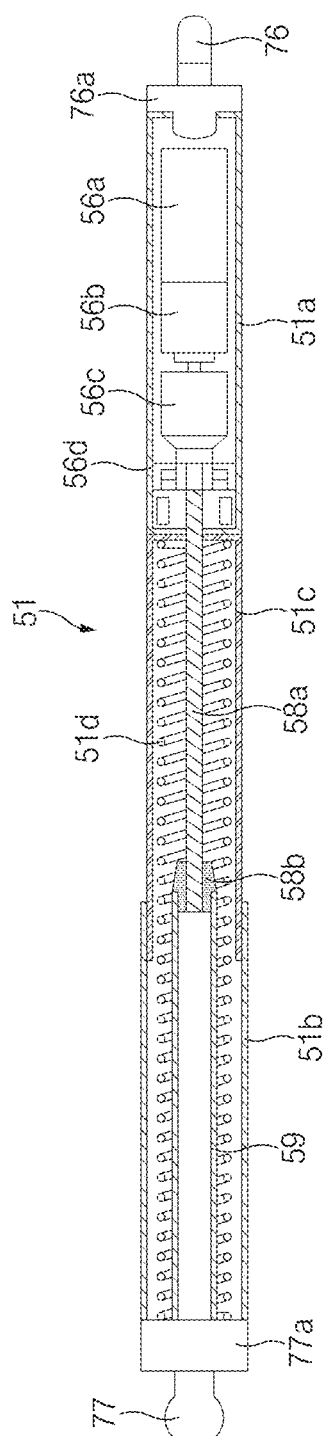
FIG. 40 illustrates a cross-sectional view of a spindle drive of a drive mechanism in a vehicle tailgate apparatus according to an example embodiment of the present disclosure.
Figure 41:
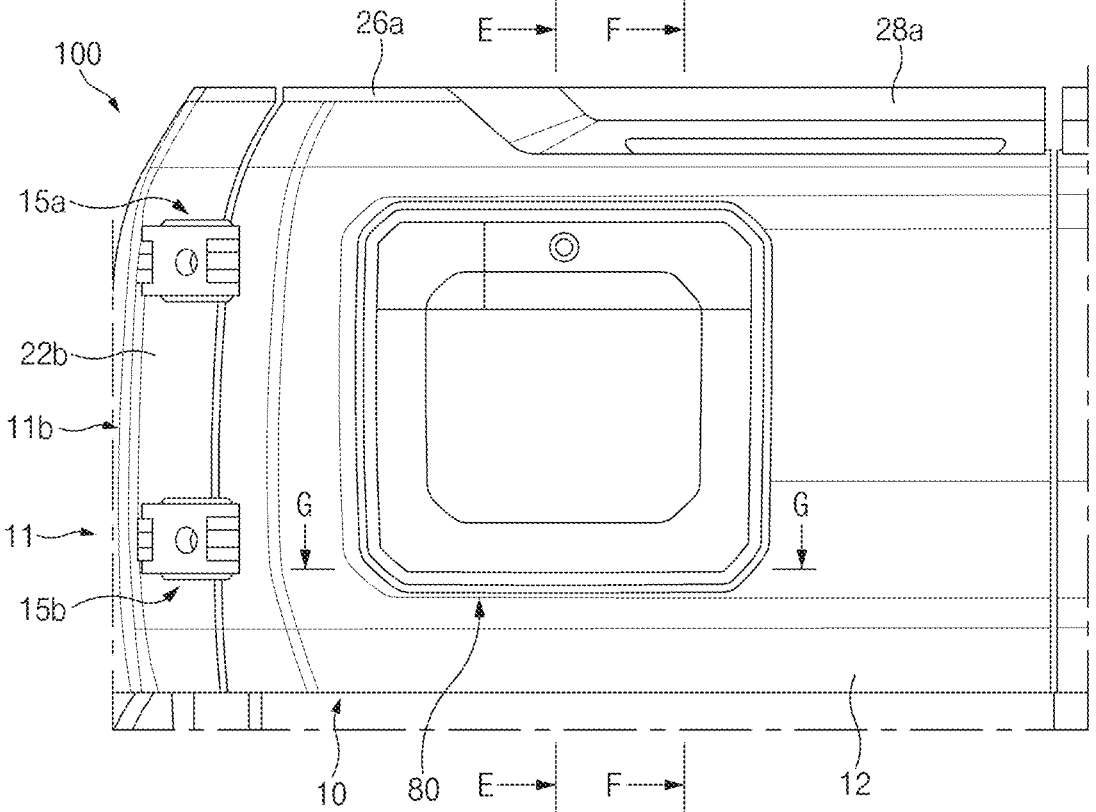
FIG. 41 illustrates a state in which a tailgate is in an upright position, and a first door is in a closed position in a vehicle tailgate apparatus according to an example embodiment of the present disclosure.

According to an example embodiment of the present disclosure, the spindle drive 51 may include a housing tube 51a fixed to the sidewall 4 of the vehicle body 2, and a moving tube 51b movable with respect to the housing tube 51a. The spindle drive 51 may further include a guide tube 51c disposed between the housing tube 51a and the moving tube 51*b*. The guide tube 51*c* may be configured to guide the movement of the moving tube 51*b*. According to an example embodiment, as illustrated in FIG. 40, an outer diameter of the guide tube 51*c* may be less than an inner diameter of the moving tube 51*b*. According to another example embodiment, an inner diameter of the guide tube 51*c* may be greater than an outer diameter of the moving tube 51*b*.

Referring to FIG. 40, the spindle drive 51 may include the motor 56*a* disposed in the housing tube 51*a*, a spindle 58*a* rotating by the motor 56*a*, a spindle nut 58*b* meshing with the spindle 58*a*, and a spindle tube 59 connected to the spindle nut 58*b*. The motor 56*a* may be a bidirectional motor configured to rotate clockwise and counterclockwise. A first end of the spindle 58*a* may be connected to the motor 56*a* within the housing tube 51*a*, and a second end of the spindle 58*a* may be located far from the housing tube 51*a*. The spindle 58*a* may be disposed in the inside of the housing tube 51*a*, the inside of the guide tube 51*c*, and the inside of the moving tube 51*b*. A longitudinal axis of the spindle 58*a* and a longitudinal axis of the spindle nut 58*b* may be aligned with a longitudinal axis of the spindle drive 51. The spindle 58*a* may have an external thread formed on an outer peripheral surface thereof, and the spindle nut 58*b* may have an internal thread formed on an inner peripheral surface thereof. The external thread of the spindle 58*a* may have a relatively long pitch and a relatively small pitch angle. As the spindle 58*a* rotates clockwise or counterclockwise by the motor 56*a*, the spindle nut 58*b* may move linearly along the longitudinal axis of the spindle 58*a*. The spindle tube 59 may be fixed to the spindle nut 58*b*, and the spindle tube 59 may move together with the spindle nut 58*b* in the same direction.

Referring to FIG. 40, a first end of the housing tube 51*a* may be located far from the moving tube 51*b*, a second end of the housing tube 51*a* may be adjacent to the moving tube 51*b*, and the first end of the housing tube 51*a* may be adjacent to the tailgate 10. A first end cap 76*a* may be mounted on the first end of the housing tube 51*a*, and the first end portion 76 of the spindle drive 51 may protrude from the first end cap 76*a* so that the first end portion 76 of the spindle drive 51 may be provided at the first end of the housing tube 51*a*. A first end of the moving tube 51*b* may be adjacent to the housing tube 51*a*, and a second end of the moving tube 51*b* may be located far from the housing tube 51*a*. A second end cap 77*a* may be mounted on the second end of the moving tube 51*b*, and the second end portion 77 of the spindle drive 51 may protrude from the second end cap 77*a* so that the second end portion 77 of the spindle drive 51 may be provided at the second end of the moving tube 51*b*. A first end of the spindle tube 59 may be fixed to the spindle nut 58*b*, and a second end of the spindle tube 59 may be connected to the second end cap 77*a*. The second end of the spindle tube 59 may be connected to the moving tube 51*b* through the second end cap 77*a*. That is, both ends of the spindle tube 59 may be connected to the spindle nut 58*b* and the moving tube 51*b*. When the spindle 58*a* rotates in a first direction (for example, a clockwise direction), the spindle nut 58*b* may move away from the housing tube 51*a*. Accordingly, the spindle nut 58*b* and the spindle tube 59 may move away from the housing tube 51*a* so that the moving tube 51*b* may move to an extended position away from the housing tube 51*a*, and the spindle drive 51 may be extended. When the spindle 58*a* rotates in a second direction (for example, a counterclockwise direction), the spindle nut 58*b* may move close to the housing tube 51*a*. Accordingly, the spindle nut 58*b* and the spindle tube 59 may move close to the housing tube 51*a* so that the moving tube 51*b* may move to a retracted position close to the housing tube 51*a*, and the spindle drive 51 may be retracted.

Referring to FIG. 40, the spindle drive 51 may further include a spring 51*d* allowing the spindle drive 51 to be biased in a direction in which the spindle drive 51 can be extended. The spring 51*d* may be configured to provide a biasing force to allow the moving tube 51*b* to be biased to the extended position. Both ends of the spring 51*d* may be supported to the housing tube 51*a* and the moving tube 51*b*, respectively. For example, a first end of the spring 51*d* may be supported to the housing tube 51*a*, and a second end of the spring 51*d* may be supported to the second end cap 77*a*. As the spring 51*d* allows the spindle drive 51 to be biased and extended, the manual closing of the tailgate 10 may be assisted by the spring 51*d* of the spindle drive 51.

Referring to FIG. 40, a gearbox 56*b*, a coupler 56*c*, and a brake 56*d* may be received in the housing tube 51*a*. The gearbox 56*b* may be connected to an output shaft of the motor 56*a*, and the coupler 56*c* may be configured to connect the gearbox 56*b* and the spindle 58*a*. The brake 56*d* may provide a brake torque to the spindle 58*a*.

According to the above-described example embodiment, the drive mechanism 50 may be configured to move only the first cable 59*a* of the pair of cables 59*a* and 59*b*. The second cable 59*b* may be configured to connect the second side portion 11*c* of the main frame 11 and the corresponding sidewall 4.

According to another example embodiment, the pair of drive mechanisms 50 may be configured to move the first cable 59*a* and the second cable 59*b*, respectively.

Referring to FIG. 1, the tailgate apparatus 100 according to an example embodiment of the present disclosure may include a step mechanism 80 configured to be stowed in and deployed from the tailgate 10 when the tailgate 10 is opened and closed. The step mechanism 80 may be configured to be stowed in and deployed from at least one of the first door 12 and the second door 13 of the tailgate 10.

Referring to FIG. 1, in a state in which the tailgate 10 is in the closed position, the step mechanism 80 may be stowed in the first door 12 of the tailgate 10. Referring to FIG. 5, in a state in which the tailgate 10 is in the open position, the step mechanism 80 may be deployed from the first door 12 of the tailgate 10. Accordingly, it may be easy for the user to get on and off the luggage compartment 3 of the vehicle body 2 through the step mechanism 80.

Figure 19:
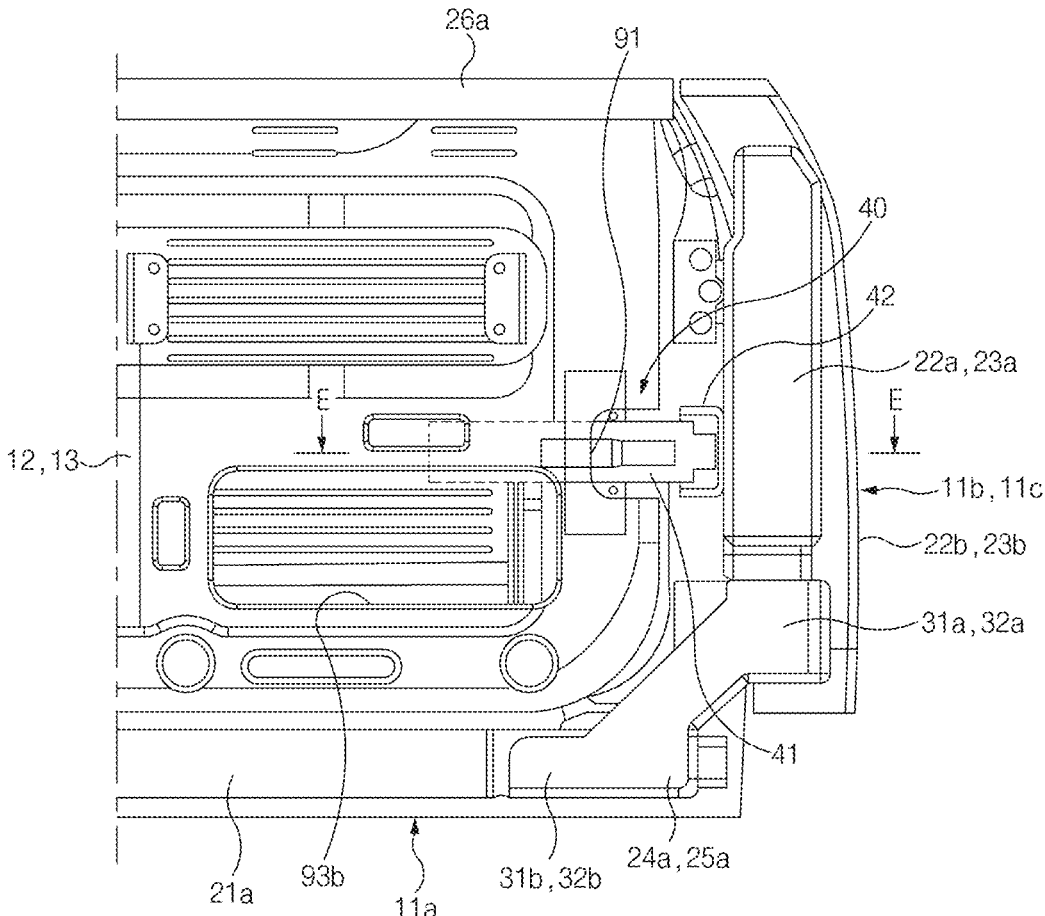
FIG. 19 illustrates a state in which a tailgate is in a closed position in a vehicle tailgate apparatus according to an example embodiment of the present disclosure, which is viewed from the inside of a luggage compartment.

Referring to FIG. 6, the first door 12 may have an accommodating opening 93*a* provided in the exterior surface thereof. The step mechanism 80 may be stowed in the accommodating opening 93*a* of the first door 12 or be deployed from the accommodating opening 93*a* of the first door 12. The first door 12 may have a recessed wall 92 that is recessed from the exterior surface of the first door 12 toward the interior surface of the first door 12. When the step mechanism 80 is stowed in the accommodating opening 93*a* of the first door 12, the step mechanism 80 may be supported by the recessed wall 92. The accommodating opening 93*a* may be formed in the middle of the recessed wall 92. Referring to FIG. 19, the first door 12 may have a through hole 93*b* provided in the interior surface thereof, and the through hole 93*b* may be aligned with the accommodating opening 93*a*. A relatively long object such as a ski may extend through the accommodating opening 93*a* and the through hole 93*b*. Referring to FIG. 21, the step mechanism 80 may include a step body 81 received in the tailgate 10, and a cover body 82 covering the step body 81.

Figure 42:
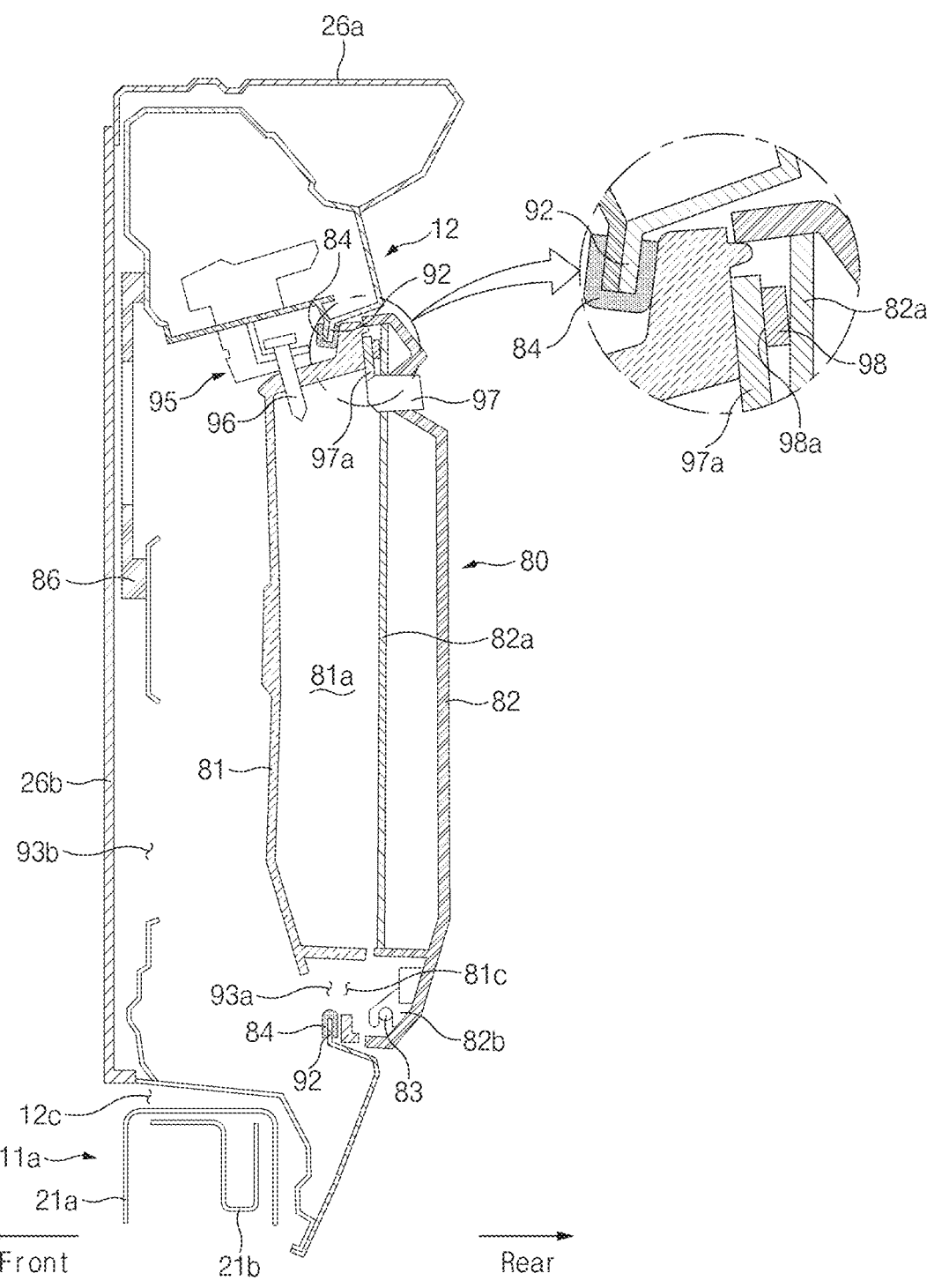
FIG. 42 illustrates a cross-sectional view, taken along line E-E of FIG. 41.
Figure 43:
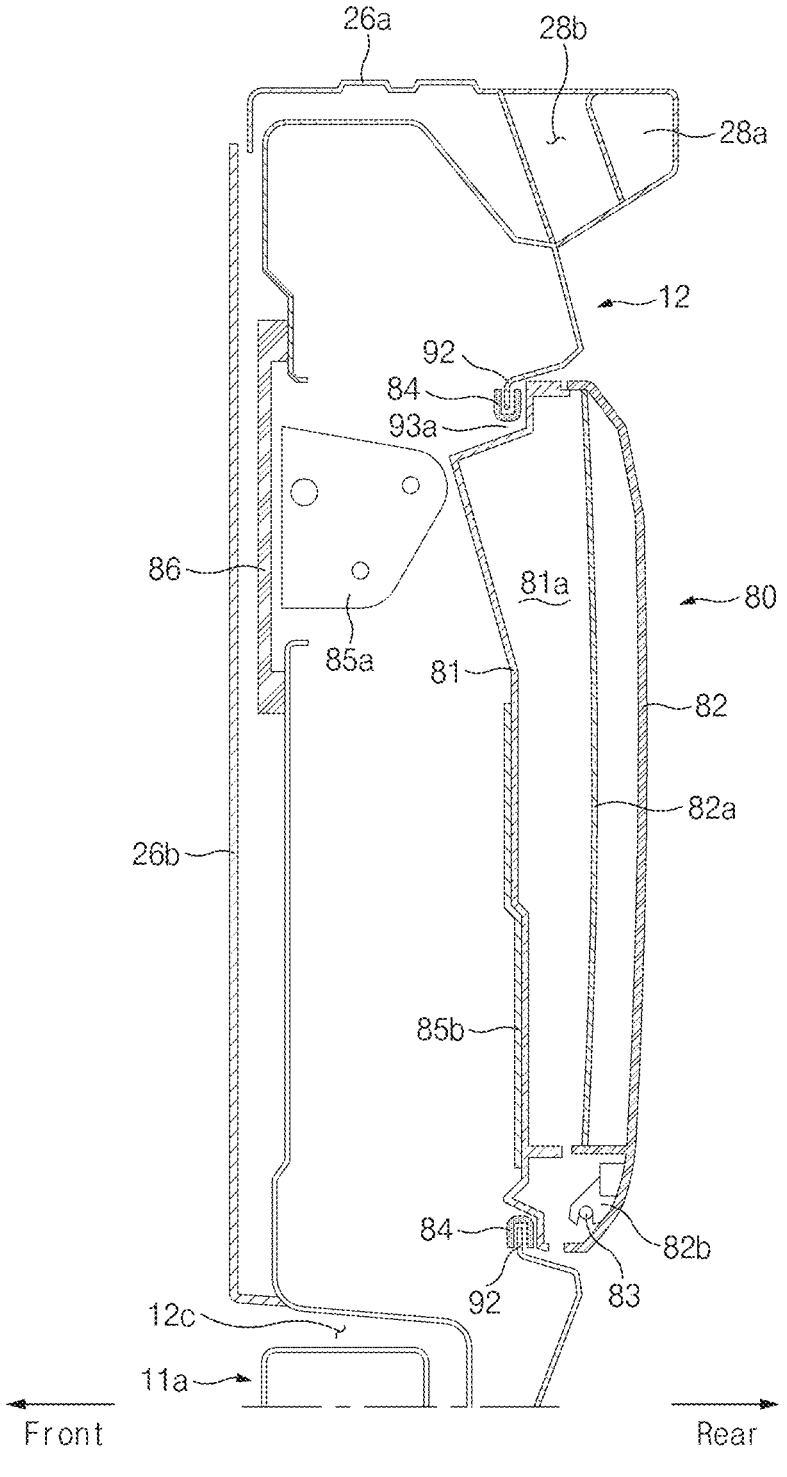
FIG. 43 illustrates a cross-sectional view, taken along line F-F of FIG. 41.
Figure 53:
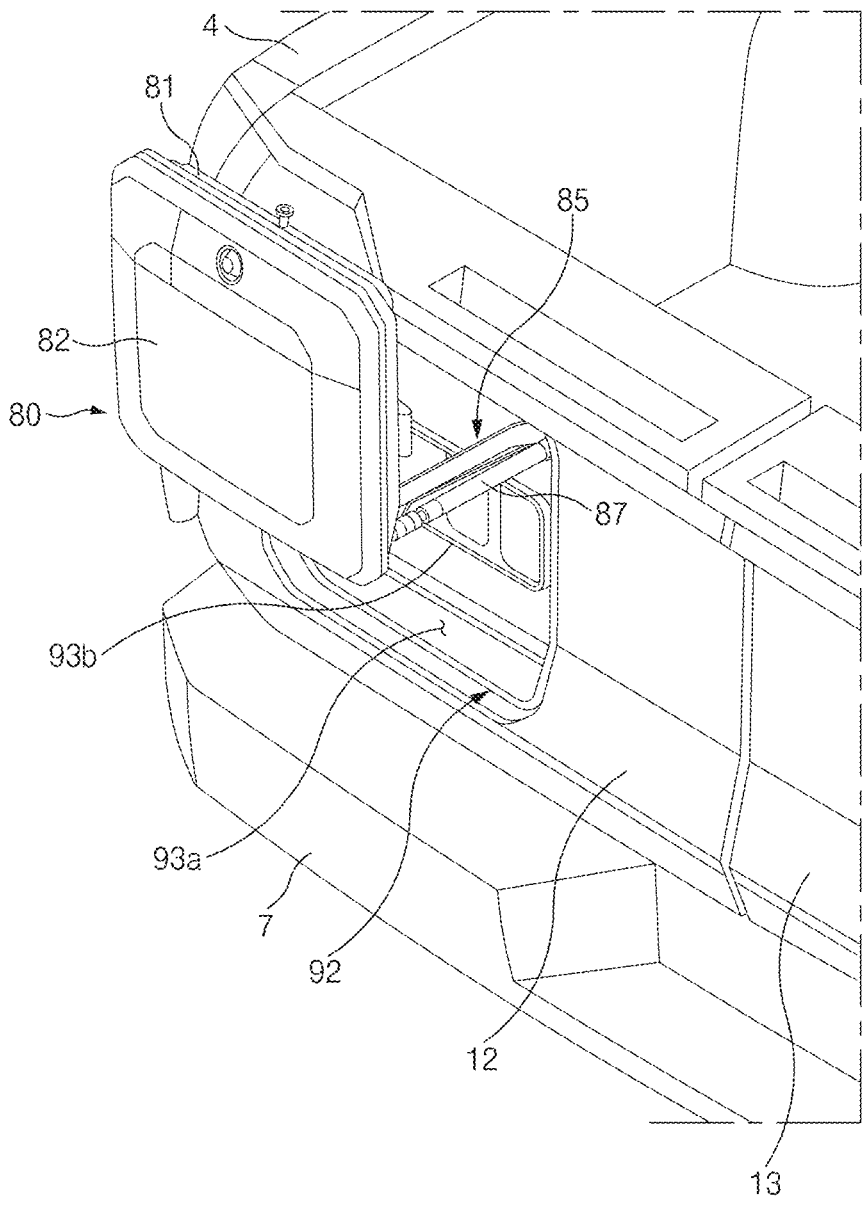
FIG. 53 illustrates a perspective view of a state in which a step mechanism is deployed from a tailgate with the tailgate closed in a vehicle tailgate apparatus according to an example embodiment of the present disclosure.

According to an example embodiment of the present disclosure, the step body 81 may be configured to move between a stowed position and a deployed position by a link mechanism 85, and when the step body 81 moves between the stowed position and the deployed position, the step body 81 may be kept in parallel to the tailgate 10. Referring to FIGS. 42 and 43, the stowed position can refer to a position in which the step body 81 is stowed in the tailgate 10. Referring to FIGS. 5 and 53, the deployed position can refer to a position in which the step body 81 is deployed from the tailgate 10. When the step body 81 is in the deployed position, the step body 81 may be located below the tailgate 10, and the step body 81 may protrude horizontally from the tailgate 10. Accordingly, the user may easily get on and off the luggage compartment 3 by stepping on the step body 81 of the step mechanism 80.

According to an example embodiment, when the step body 81 is in the deployed position, the step body 81 may be substantially parallel to the tailgate 10. According to another example embodiment, when the step body 81 is in the deployed position, the step body 81 may be inclined downward at a slight angle with respect to a horizontal line.

Referring to FIGS. 42 and 43, when the step body 81 is stowed in the first door 12 of the tailgate 10, the step body 81 may be located in the accommodating opening 93a of the first door 12, and the step body 81 may be supported by the recessed wall 92 of the first door 12. A sealing 84 may be provided at edges of the recessed wall 92. Accordingly, when the step body 81 is stowed in the accommodating opening 93a of the first door 12 of the tailgate 10, edges of the step body 81 may contact the sealing 84 so that an interior space of the first door 12 of the tailgate 10 may be sealed.

Figure 45:
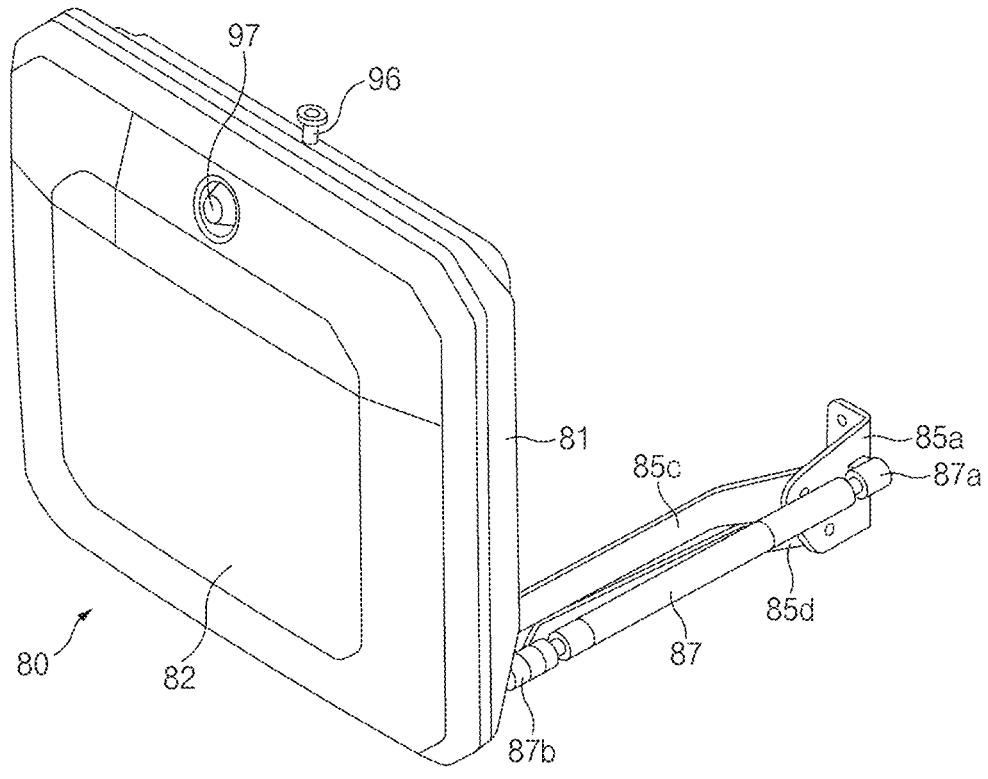
FIG. 45 illustrates a perspective view of a link mechanism mounted on a step mechanism in a vehicle tailgate apparatus according to an example embodiment of the present disclosure.
Figure 46:
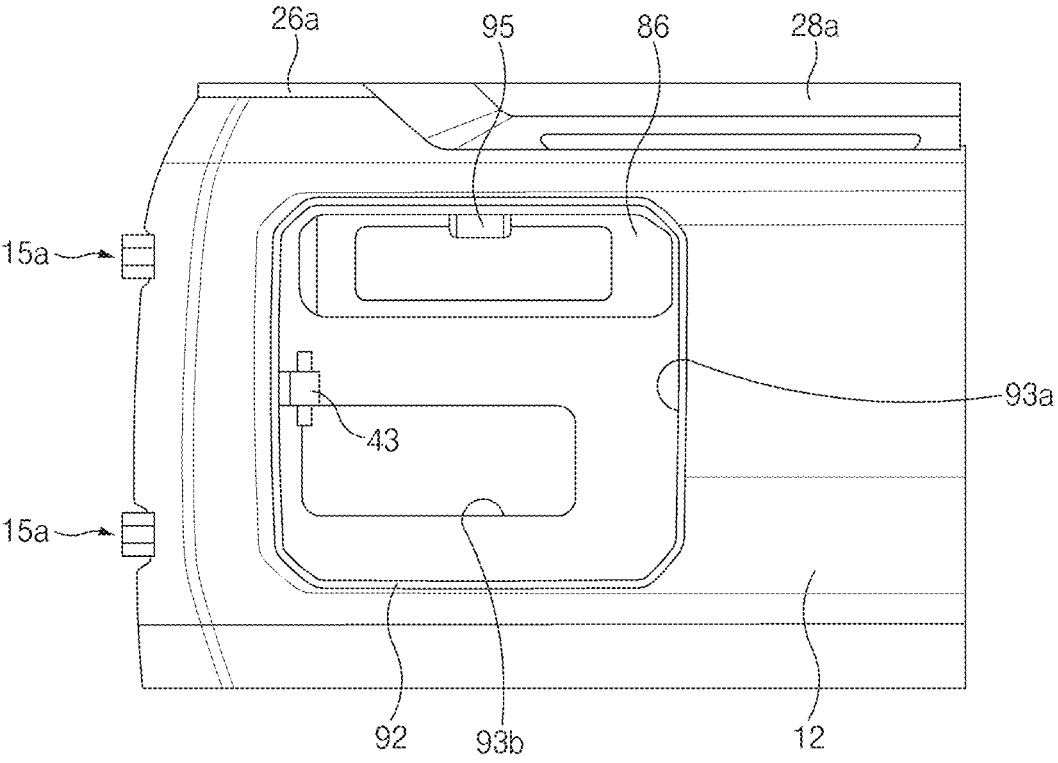
FIG. 46 illustrates a rear view of a first door of a tailgate in a vehicle tailgate apparatus according to an example embodiment of the present disclosure, from which a step mechanism is removed.

Referring to FIG. 42, the step mechanism 80 may include a step striker 96 and a step latch 95 provided between the first door 12 of the tailgate 10 and the step body 81. Referring to FIG. 45, the step striker 96 may protrude upward from a top end of the step body 81. Referring to FIG. 46, the step latch 95 may be provided on the first door 12. The step mechanism 80 may be locked to and unlocked from the first door 12 of the tailgate 10 by the step latch 95 and the step striker 96. As the step latch 95 locks the step striker 96, the step mechanism 80 may be held in the stowed position, and as the step latch 95 unlocks the step striker 96, the step mechanism 80 may be allowed to move. The step latch 95 may be electrically or mechanically connected to the frame open switch 79. When the turn-on of the frame open switch 79 is held for a predetermined period of time (for example, three seconds), the step latch 95 may unlock the step striker 96 under the control of the controller 150. When the frame open switch 79 is turned off, the step latch 95 may lock the step striker 96 under the control of the controller 150.

Figure 44:
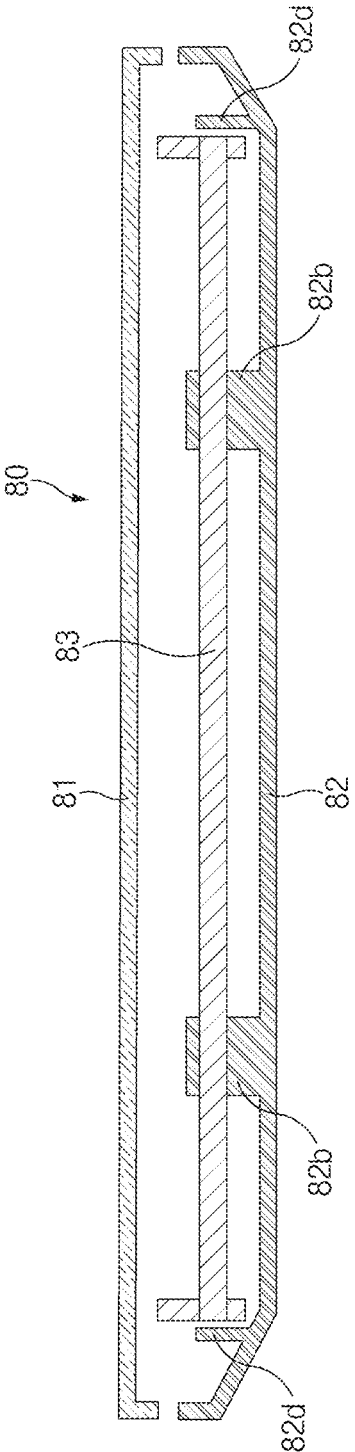
FIG. 44 illustrates a cross-sectional view, taken along line G-G of FIG. 41.
Figure 48:
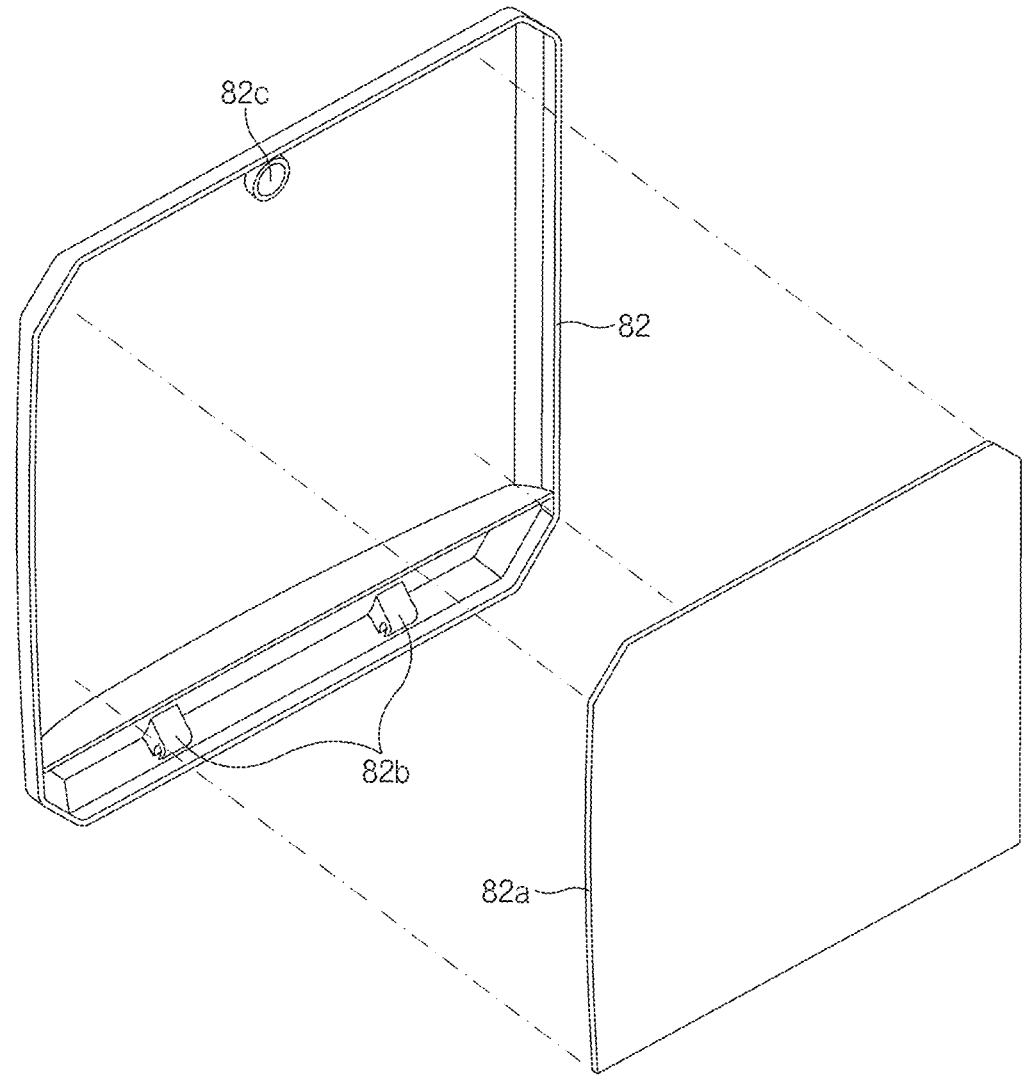
FIG. 48 illustrates an exploded perspective view of a cover body and an inner cover of a step mechanism in a vehicle tailgate apparatus according to an example embodiment of the present disclosure.
Figure 55:
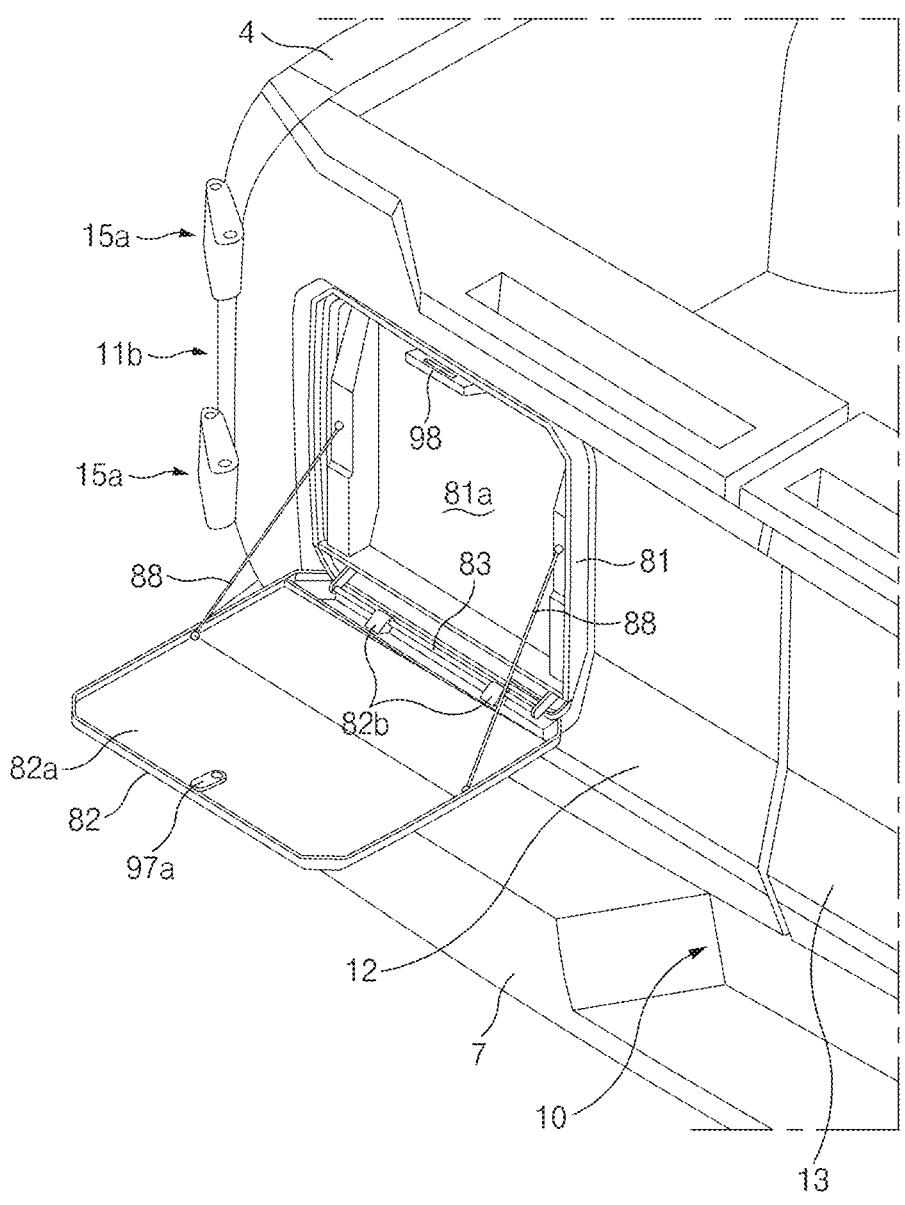
FIG. 55 illustrates a perspective view of a state in which a cover body of a step mechanism is opened with a tailgate closed in a vehicle tailgate apparatus according to an example embodiment of the present disclosure.

Referring to FIG. 42, the step body 81 may have a storage space 81a defined therein, and various accessories/components may be stored in the storage space 81a. Referring to FIGS. 42 and 43, the cover body 82 may be pivotally connected to the step body 81 through a pivot shaft 83. The pivot shaft 83 may be located between a lower portion of the step body 81 and a lower portion of the cover body 82. The pivot shaft 83 may extend in the width direction of the vehicle, and accordingly the pivot shaft 83 may be parallel to the horizontal axis HX. The pivot shaft 83 may be connected to the step body 81, and the pivot shaft 83 may be located in the lower portion of the step body 81. Referring to FIG. 44, the cover body 82 may include a plurality of support hooks 82b supporting the rotation of the pivot shaft 83, and a pair of stoppers 82d disposed on both sides of the plurality of support hooks 82b. The pair of stoppers 82d may be configured to restrain both ends of the pivot shaft 83, and accordingly the pivot shaft 83 may be prevented from moving in a longitudinal direction of the pivot shaft 83 within the cover body 82. Referring to FIG. 48, the support hooks 82b may be provided on the lower portion of the cover body 82. Each support hook 82b may have an opening in which the pivot shaft 83 can be received. As the pivot shaft 83 can be rotatably supported by the support hooks 82b, the cover body 82 may pivot with respect to the step body 81 so that the cover body 82 may move between a cover position and an uncover position by the pivot shaft 83. Referring to FIGS. 42 and 43, the cover position can refer to a position in which the cover body 82 covers the storage space 81a of the step body 81. Referring to FIG. 55, the uncover position can refer to a position in which the cover body 82 uncovers the storage space 81a of the step body 81. When the cover body 82 is in the uncover position, the cover body 82 may be in a horizontal state.

A sealing material may be provided at the edges of the step body 81 and/or edges of the cover body 82, thereby ensuring sealing between the cover body 82 and the step body 81 when the cover body 82 covers the step body 81.

Figure 47:
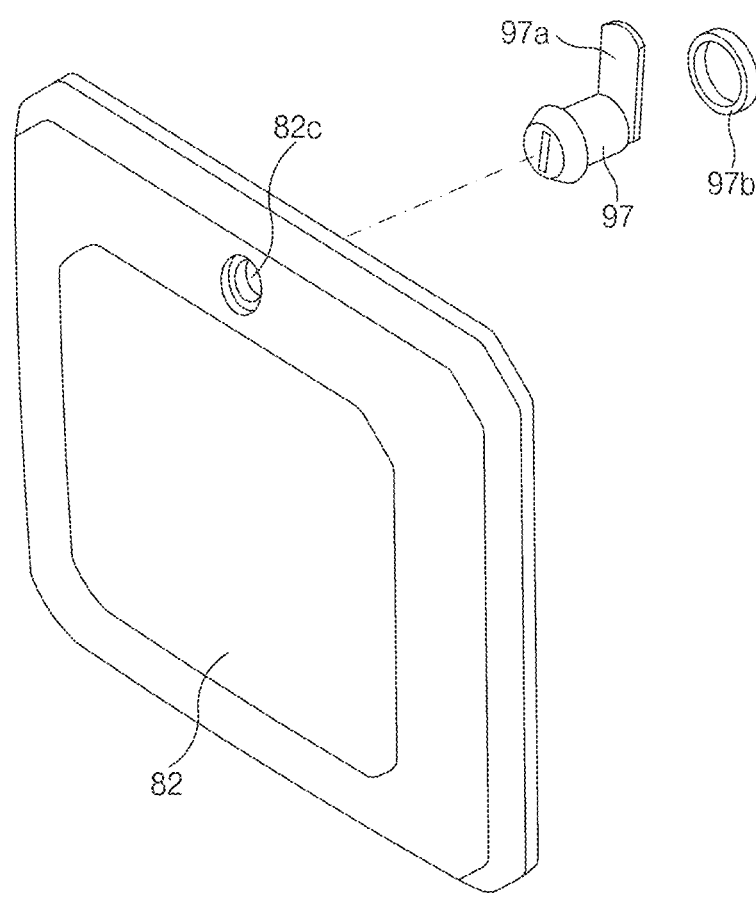
FIG. 47 illustrates an exploded perspective view of a cover body and a key member of a step mechanism in a vehicle tailgate apparatus according to an example embodiment of the present disclosure.
Figure 49:
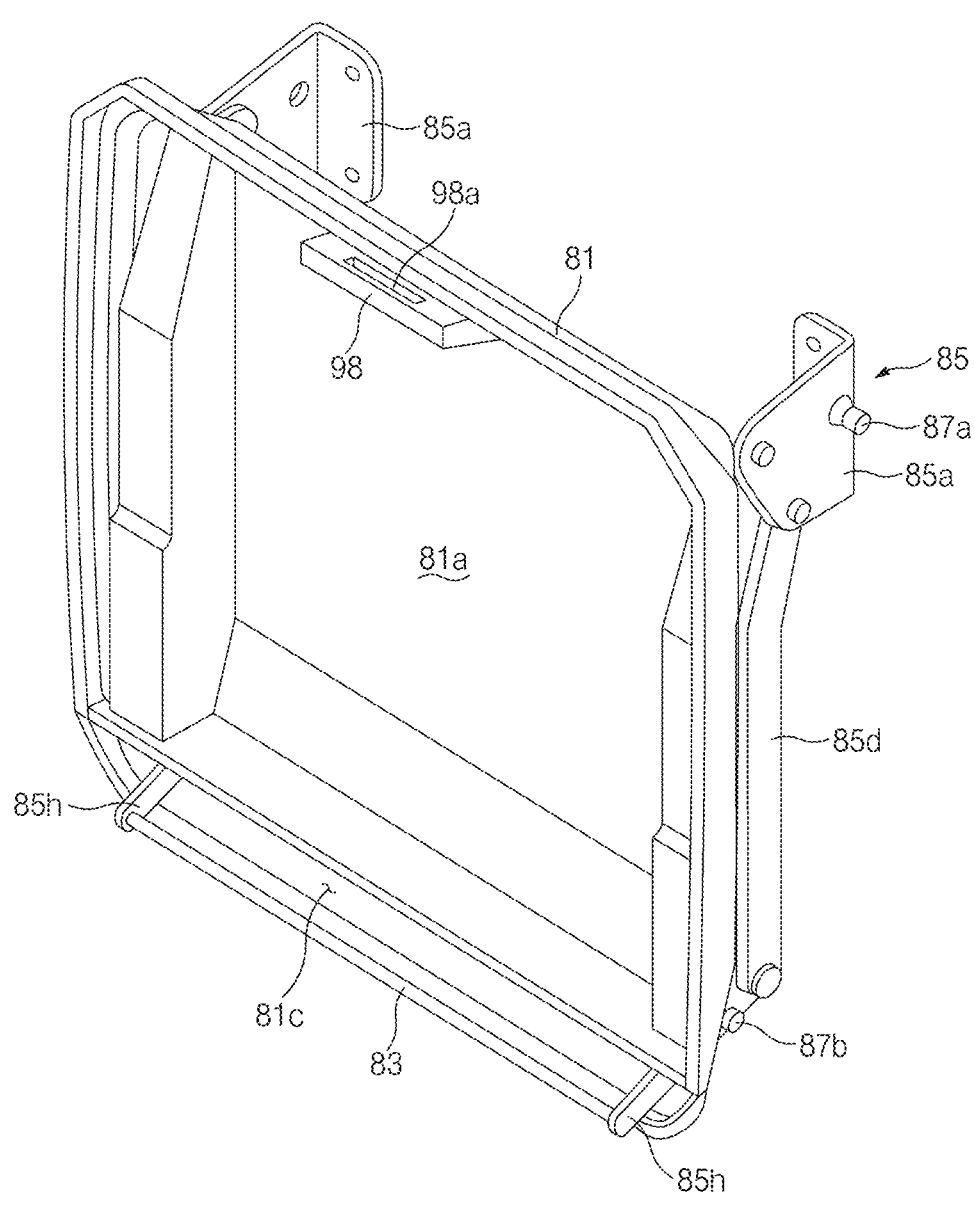
FIG. 49 illustrates a front perspective view of a link mechanism mounted on a step body of a step mechanism in a vehicle tailgate apparatus according to an example embodiment of the present disclosure.

Referring to FIG. 47, the step mechanism 80 may include a key member 97 rotatably mounted on an upper portion of the cover body 82, and a key blade 97a extending from an inner end of the key member 97. A mounting hole 82c may be provided in the upper portion of the cover body 82, and the key member 97 together with a bush 97b may be rotatably mounted in the mounting hole 82c of the cover body 82. The key blade 97a may be perpendicular to a longitudinal axis of the key member 97. Referring to FIG. 49, the step mechanism 80 may include a lock block 98 provided on an upper portion of the step body 81, and a lock slot 98a formed in the lock block 98. In a state in which the cover body 82 is in the cover position, the key blade 97a may be engaged (inserted) to or disengaged from the lock slot 98a by the rotation of the key member 97. Referring to FIG. 42, as the key member 97 rotates toward the lock block 98, the key blade 97a may be engaged to the lock slot 98a, and as the key member 97 rotates away from the lock block 98, the key blade 97a may be disengaged from the lock slot 98a.

Referring to FIG. 48, the step mechanism 80 may include an inner cover 82a attached to an interior surface of the cover body 82. The inner cover 82a may be fitted into the inside of the cover body 82, and the inner cover 82a may be a flat plate. Referring to FIG. 55, when the cover body 82 is in the uncover position, the storage space 81a of the step body 81 may be exposed, and the inner cover 82a may serve as a mini table.

Figure 52:
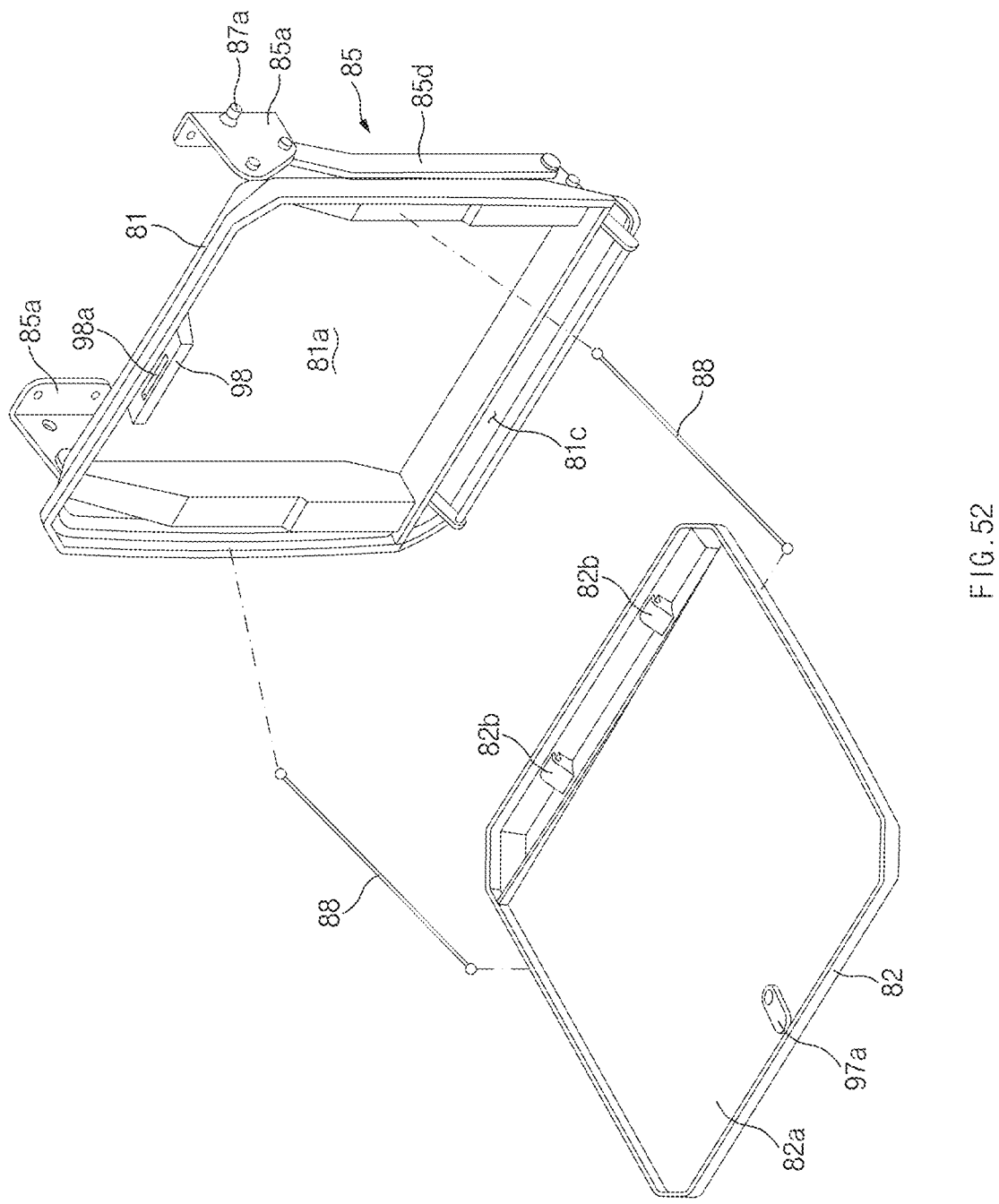
FIG. 52 illustrates an exploded perspective view of a step body, a cover body, and support cables of a step mechanism in a vehicle tailgate apparatus according to an example embodiment of the present disclosure.

The step mechanism 80 may further include a pair of support cables 88 connecting the step body 81 and the cover body 82, and the pair of support cables 88 may be configured to support the cover body 82 to hold the cover body 82 in the horizontal state. Each support cable 88 may be a steel wire. Referring to FIG. 55, when the cover body 82 uncovers the step body 81, the cover body 82 may be held in the uncover position by the pair of support cables 88. Referring to FIG. 52, a top end of each support cable 88 may be pivotally connected to the corresponding edge of the step body 81 through a ball joint and/or the like, and a bottom end of each support cable 88 may be pivotally connected to the corresponding edge of the cover body 82 through a ball joint and/or the like. When the support cables 88 are completely separated from the cover body 82 and/or the step body 81, the cover body 82 may be fully opened at an angle of 180° with respect to the step body 81.

The step mechanism 80 may include the link mechanism 85 configured to pivotally connect the step body 81 to the tailgate 10. The step body 81 may be configured to move between the stowed position and the deployed position by the link mechanism 85. The stowed position can refer to a position in which the step body 81 is stowed in the accommodating opening 93a of the first door 12 of the tailgate 10, and the deployed position can refer to a position in which the step body 81 is deployed from the accommodating opening 93a of the first door 12 of the tailgate 10.

Referring to FIGS. 42, 43, 46, and 51, the first door 12 of the tailgate 10 may have an inner reinforcing plate 86 attached to the interior surface thereof.

Figure 51:
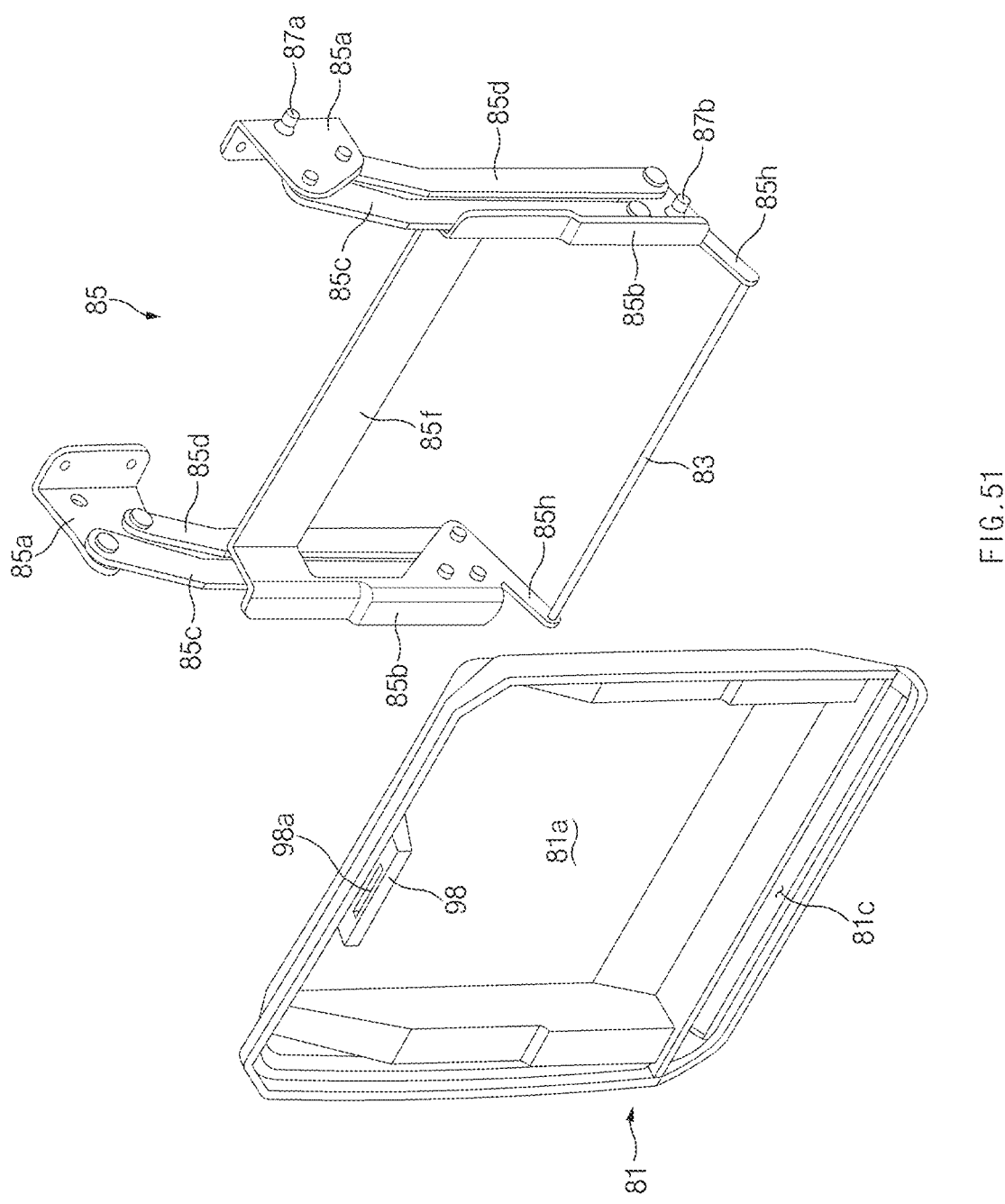
FIG. 51 illustrates an exploded perspective view of a link mechanism and a step body of a step mechanism in a vehicle tailgate apparatus according to an example embodiment of the present disclosure.

Referring to FIG. 51, the link mechanism 85 may include a pair of door-side brackets 85a, a pair of step-side brackets 85b, and a plurality of the links 85c and 85d pivotally connecting the pair of step-side brackets 85b to the pair of door-side brackets 85a.

Figure 54:
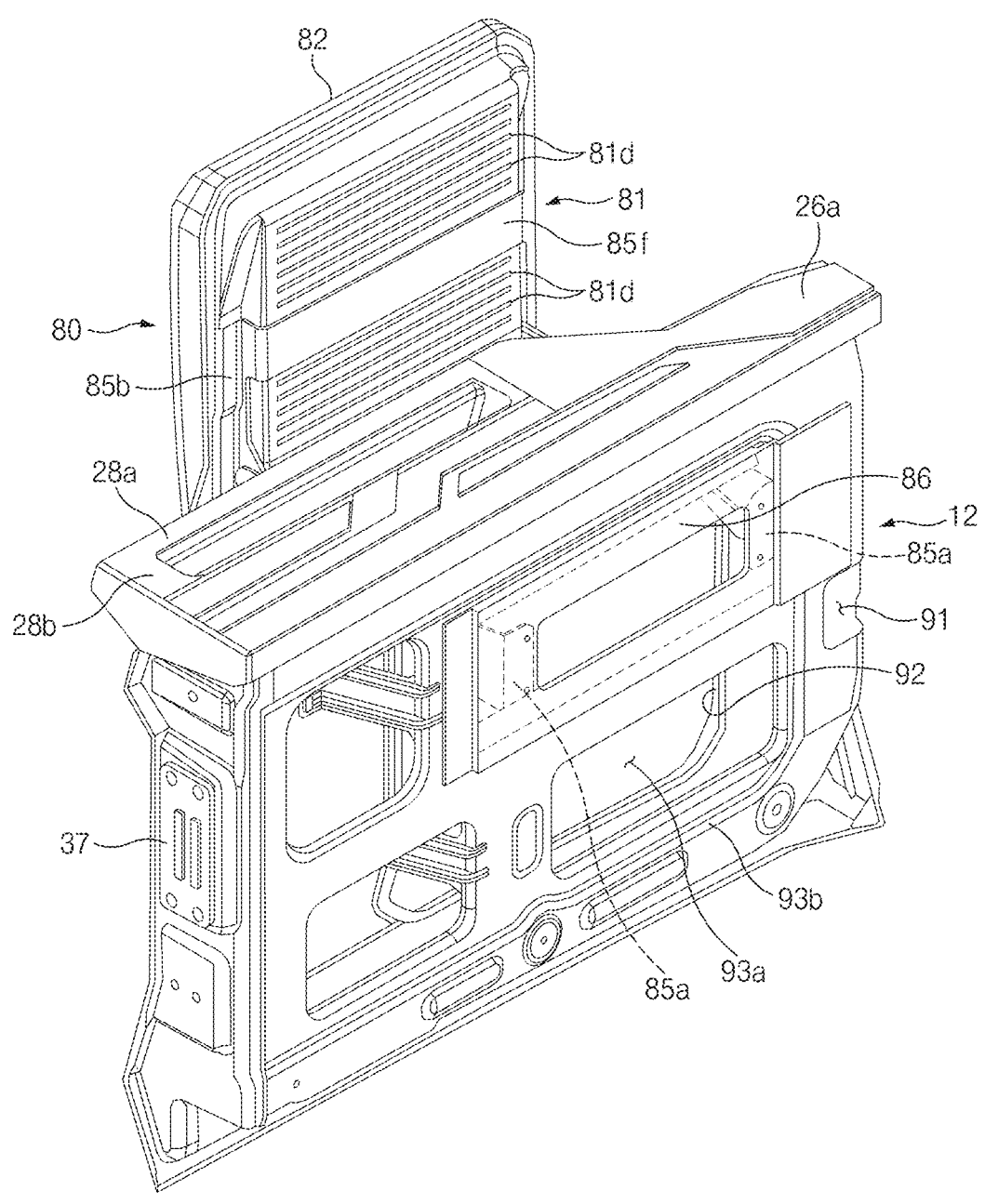
FIG. 54 illustrates a perspective view of a state in which a step mechanism is deployed from a tailgate in a vehicle tailgate apparatus according to an example embodiment of the present disclosure, which is viewed from the inside of a luggage compartment.

The pair of door-side brackets 85a may be fixed to the first door 12 of the tailgate 10 through fasteners. The pair of door-side brackets 85a may be spaced apart from each other by a gap corresponding to the width of the step body 81. Referring to FIG. 54, the pair of door-side brackets 85a may be fixed to the inner reinforcing plate 86 of the first door 12 of the tailgate 10 through the fasteners.

Figure 50:
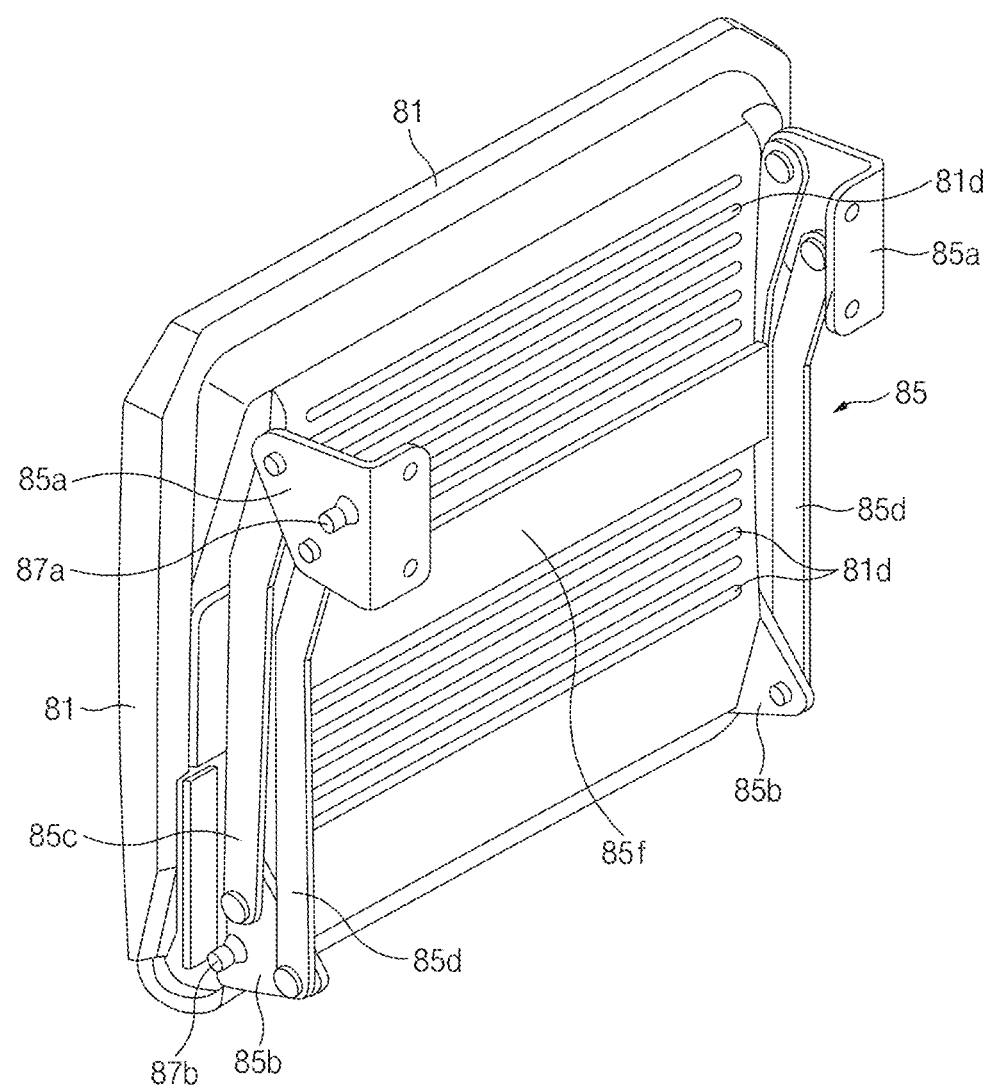
FIG. 50 illustrates a rear perspective view of a link mechanism mounted on a step body of a step mechanism in a vehicle tailgate apparatus according to an example embodiment of the present disclosure.

Referring to FIG. 50, the pair of step-side brackets 85b may be fixed to both side edges of the step body 81 through fasteners. The pair of step-side brackets 85b may be spaced apart from each other by a gap corresponding to the width of the step body 81.

Referring to FIG. 51, the pivot shaft 83 may be connected to the pair of step-side brackets 85b, and accordingly the pivot shaft 83 may be located between the pair of step-side brackets 85b. Each step-side bracket 85b may have an extension portion 85h extending toward the pivot shaft 83, and each end of the pivot shaft 83 may be fixed to the extension portion 85h of the corresponding step-side bracket 85b through a fastener and/or the like. The step body 81 may have an opening 81c in the lower portion thereof, and the pivot shaft 83 may pass through the opening 81c of the step body 81. The pivot shaft 83 may pass through the opening 81c of the step body 81 and be received in the support hooks 82b of the cover body 82.

The plurality of links 85c and 85d may include a pair of first links 85c and a pair of second links 85d. The pair of first links 85c and the pair of second links 85d may be pivotally connected to the pair of step-side brackets 85b and the pair of door-side brackets 85a. A top end of each of the links 85c and 85d may be pivotally connected to the corresponding door-side bracket 85a, and a bottom end of each of the links 85c and 85d may be pivotally connected to the corresponding step-side bracket 85b. Each of the links 85c and 85d may have an angled shape.

When the first links 85c and the second links 85d pivot toward the outside of the tailgate 10 with respect to the door-side brackets 85a, the step body 81 of the step mechanism 80 may move to the deployed position. When the first links 85c and the second links 85d pivot toward the inside of the tailgate 10 with respect to the door-side brackets 85a, the step body 81 of the step mechanism 80 may move to the stowed position. When the step mechanism 80 is in the deployed position, at least a portion of the first links 85c may contact the second links 85d adjacent thereto so that the step mechanism 80 may be prevented from rotating (folding) toward the tailgate 10.

The link mechanism 85 may further include a reinforcing portion 85f connecting the pair of step-side brackets 85b.

Referring to FIG. 50, the reinforcing portion 85f may be fixed to an interior surface of the step body 81 through a fastener, an adhesive, and/or the like, and accordingly stiffness of the step body 81 may be improved.

Referring to FIG. 45, the link mechanism 85 may further include a gas spring 87 providing a biasing force allowing the step body 81 of the step mechanism 80 to be biased to the deployed position. The gas spring 87 may include a sealed cylinder in which a compressed gas is contained, and a piston rod configured to move forward and backward with respect to the cylinder. The gas spring 87 may be extended or retracted as the piston rod moves forward and backward. The gas spring 87 may be configured to provide the biasing force by a reaction force of the compressed gas contained in the sealed cylinder. As the gas spring 87 can be retracted, the plurality of links 85c and 85d may pivot toward the inside of the tailgate 10 with respect to the door-side brackets 85a, and accordingly the step body 81 of the step mechanism 80 may move to the stowed position. As the gas spring 87 can be extended, the plurality of links 85c and 85d may pivot toward the outside of the tailgate 10 with respect to the door-side brackets 85a, and accordingly the step body 81 of the step mechanism 80 may move to the deployed position.

Referring to FIG. 5, when the tailgate 10 moves to the horizontal position, the step body 81 of the step mechanism 80 to move to the deployed position due to the biasing force of the gas spring 87 and the weights of the step body 81 and the cover body 82. The step mechanism 80 may be manually moved to the stowed position by the user.

Referring to FIGS. 49 and 50, the link mechanism 85 may include a first joint 87a provided on any one door-side bracket 85a of the pair of door-side brackets 85a, and a second joint 87b provided on the step-side bracket 85b corresponding to any one door-side bracket 85a. The first joint 87a and the second joint 87b may be a ball joint. Referring to FIG. 45, a first end of the gas spring 87 may be pivotally connected to the door-side bracket 85a through the first joint 87a, and a second end of the gas spring 87 may be pivotally connected to the step-side bracket 85b through the second joint 87b.

Referring to FIGS. 50 and 54, the step body 81 may have a plurality of treads 81d provided on the interior surface thereof, and the plurality of treads 81d may be formed in various patterns.

Referring to FIG. 42, the through hole 93b may be aligned with a lower portion of the accommodating opening 93a. Referring to FIGS. 53 and 54, in a state in which the tailgate 10 is in the upright position (the closed position), the step mechanism 80 is deployed from the first door 12, the first door 12 can be closed, and the first interior trim 26b can be detached from the interior surface of the first door 12, a relatively long, thin object such as a ski may extend through the accommodating opening 93a and the through hole 93b. That is, the accommodating opening 93a and the through hole 93b may serve as a ski through hole.

Figure 56:
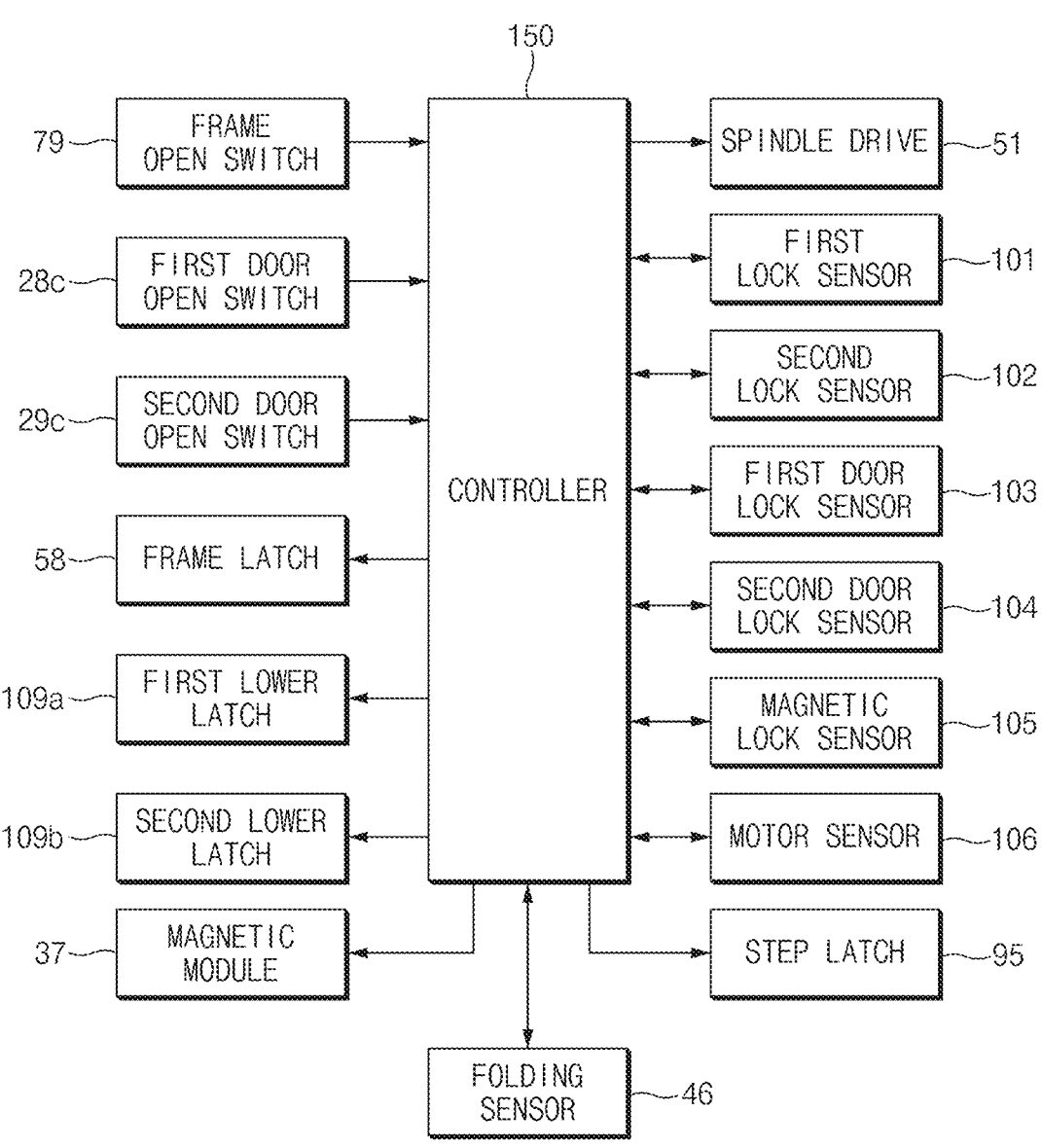
FIG. 56 illustrates a block diagram of a control system between a controller and components connected thereto in a vehicle tailgate apparatus according to an example embodiment of the present disclosure.

FIG. 56 illustrates a block diagram of a control system between the controller 150 and the components connected thereto in the vehicle tailgate apparatus according to an example embodiment of the present disclosure.

The frame open switch 79, the first door open switch 28c, the second door open switch 29c, the frame latch 58, and the spindle drive 51 may be electrically connected to the controller 150. The frame latch 58 may be configured to allow the main frame 11 of the tailgate 10 to be locked to and unlocked from the sidewall 4 of the vehicle body 2. When the user presses the frame open switch 79, a turn-on signal of the frame open switch 79 may be transmitted to the controller 150, and the controller 150 may control the operation of the frame latch 58 and the operation of the spindle drive 51 so that the main frame 11 may be opened and closed.

A motor sensor 106 may be electrically connected to the controller 150. The motor sensor 106 may be mounted on the motor 56a of the spindle drive 51, and RPM of the motor 56a may be controlled by the motor sensor 106 and the controller 150 so that the extension speed and retraction speed of the spindle drive 15 may be adjusted. The motor sensor 106 may detect an external force acting on the spindle drive 51. According to an example embodiment, the motor sensor 106 may be a hall sensor.

The controller 150 may determine the extended length and retracted length of the spindle drive 51 based on the RPM of the motor 56a measured by the motor sensor 106, the pitch of the spindle 58a, and/or the like.

The first door open switch 28c, the second door open switch 29c, the first lower latch 109a, the second lower latch 109b, and the magnetic module 37 may be electrically connected to the controller 150. As the first lower latch 109a locks and unlocks the first lower striker 19a, the first lower latch 109a may be configured to allow the first door 12 to be locked to and unlocked from the main frame 11, and as the second lower latch 109b locks and unlocks the second lower striker 19b, the second lower latch 109b may be configured to allow the second door 13 to be locked to and unlocked from the main frame 11. As the magnetic module 37 locks and unlocks the contact module 38, the magnetic module 37 may be configured to allow the first door 12 and the second door 13 to be locked to and unlocked from each other.

When the user presses the first door open switch 28c, a turn-on signal of the first door open switch 28c may be transmitted to the controller 150, and the controller 150 may control the operation of the first lower latch 109a and the operation of the magnetic module 37. When the user presses the second door open switch 29c, a turn-on signal of the second door open switch 29c may be transmitted to the controller 150, and the controller 150 may control the operation of the second lower latch 109b and the operation of the magnetic module 37.

The first lock sensor 101 may be electrically connected to the controller 150. The first lock sensor 101 may be provided on the frame latch 58, and the first lock sensor 101 may detect the fully locked state of the frame latch 58. The controller 150 may determine whether the frame latch 58 is in the fully locked state based on the detection result of the first lock sensor 101.

The second lock sensor 102 may be electrically connected to the controller 150. The second lock sensor 102 may be provided on the frame latch 58, and the second lock sensor 102 may detect the partially locked state of the frame latch 58. The controller 150 may determine whether the frame latch 58 is in the partially locked state based on the detection result of the second lock sensor 102.

A first door lock sensor 103 may be electrically connected to the controller 150. The first door lock sensor 103 may be provided on the first lower latch 109a, and the first door lock sensor 103 may detect the locked state of the first lower latch 109a. The controller 150 may determine whether the first lower latch 109a is in the locked state based on the detection result of the first door lock sensor 103.

A second door lock sensor 104 may be electrically connected to the controller 150. The second door lock sensor 104 may be provided on the second lower latch 109b, and the second door lock sensor 104 may detect the locked state of the second lower latch 109b. The controller 150 may determine whether the second lower latch 109b is in the locked state based on the detection result of the second door lock sensor 104.

A magnetic lock sensor 105 may be electrically connected to the controller 150. The magnetic lock sensor 105 may be provided on the magnetic module 37, and the magnetic lock sensor 105 may detect the locked state of the magnetic module 37. The controller 150 may determine whether the magnetic module 37 is in the locked state based on the detection result of the magnetic lock sensor 105.

The step latch 95 may be electrically connected to the controller 150, and the step latch 95 may be configured to allow the step mechanism 80 to be locked to and unlocked from the first door 12 of the tailgate 10.

Hereinafter, a method of controlling a vehicle tailgate apparatus (hereinafter also referred to as the "control method") according to example embodiments of the present disclosure will be described in detail with reference to the accompanying drawings.

Figure 57:
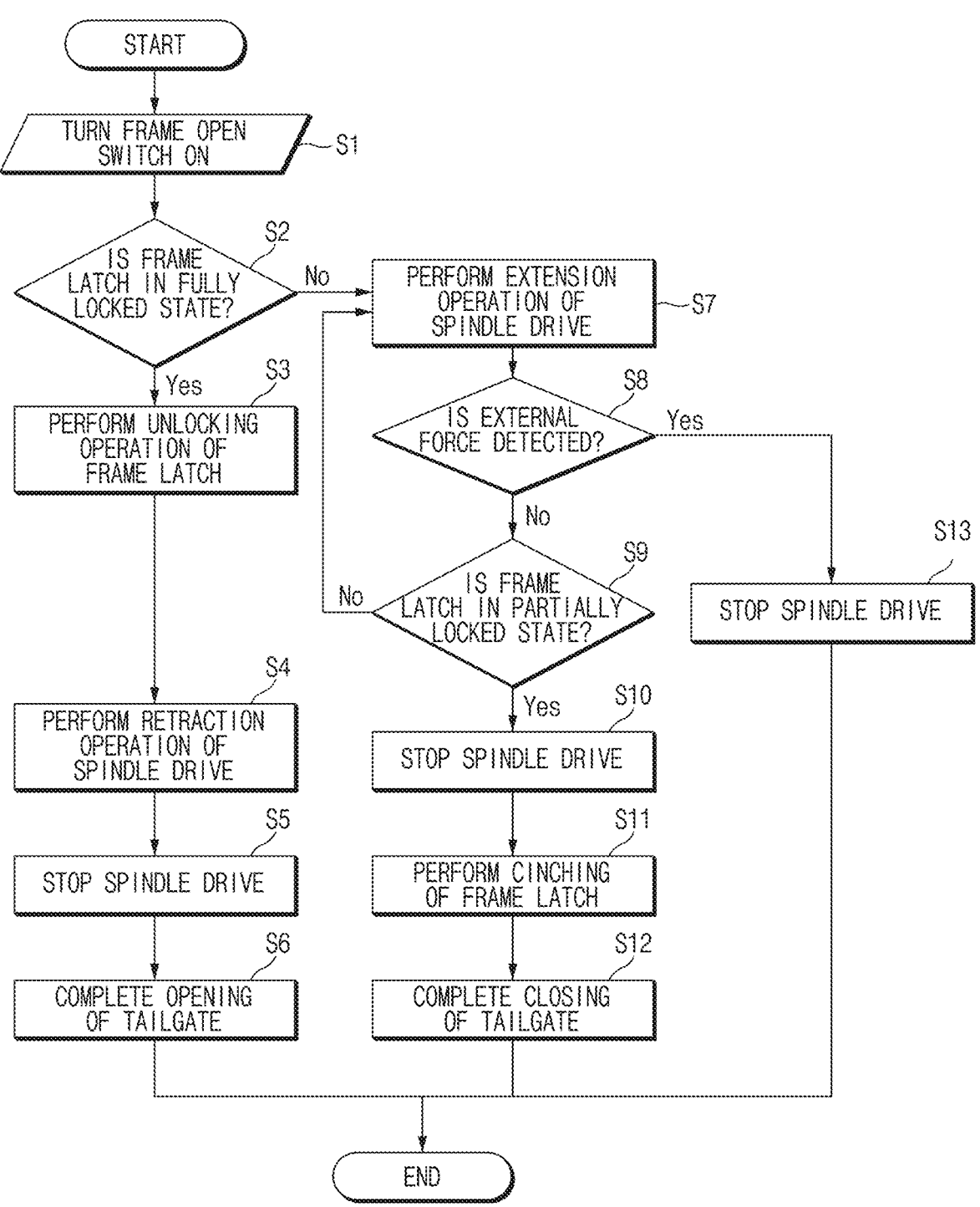
FIG. 57 illustrates a flowchart of a method of opening and closing a tailgate by a drive mechanism in a method of controlling a vehicle tailgate apparatus according to an example embodiment of the present disclosure.

FIG. 57 illustrates a flowchart of a method of opening and closing a tailgate by a drive mechanism in a method of controlling a vehicle tailgate apparatus according to an example embodiment of the present disclosure.

As the user presses the frame open switch 79, the frame open switch 79 may be turned on (S1).

A turn-on signal of the frame open switch 79 may be transmitted to the controller 150, and the controller 150 may determine whether the frame latch 58 is in the fully locked state based on a detection result of the first lock sensor 101 (S2).

When it is determined in S2 that the frame latch 58 is in the fully locked state, the controller 150 may perform an unlocking operation of the frame latch 58 to allow the frame latch 58 to unlock the frame striker 57 (S3).

In a state in which the frame latch 58 unlocks the frame striker 57, the controller 150 may perform a retraction operation of the spindle drive 51 to allow the spindle drive 51 to be retracted (S4).

When it is determined based on RPM of the motor 56a measured by the motor sensor 106, a pitch of the spindle 58a, and/or the like that a retracted length of the spindle drive 51 reaches a minimum retracted length, the controller 150 may stop the spindle drive 51 (S5).

As the spindle drive 51 is stopped, the main frame 11 of the tailgate 10 may be in the open position, and accordingly the opening of the tailgate 10 may be completed (S6).

When it is determined in S2 that the frame latch 58 is not in the fully locked state, the controller 150 may perform an extension operation of the spindle drive 51 to allow the spindle drive 51 to be extended (S7).

The controller 150 may determine whether an external force is acting on the spindle drive 51 during the extension of the spindle drive 51 (S8). The motor sensor 106 may detect a voltage output from the motor 56a of the spindle drive 51 and/or the like, and the controller 150 may determine whether an external force is acting on the spindle drive 51 based on the detection result of the motor sensor 106.

When it is determined in S8 that no external force is acting on the spindle drive 51, the controller 150 may determine whether the frame latch 58 is in the partially locked state based on a detection result of the second lock sensor 102 (S9). As the tailgate 10 moves to the closed position by the extension of the spindle drive 51, the controller 150 may determine whether the frame latch 58 is in the partially locked state in which the frame latch 58 partially locks the frame striker 57.

When it is determined in S8 that an external force is acting on the spindle drive 51, the controller 150 may stop the spindle drive 51 (S13) to bring the tailgate 10 to an emergency stop. When an arbitrary external force is transmitted to the spindle drive 51 through the tailgate 10 in the course of closing the tailgate 10 by the extension of the spindle drive 51, the controller 150 may stop the spindle drive 51, thereby preventing an excessive load from being applied to the spindle drive 51, and preventing a malfunction of the tailgate apparatus 100.

When it is determined in S9 that the frame latch 58 is in the partially locked state, the controller 150 may stop the spindle drive 51 (S10).

When it is determined in S9 that the frame latch 58 is not in the partially locked state, the controller 150 may allow the spindle drive 51 to be extended (S7).

After the spindle drive 51 is stopped in S10, the controller 150 may perform the cinching of the frame latch 58 to allow the frame latch 58 to switch from the partially locked state to the fully locked state (S11). Here, it may be detected by the first lock sensor 101 that the frame latch 58 is switched to the fully locked state by the cinching of the frame latch 58.

As the frame latch 58 is cinched, the main frame 11 may be in the closed position, and accordingly the closing of the tailgate 10 may be completed (S12).

Figure 58:
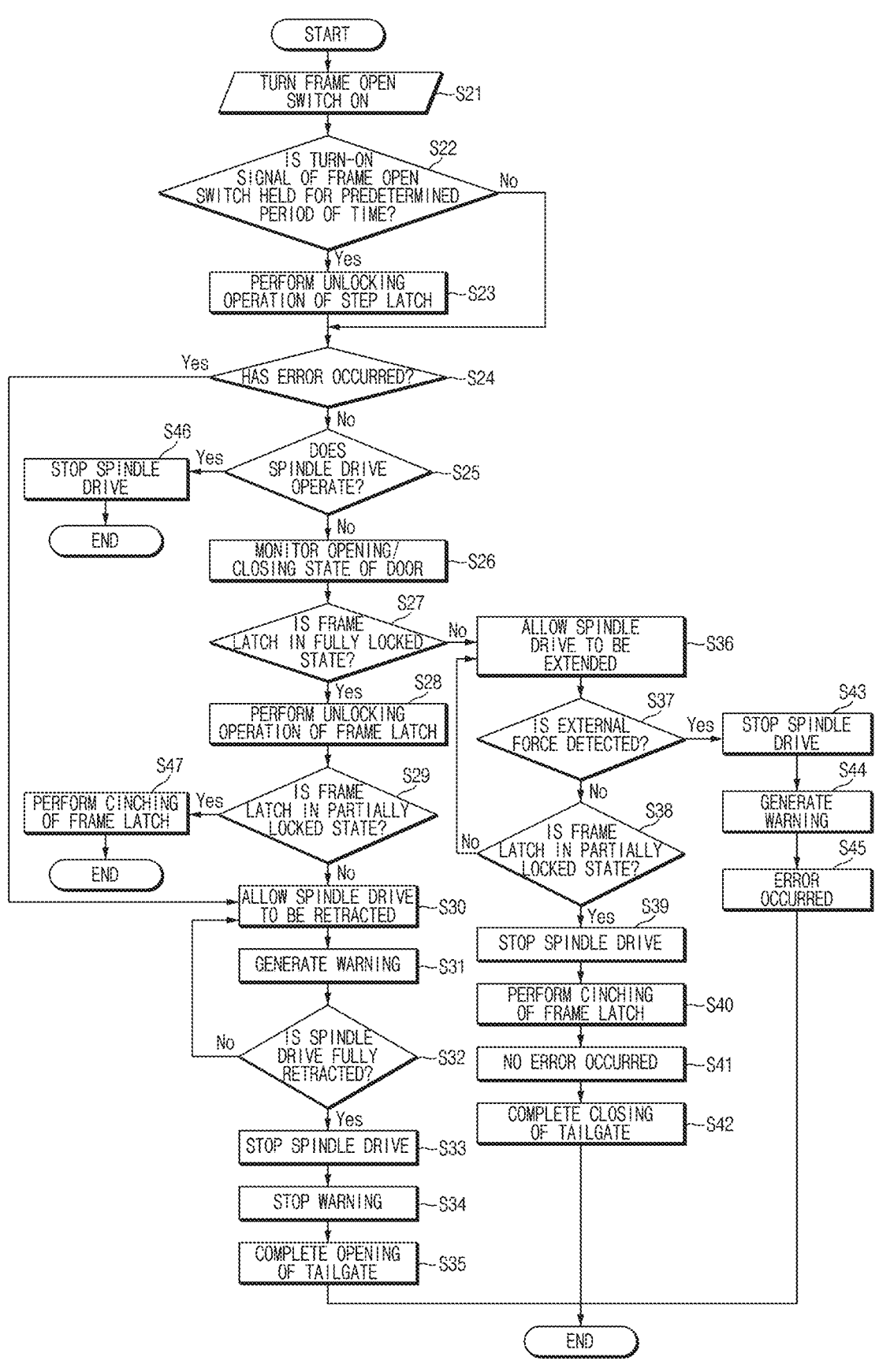
FIG. 58 illustrates a flowchart of a method of opening and closing a tailgate in a state in which a first door and a second door are not opened in a method of controlling a vehicle tailgate apparatus according to an example embodiment of the present disclosure.

FIG. 58 illustrates a flowchart of a method of opening and closing a tailgate in a state in which a first door and a second door are not opened in a method of controlling a vehicle tailgate apparatus according to an example embodiment of the present disclosure.

As the user presses the frame open switch 79, the frame open switch 79 may be turned on (S21). When the user presses the frame open switch 79 for a predetermined period of time (for example, three seconds), a turn-on signal of the frame open switch 79 may be held for a predetermined period of time.

The controller 150 may determine whether the turn-on signal of the frame open switch 79 is held for a predetermined period of time (S22).

When it is determined in S22 that the turn-on signal of the frame open switch 79 is held for a predetermined period of time, the controller 150 may perform an unlocking operation of the step latch 95 to allow the step latch 95 to unlock the step striker 96 (S23). As the step latch 95 unlocks the step striker 96, the step body 81 may be deployed from the tailgate 10 by the gas spring 87 when the tailgate 10 is in the open position.

After the unlocking operation of the step latch 95 is performed in S23, the controller 150 may determine whether an error has occurred by determining whether an error count is greater than or equal to a predetermined value in various situations such as jamming and emergency stop (S24).

When it is determined in S22 that the turn-on signal of the frame open switch 79 is not held for a predetermined period of time, the controller 150 may determine whether an error has occurred without performing the unlocking operation of the step latch 95 (S24).

When it is determined in S24 that no error has occurred, the controller 150 may determine whether the spindle drive 51 operates (S25).

When it is determined in S25 that the spindle drive 51 operates, the controller 150 may stop the spindle drive 51 (S46) to bring the tailgate 10 to an emergency stop. That is, when the spindle drive 51 operates before it is determined whether the frame latch 58 is in the fully locked state after the turn-on of the frame open switch 79, the controller 150 may determine a malfunction of the tailgate apparatus 100 and immediately stop the spindle drive 51.

When it is determined in S25 that the spindle drive 51 does not operate, the controller 150 may monitor the opening/closing state of each of the doors 12 and 13 (S26). By monitoring the opening/closing state of each of the doors 12 and 13, the controller 150 may prevent the main frame 11 of the tailgate 10 from moving between the open position and the closed position in a state in which each of the doors 12 and 13 is opened, thereby preventing a malfunction of the tailgate apparatus 100.

When it is determined in S26 that the first door 12 and the second door 13 are not opened, the controller 150 may determine whether the frame latch 58 is in the fully locked state (S27).

When it is determined in S27 that the frame latch 58 is in the fully locked state, the controller 150 may perform an unlocking operation of the frame latch 58 to allow the frame latch 58 to unlock the frame striker 57 (S28).

In a state in which the unlocking operation of the frame latch 58 is performed, the controller 150 may determine whether the frame latch 58 is in the partially locked state (S29).

When it is determined in S29 that the frame latch 58 is in the partially locked state, the controller 150 may perform the cinching of the frame latch 58 to allow the frame latch 58 to switch from the partially locked state to the fully locked state (S47). When an arbitrary external force is acting on the tailgate 10 after the turn-on signal of the frame open switch 79 is held for a predetermined period of time and the unlocking operation of the frame latch 58 is performed in order to operate the tailgate 10, the frame latch 58 may not be fully unlocked, but may be in the partially locked state. That is, when an arbitrary external force is acting on the tailgate 10 and the frame latch 58 is in the partially locked state, the cinching of the frame latch 58 may be performed, and the control method according to this example embodiment of the present disclosure may end.

When it is determined in S29 that the frame latch 58 is not in the partially locked state, the controller 150 may allow the spindle drive 51 to be retracted as the frame latch 58 fully unlocks the frame striker 57 (S30).

When it is determined in S24 that an error has occurred, the controller 150 may allow the spindle drive 51 to be retracted (S30). When an error has occurred, the controller 150 may allow the spindle drive 51 to be immediately retracted, thereby preventing damages to the tailgate 10, the drive mechanism 50, and/or the like.

After the spindle drive 51 is retracted in S30, the controller 150 may generate a warning signal indicating the opening of the tailgate 10 (S31). For example, a warning sound may be continuously played through a speaker provided on the vehicle, and the main lamps 17, the auxiliary lamps 18, and/or the like may be repeatedly turned on and off.

After the warning signal is generated, the controller 150 may determine whether the spindle drive 51 is fully retracted based on a detection result of the motor sensor 106 (S32). The controller 150 may determine that the spindle drive 51 is fully retracted by determining that a retracted length of the spindle drive 51 reaches a minimum retracted length based on RPM of the motor 56a measured by the motor sensor 106, a pitch of the spindle 58a, and/or the like.

When it is determined in S32 that the spindle drive 51 is fully retracted, the controller 150 may stop the spindle drive 51 (S33).

As the spindle drive 51 is stopped, the controller 150 may stop the generation of the warning signal (S34).

As the spindle drive 51 is stopped, and the generation of the warning signal is stopped, the opening of the tailgate 10 may be completed (S35).

When it is determined in S27 that the frame latch 58 is not in the fully locked state, the controller 150 may allow the spindle drive 51 to be extended (S36).

The controller 150 may determine whether an external force is acting on the spindle drive 51 during the extension of the spindle drive 51 (S37). The motor sensor 106 may detect a voltage output from the motor 56*a* of the spindle drive 51 and/or the like, and the controller 150 may determine whether an external force is acting on the spindle drive 51 based on the detection result of the motor sensor 106.

When it is determined in S37 that no external force is acting on the spindle drive 51, the controller 150 may determine whether the frame latch 58 is in the partially locked state based on a detection result of the second lock sensor 102 (S38). As the tailgate 10 moves to the closed position by the extension of the spindle drive 51, the controller 150 may determine whether the frame latch 58 is in the partially locked state in which the frame latch 58 partially locks the frame striker 57.

When it is determined in S38 that the frame latch 58 is in the partially locked state, the controller 150 may stop the spindle drive 51 (S39).

When it is determined in S38 that the frame latch 58 is not in the partially locked state, the controller 150 may allow the spindle drive 51 to be extended (S36).

After the spindle drive 51 is stopped in S39, the controller 150 may perform the cinching of the frame latch 58 to allow the frame latch 58 to switch from the partially locked state to the fully locked state (S40). Here, it may be detected by the first lock sensor 101 that the frame latch 58 is switched to the fully locked state by the cinching of the frame latch 58.

After the frame latch 58 is cinched, the controller 150 may determine that no error has occurred (S41).

The closing of the tailgate 10 may be completed by the cinching of the frame latch 58 (S42).

When it is determined in S37 that an external force is acting on the spindle drive 51, the controller 150 may stop the spindle drive 51 (S43) to bring the tailgate 10 to an emergency stop. When an arbitrary external force is transmitted to the spindle drive 51 through the tailgate 10 in the course of closing the tailgate 10 by the extension of the spindle drive 51, the controller 150 may stop the spindle drive 51, thereby preventing an excessive load from being applied to the spindle drive 51, and preventing a malfunction of the tailgate apparatus 100.

After the spindle drive 51 is stopped, the controller 150 may generate a warning signal (S44). For example, a warning sound may be continuously played through the speaker provided on the vehicle, and the main lamps 17, the auxiliary lamps 18, and/or the like may be repeatedly turned on and off.

After the warning signal is generated, the controller 150 may determine that an error has occurred (S45).

Figure 59:
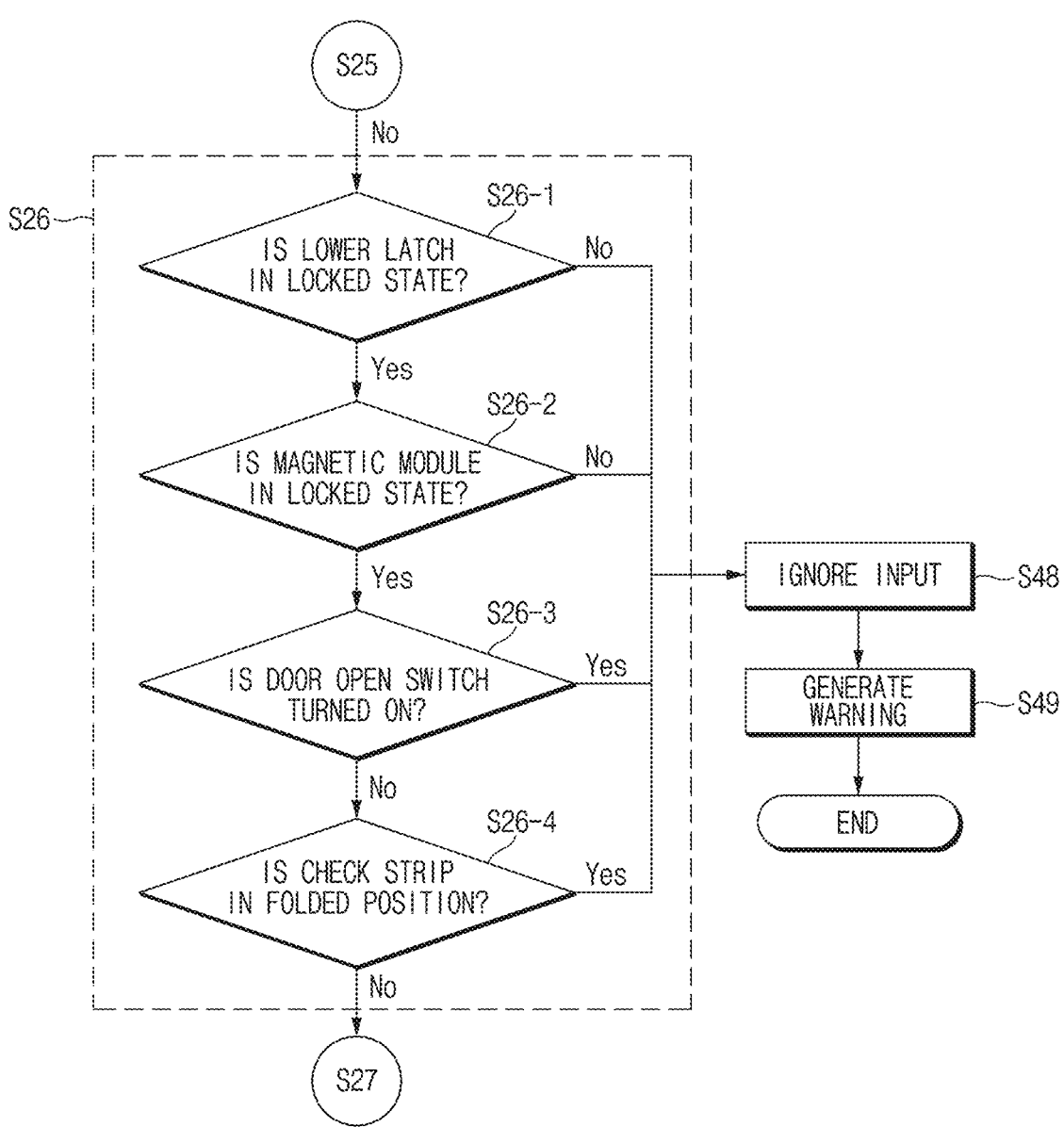
FIG. 59 illustrates a flowchart of details of a step of monitoring an opening/closing state of each door in the method illustrated in FIG. 58.

FIG. 59 illustrates a flowchart of details of the step of monitoring the opening/closing state of the first door 12 and/or the second door 13 in the method illustrated in FIG. 58.

Referring to FIG. 59, when it is determined in S25 that the spindle drive 51 does not operate, the controller 150 may monitor the opening/closing state of each of the doors 12 and 13 by determining whether each of the lower latches 109*a* and 109*b* is in the locked state, whether the magnetic module 37 is in the locked state, whether each of the door open switches 28*c* and 29*c* is turned on, and whether the check strip 41 is in the folded position.

When it is determined in S25 that the spindle drive 51 does not operate, the controller 150 may determine whether each of the lower latches 109*a* and 109*b* is in the locked state (S26-1).

When it is determined in S26-1 that each of the lower latches 109*a* and 109*b* is in the locked state, the controller 150 may determine that each of the doors 12 and 13 is closed. Thereafter, the controller 150 may determine whether the magnetic module 37 is in the locked state (S26-2), whether each of the door open switches 28*c* and 29*c* is turned on (S26-3), and whether the check strip 41 is in the folded position (S26-4), and then determine whether the frame latch 58 is in the fully locked state (S27 in FIG. 58).

When it is determined in S26-1 that each of the lower latches 109*a* and 109*b* is not in the locked state, the controller 150 may determine that each of the doors 12 and 13 is not fully closed. Thereafter, the controller 150 may ignore a signal input to each of the switches 79, 28*c*, and 29*c* (S48) and generate a warning signal (S49), and then the control method according to this example embodiment of the present disclosure may end.

When it is determined in S25 that the spindle drive 51 does not operate, the controller 150 may determine whether the magnetic module 37 is in the locked state (S26-2).

When it is determined in S26-2 that the magnetic module 37 is in the locked state, the controller 150 may determine that each of the doors 12 and 13 is closed. Thereafter, the controller 150 may determine whether each of the door open switches 28*c* and 29*c* is turned on (S26-3), and determine whether the check strip 41 is in the folded position (S26-4), and then determine whether the frame latch 58 is in the fully locked state (S27 in FIG. 58).

When it is determined in S26-2 that the magnetic module 37 is not in the locked state, the controller 150 may determine that each of the doors 12 and 13 is not fully closed. Thereafter, the controller 150 may ignore a signal input to each of the switches 79, 28*c*, and 29*c* (S48) and generate a warning signal (S49), and then the control method according to this example embodiment of the present disclosure may end.

When it is determined in S25 that the spindle drive 51 does not operate, the controller 150 may determine whether each of the door open switches 28*c* and 29*c* is turned on (S26-3).

When it is determined in S26-3 that each of the door open switches 28*c* and 29*c* is not turned on, the controller 150 may determine that each of the doors 12 and 13 is closed. Thereafter, the controller 150 may determine whether the check strip 41 is in the folded position (S26-4), and then determine whether the frame latch 58 is in the fully locked state (S27 in FIG. 58).

When it is determined in S26-3 that each of the door open switches 28*c* and 29*c* is turned on, the controller 150 may determine that each of the doors 12 and 13 is not fully closed. Thereafter, the controller 150 may ignore a signal input to each of the switches 79, 28*c*, and 29*c* (S48) and generate a warning signal (S49), and then the control method according to this example embodiment of the present disclosure may end.

When it is determined in S25 that the spindle drive 51 does not operate, the controller 150 may determine whether each check strip 41 is in the folded position (S26-4).

When it is determined in S26-4 that each check strip 41 is not in the folded position, the controller 150 may determine that each of the doors 12 and 13 is closed, and each check strip 41 is received in the inside of the corresponding one of the doors 12 and 13. Then, the controller 150 may determine whether the frame latch 58 is in the fully locked state (S27 in FIG. 58).

When it is determined in S26-4 that each check strip 41 is in the folded position, the controller 150 may determine that each of the doors 12 and 13 is opened, each check strip 41 is released from the corresponding one of the doors 12 and 13, and each check strip 41 is received in the recessed portion 4c of the corresponding sidewall 4. Then, the controller 150 may ignore a signal input to each of the switches 79, 28c, and 29c (S48) and generate a warning signal (S49), and the control method according to this example embodiment of the present disclosure may end.

FIG. 59 illustrates an example of the method including sequentially determining whether each of the lower latches 109a and 109b is in the locked state, determining whether the magnetic module 37 is in the locked state, determining whether each of the door open switches 28c and 29c is turned on, and determining whether each check strip 41 is in the folded position. However, the present disclosure is not limited thereto, but may be variously modified and altered. That is, the order of the steps of determining whether each of the lower latches 109a and 109b is in the locked state, determining whether the magnetic module 37 is in the locked state, determining whether each of the door open switches 28c and 29c is turned on, and determining whether each check strip 41 is in the folded position may be variously modified and altered.

Figure 60:
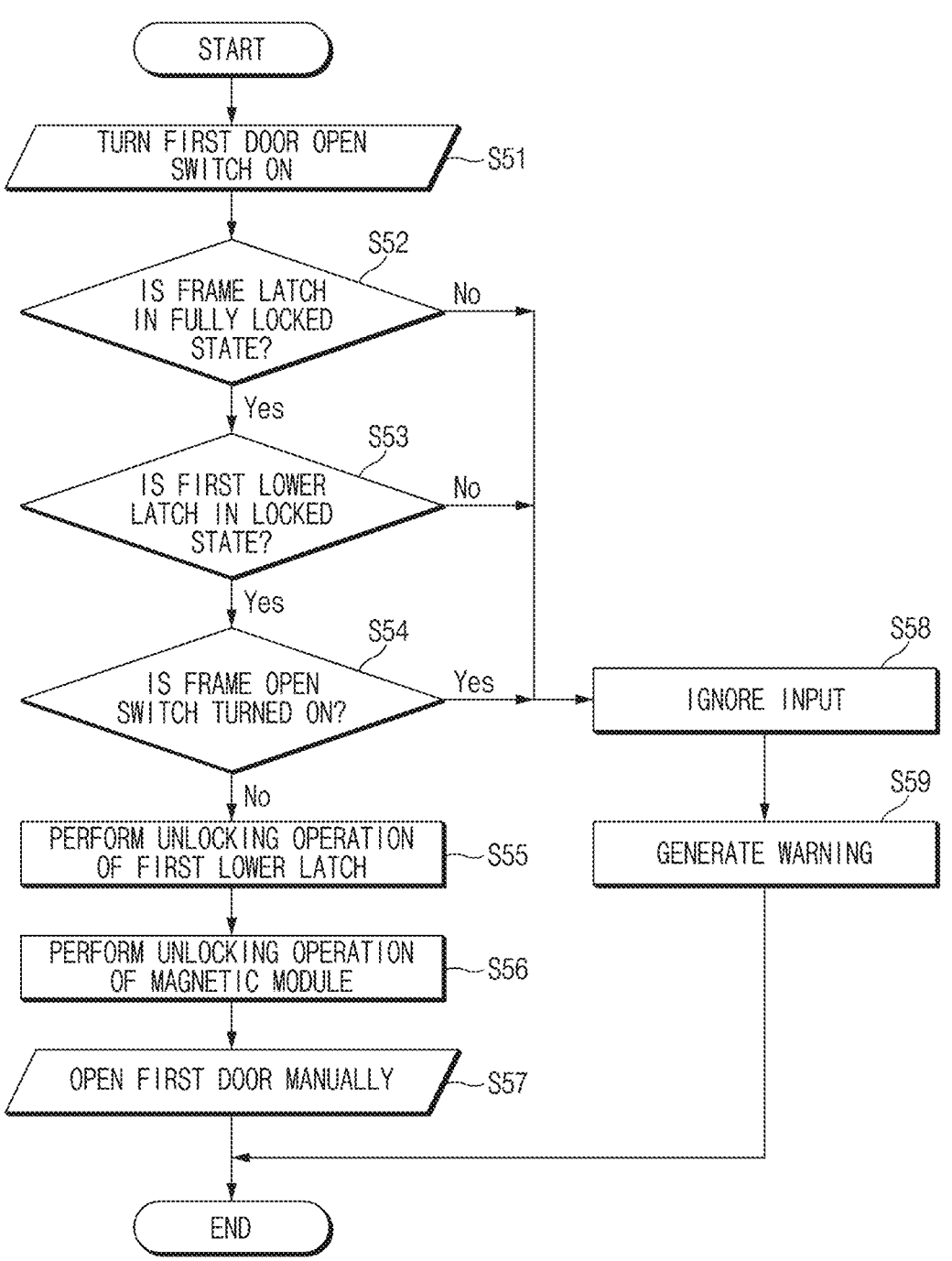
FIG. 60 illustrates a flowchart of a method of manually opening a first door in a state in which a main frame of a tailgate is in a closed position in a method of controlling a vehicle tailgate apparatus according to an example embodiment of the present disclosure.

FIG. 60 illustrates a flowchart of a method of manually opening a first door in a state in which a main frame of a tailgate is in a closed position in a method of controlling a vehicle tailgate apparatus according to an example embodiment of the present disclosure.

As the user presses the first door open switch 28c, the first door open switch 28c may be turned on (S51).

A turn-on signal of the first door open switch 28c may be transmitted to the controller 150, and the controller 150 may determine whether the frame latch 58 is in the fully locked state based on a detection result of the first lock sensor 101 (S52).

When it is determined in S52 that the frame latch 58 is in the fully locked state, the controller 150 may determine whether the first lower latch 109a is in the locked state (S53).

When it is determined in S52 that the frame latch 58 is not in the fully locked state, the controller 150 may ignore a signal input to each of the switches 79, 28c, and 29c (S58), and generate a warning signal (S59), and the control method according to this example embodiment of the present disclosure may end. When the frame latch 58 is not in the fully locked state during the opening of the first door 12, the controller 150 may bring the tailgate 10 to an emergency stop, thereby preventing a malfunction of the tailgate apparatus 100.

When it is determined in S53 that the first lower latch 109a is in the locked state, the controller 150 may determine whether the frame open switch 79 is turned on (S54).

When it is determined in S53 that the first lower latch 109a is not in the locked state, the controller 150 may ignore a signal input to each of the respective switches 79, 28c, and 29c (S58), and generate a warning signal (S59), and the control method according to this example embodiment of the present disclosure may end. When the first lower latch

109a is not in the locked state during the opening of the first door 12, the controller 150 may bring the tailgate 10 to an emergency stop, thereby preventing a malfunction of the tailgate apparatus 100.

When it is determined in S54 that the frame open switch 79 is turned on, the controller 150 may ignore a signal input to each of the switches 79, 28c, and 29c (S58), and generate a warning signal (S59), and the control method according to this example embodiment of the present disclosure may end. When the frame open switch 79 is turned on during the opening of the first door 12, the controller 150 may bring the tailgate 10 to an emergency stop, thereby preventing a malfunction of the tailgate apparatus 100.

When it is determined in S54 that the frame open switch 79 is turned off, the controller 150 may perform an unlocking operation of the first lower latch 109a to allow the first lower latch 109a to unlock the first lower striker 19a (S55).

After the first lower latch 109a is unlocked, the controller 150 may perform an unlocking operation of the magnetic module 37 to allow the magnetic module 37 to unlock the contact module 38 (S56).

As the first lower latch 109a unlocks the first lower striker 19a, and the magnetic module 37 unlocks the contact module 38, the user may manually open the first door 12 (S57).

FIG. 60 illustrates an example of the method including sequentially determining whether the frame latch 58 is in the fully locked state (S52), determining whether the first lower latch 109a is in the locked state (S53), and determining whether the frame open switch 79 is turned on (S54). However, the present disclosure is not limited thereto, but may be variously modified and altered. That is, the order of the steps of determining whether the frame latch 58 is in the fully locked state (S52), determining whether the first lower latch 109a is in the locked state (S53), and determining whether the frame open switch 79 is turned on (S54) may be variously modified and altered.

FIG. 60 illustrates an example of the method including sequentially performing the unlocking operation of the first lower latch 109a (S55) and performing the unlocking operation of the magnetic module 37 (S56). However, the present disclosure is not limited thereto, but may be variously modified and altered. That is, the order of the steps of performing the unlocking operation of the first lower latch 109a (S55) and performing the unlocking operation of the magnetic module 37 (S56) may be variously modified and altered.

Figure 61:
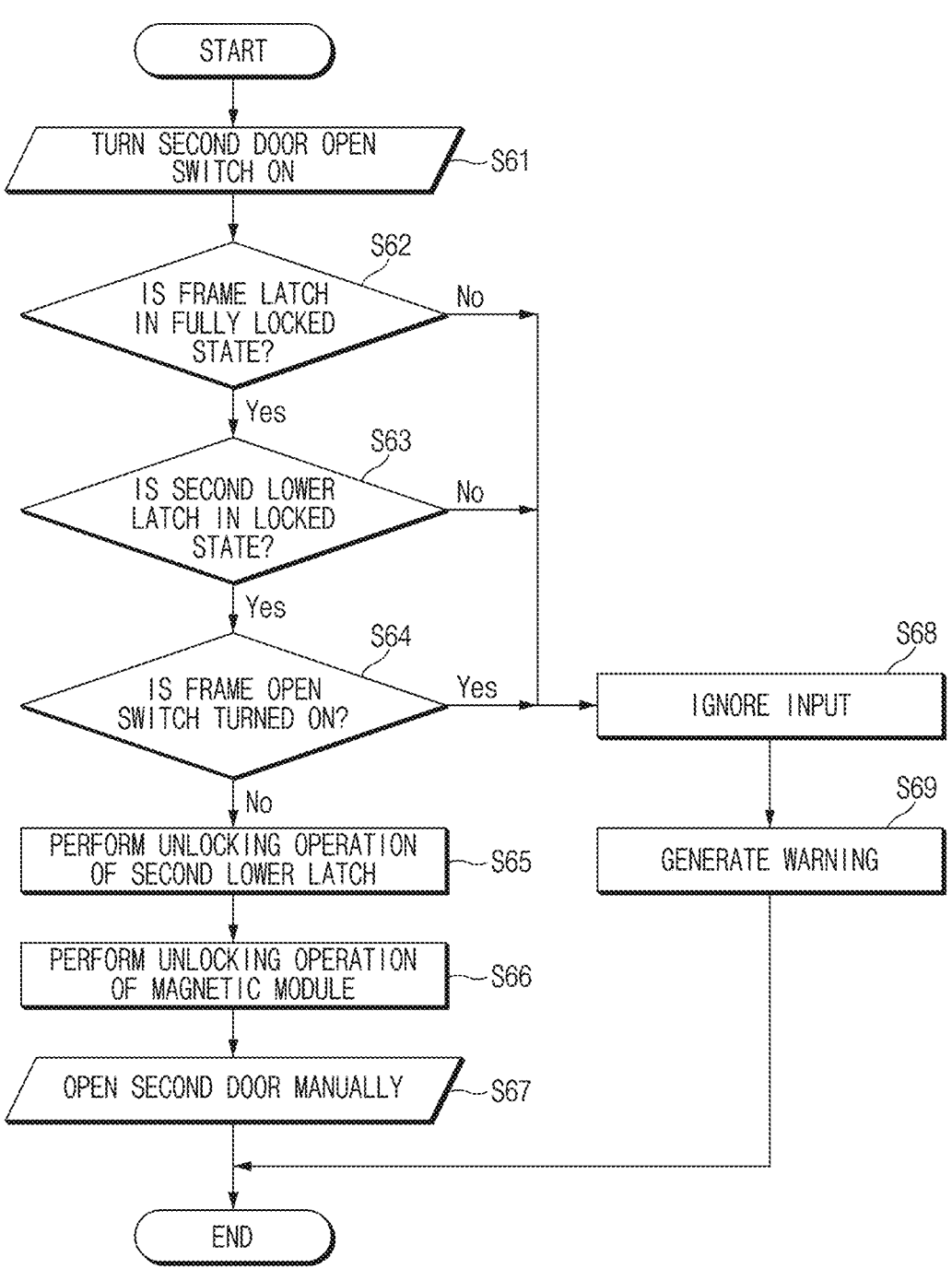
FIG. 61 illustrates a flowchart of a method of manually opening a second door in a state in which a main frame of a tailgate is in a closed position in a method of controlling a vehicle tailgate apparatus according to an example embodiment of the present disclosure.

FIG. 61 illustrates a flowchart of a method of manually opening a second door in a state in which a main frame of a tailgate is in a closed position in a method of controlling a vehicle tailgate apparatus according to an example embodiment of the present disclosure.

As the user presses the second door open switch 29c, the second door open switch 29c may be turned on (S61).

A turn-on signal of the second door open switch 29c may be transmitted to the controller 150, and the controller 150 may determine whether the frame latch 58 is in the fully locked state based on a detection result of the first lock sensor 101 (S62).

When it is determined in S62 that the frame latch 58 is in the fully locked state, the controller 150 may determine whether the second lower latch 109b is in the locked state (S63).

When it is determined in S62 that the frame latch 58 is not in the fully locked state, the controller 150 may ignore a signal input to each of the switches 79, 28c, and 29c (S68), and generate a warning signal (S69), and the control method according to this example embodiment of the present disclosure may end. When the frame latch 58 is not in the fully locked state during the opening of the second door 13, the controller 150 may bring the tailgate 10 to an emergency stop, thereby preventing a malfunction of the tailgate apparatus 100.

When it is determined in S63 that the second lower latch 109*b* is in the locked state, the controller 150 may determine whether the frame open switch 79 is turned on (S64).

When it is determined in S63 that the second lower latch 109*b* is not in the locked state, the controller 150 may ignore a signal input to each of the switches 79, 28*c*, and 29*c* (S68), and generate a warning signal (S69), and the control method according to this example embodiment of the present disclosure may end. When the second lower latch 109*b* is not in the locked state during the opening of the second door 13, the controller 150 may bring the tailgate 10 to an emergency stop, thereby preventing a malfunction of the tailgate apparatus 100.

When it is determined in S64 that the frame open switch 79 is turned on, the controller 150 may ignore a signal input to each of the switches 79, 28*c*, and 29*c* (S68), and generate a warning signal (S69), and the control method according to this example embodiment of the present disclosure may end. When the frame open switch 79 is turned on during the opening of the second door 13, the controller 150 may bring the tailgate 10 to an emergency stop, thereby preventing a malfunction of the tailgate apparatus 100.

When it is determined in S64 that the frame open switch 79 is turned off, the controller 150 may perform an unlocking operation of the second lower latch 109*b* to allow the second lower latch 109*b* to unlock the second lower striker 19*b* (S65).

After the second lower latch 109*b* is unlocked, the controller 150 may perform an unlocking operation of the magnetic module 37 to allow the magnetic module 37 to unlock the contact module 38 (S66).

As the second lower latch 109*b* unlocks the second lower striker 19*b*, and the magnetic module 37 unlocks the contact module 38, the user may manually open the second door 13 (S67).

FIG. 61 illustrates an example of the method including sequentially determining whether the frame latch 58 is in the fully locked state (S62), determining whether the second lower latch 109*b* is in the locked state (S63), and determining whether the frame open switch 79 is turned on (S64). However, the present disclosure is not limited thereto, but may be variously modified and altered. That is, the order of the steps of determining whether the frame latch 58 is in the fully locked state (S62), determining whether the second lower latch 109*b* is in the locked state (S63), and determining whether the frame open switch 79 is turned on (S64) may be variously modified and altered.

FIG. 61 illustrates an example of the method including sequentially performing the unlocking operation of the second lower latch 109*b* (S65) and performing the unlocking operation of the magnetic module 37 (S66). However, the present disclosure is not limited thereto, but may be variously modified and altered. That is, the order of the steps of performing the unlocking operation of the second lower latch 109*b* (S65) and the unlocking operation of the magnetic module 37 (S66) may be variously modified and altered.

Figure 62:
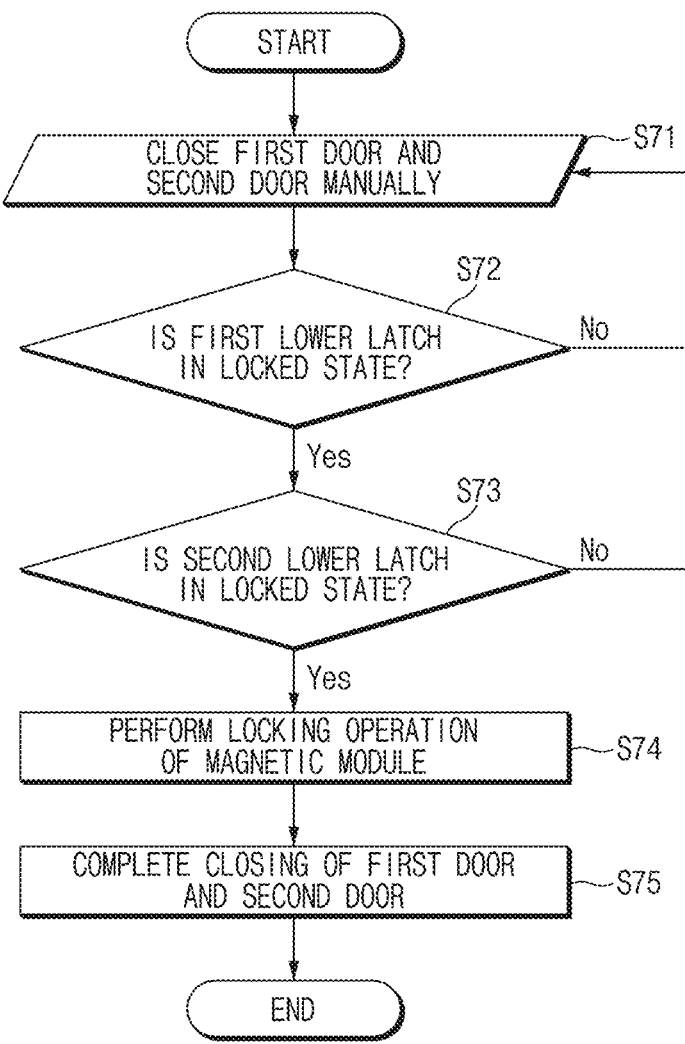
FIG. 62 illustrates a flowchart of a method of manually closing a first door and a second door in a state in which a main frame of a tailgate is in a closed position in a method of controlling a vehicle tailgate apparatus according to an example embodiment of the present disclosure.

FIG. 62 illustrates a flowchart of a method of manually closing a first door and a second door in a state in which a main frame of a tailgate is in a closed position in a method of controlling a vehicle tailgate apparatus according to an example embodiment of the present disclosure.

In a state in which the main frame 11 of the tailgate 10 is in the closed position, the user may manually close the first door 12 and the second door 13 (S71).

When the first door 12 and the second door 13 are manually closed, the controller 150 may determine whether the first lower latch 109*a* is in the locked state (S72).

When it is determined in S72 that the first lower latch 109*a* is in the locked state, the controller 150 may determine whether the second lower latch 109*b* is in the locked state (S73).

When it is determined in S72 that the first lower latch 109*a* is not in the locked state, the control method according to this example embodiment of the present disclosure may return to S71.

When it is determined in S73 that the second lower latch 109*b* is not in the locked state, the control method according to this example embodiment of the present disclosure may return to S71.

When it is determined in S73 that the second lower latch 109*b* is in the locked state, the controller 150 may perform a locking operation of the magnetic module 37 to allow the magnetic module 37 to lock the contact module 38 (S74).

As the locking operation of the magnetic module 37 is performed, the closing of the first door 12 and the second door 13 may be completed (S75).

FIG. 62 illustrates an example of the method including sequentially determining whether the first lower latch 109*a* is in the locked state (S72) and determining whether the second lower latch 109*b* is in the locked state (S73). However, the present disclosure is not limited thereto, but may be variously modified and altered. That is, the order of the steps of determining whether the first lower latch 109*a* is in the locked state (S72) and determining whether the second lower latch 109*b* is in the locked state (S73) may be variously modified and altered.

According to the above-described example embodiments of the present disclosure, the opening of each of the doors 12 and 13 may be prevented in a state in which the main frame 11 is opened, and the opening of the main frame 11 may be prevented in a state in which each of the doors 12 and 13 is opened so that the malfunction and damages of the tailgate apparatus 100 may be prevented.

As set forth above, a method of controlling a vehicle tailgate apparatus according to example embodiments of the present disclosure may be designed to stably perform movement of a main frame of a tailgate and opening/closing of each door by preventing malfunction of the tailgate apparatus. The opening of each door may be prevented in a state in which the main frame is opened, and the opening of the main frame may be prevented in a state in which each door is opened so that the malfunction and damages of the tailgate apparatus may be prevented.

According to example embodiments of the present disclosure, a tailgate may be stably opened and closed by moving a cable in a longitudinal direction of a vehicle due to an extension or retraction of a spindle drive. The manual closing of the tailgate may be facilitated by a spring embedded in the spindle drive.

According to example embodiments of the present disclosure, a first end portion of a spindle drive may be held in position adjacent to a tailgate, and a second end portion of the spindle drive may move toward a front or rear of a vehicle by an extension or retraction of the spindle drive so that a cable connecting the second end of the spindle drive and the tailgate may move in a longitudinal direction of the vehicle, and thus the opening and closing of the tailgate may be stably performed.

According to example embodiments of the present disclosure, a main frame of a tailgate may be aligned with a pair of sidewalls and a bed of a vehicle body so that the main frame may not interfere with a luggage compartment when the tailgate is opened in a drop-down manner. Accordingly, a width of the main frame may be maximized to correspond to a width of the vehicle body, and the width of the luggage compartment may be relatively increased. That is, when the tailgate is opened in the drop-down manner, the opening width (or opening area) of the luggage compartment may be maximized.

According to example embodiments of the present disclosure, doors may be pivotally connected to corresponding side portions of a main frame through side hinges, respectively. When each door is opened, the door may move to a first open position and a second open position. In particular, when each door moves to the second open position in which the door is overlapped with an exterior surface of a corresponding sidewall of a vehicle body, the door may be not located behind a rear of the vehicle so that space utilization at the rear of the vehicle may be improved. Specifically, because the door is not located behind the rear of the vehicle in a state in which the door is opened in the second open position, this may be advantageous to luggage loading and unloading, trailer connection, the user's movement, and the like.

According to example embodiments of the present disclosure, two doors may be configured to open and close simultaneously or independently of each other in a state in which a main frame is in the closed position, and thus the opening and closing of each door may be facilitated.

According to example embodiments of the present disclosure, a frame open-close switch may be provided on a top surface of each sidewall of a vehicle body, and the door open switch may be provided on a grip of each door so that each open switch may be intuitive to use. Thus, the opening and closing of a tailgate may be facilitated.

According to example embodiments of the present disclosure, each side hinge may use two vertical axes so that each door may move along an elliptical swing path. Accordingly, the swing path of each door may be relatively compact, which can facilitate the opening and closing of the door in a narrow space.

According to example embodiments of the present disclosure, a tailgate apparatus may operate in various modes such as a first mode, a second mode, and a third mode for various purposes, and accordingly usability and convenience thereof may be significantly improved. As the tailgate apparatus operates in various modes, accessibility to a luggage compartment, loadability of the luggage compartment, and the like may be significantly improved.

Hereinabove, although the present disclosure has been described with reference to example embodiments and the accompanying drawings, the present disclosure is not necessarily limited thereto, but may be variously modified and altered by those skilled in the art to which the present disclosure pertains without departing from the spirit and scopes of the present disclosure claimed in the following claims.

What is claimed is:

1. A method of controlling a vehicle tailgate apparatus, wherein the vehicle tailgate apparatus includes a main frame configured to move between an open position and a closed position at a rear end of a luggage compartment of a vehicle body, a pair of doors pivotally connected to the main frame, a frame latch configured to allow the main frame to be locked to and unlocked from the vehicle body, a pair of lower latches configured to allow the pair of doors to be locked to and unlocked from the main frame, a spindle drive configured to move the main frame between the open position and the closed position, and a frame open-close switch electrically connected to the frame latch and the spindle drive, the method comprising:

performing a frame-latch unlocking operation of the frame latch in a state in which the frame latch is fully locked in response to the frame open-close switch being turned on; and controlling the spindle drive to allow the main frame to move to the open position.

2. The method according to claim 1, further comprising controlling the spindle drive to move the main frame to the closed position in a state in which the frame latch is not fully locked in response to the frame open-close switch being turned on.

3. The method according to claim 2, further comprising:

detecting that an external force is acting on the spindle drive after the spindle drive is extended; and stopping the spindle drive.

4. The method according to claim 2, further comprising:

detecting that no external force is acting on the spindle drive after the spindle drive is extended;

stopping the spindle drive in a state in which the frame latch is partially locked; and performing cinching of the frame latch.

5. The method according to claim 1, further comprising performing a step-latch unlocking operation of a step latch in a state in which a turn-on signal of the frame open-close switch is held for a predetermined period of time, wherein the vehicle tailgate apparatus further includes a step mechanism configured to be stowed in and deployed from at least one of the pair of doors, and the step latch being configured to allow the step mechanism to be locked to and unlocked from the at least one of the pair of doors.

6. The method according to claim 5, further comprising monitoring an opening/closing state of each of the pair of doors after the step-latch unlocking operation of the step latch is performed.

7. The method according to claim 6, wherein the monitoring of the opening/closing state of each of the pair of doors includes determining that each of the pair of doors is closed in a state in which a corresponding lower latch is locked.

8. The method according to claim 6, wherein the vehicle tailgate apparatus further includes a magnetic module configured to allow the pair of doors to be locked to and unlocked from each other, and wherein the monitoring of the opening/closing state of each of the pair of doors includes determining that each of the pair of doors is closed in a state in which the magnetic module is locked.

9. The method according to claim 6, wherein the vehicle tailgate apparatus further includes a pair of door open switches provided on the pair of doors, respectively, and wherein the monitoring of the opening/closing state of each of the pair of doors includes determining that each of the pair of doors is closed in a state in which correspondingly each of the pair of door open switches is not turned on, respectively.

10. The method according to claim 6, wherein the vehicle tailgate apparatus further includes a check strip configured to move between an unfolded position in which the check strip is unfolded with respect to the main frame and a folded position in which the check strip is folded with respect to the main frame, and wherein the monitoring of the opening/closing state of each of the pair of doors includes determining that each of the pair of doors is closed in a state in which the check strip is in the unfolded position.

11. A method of controlling a vehicle tailgate apparatus, wherein the vehicle tailgate apparatus includes a main frame configured to move between an open position and a closed position at a rear end of a luggage compartment of a vehicle body, a pair of doors pivotally connected to the main frame, a frame latch configured to allow the main frame to be locked to and unlocked from the vehicle body, a pair of lower latches configured to allow the pair of doors to be locked to and unlocked from the main frame, a spindle drive configured to move the main frame between the open position and the closed position, a frame open-close switch electrically connected to the frame latch and the spindle drive, a pair of door open switches provided on the pair of doors, respectively, and a magnetic module configured to allow the pair of doors to be locked to and unlocked from each other, the method comprising performing a lower-latch unlocking operation of each of the pair of lower latches and a magnetic-module unlocking operation of the magnetic module in a state in which the frame latch is fully locked in response to one one of or both of the pair of door open switches being turned on.

12. The method according to claim 11, further comprising performing the lower-latch unlocking operation of each of the pair of lower latches and the magnetic-module unlocking operation of the magnetic module in a state in which each of the pair of lower latches is locked in response to one of or both of the pair of door open switches being turned on.

13. The method according to claim 11, further comprising performing the lower-latch unlocking operation of each of the pair of lower latches and the magnetic-module unlocking operation of the magnetic module in a state in which the frame open-close switch is turned off in response to one of or both of the pair of door open switches being turned on.

14. A method of controlling a vehicle tailgate apparatus, the method comprising:

unlocking a frame latch in response to the frame latch being fully locked and in response to a frame open-close switch being turned on; and controlling a spindle drive to allow a main frame to move to an open position, wherein the vehicle tailgate apparatus includes:

the main frame configured to move between a closed position and the open position at a rear end of a luggage compartment of a vehicle body, the frame latch configured to allow the main frame to be locked to and unlocked from the vehicle body, the spindle drive configured to move the main frame between the open position and the closed position, and the frame open-close switch electrically connected to the frame latch and the spindle drive.

15. The method according to claim 14, further comprising:

controlling the spindle drive to move the main frame to the closed position in response to the frame latch being not fully locked and in response to the frame open-close switch being turned on;

detecting whether an external force is acting on the spindle drive; and stopping the spindle drive in response to detecting that the external force is acting on the spindle drive.

16. The method according to claim 14, further comprising unlocking a step latch in response to the frame open-close switch being depressed for a first period of time, wherein the vehicle tailgate apparatus further includes:

a step mechanism configured to provide a stowed position and a deployed position of a step, and the step latch being configured to lock the step in the stowed position and unlock the step to allow the deployed position of the step.

17. The method according to claim 16, further comprising monitoring an opening/closing state of a door after the unlocking of the step latch, wherein the vehicle tailgate apparatus further includes the door pivotally connected to the main frame, wherein the step mechanism is coupled to the door.

18. The method according to claim 17, wherein the monitoring of the opening/closing state of the door includes determining that the door is closed based on a lower latch being locked, wherein the vehicle tailgate apparatus further includes the lower latch configured to lock the door to and unlock the door from the main frame.

19. The method according to claim 17, wherein the monitoring of the opening/closing state of the door includes determining that the door is closed based on a magnetic module being locked, wherein the vehicle tailgate apparatus further includes the magnetic module configured to lock the door to and unlocked the door from another door that is also pivotally connected to the main frame.

20. The method according to claim 17, wherein the monitoring of the opening/closing state of the door includes determining that the door is closed based on a door open switch not being turned on, wherein the vehicle tailgate apparatus further includes the door open switch provided on the door.

\* \* \* \* \*